United States Patent
Shinmei et al.

(10) Patent No.: US 8,970,727 B2
(45) Date of Patent: Mar. 3, 2015

(54) IMAGE PROCESSING APPARATUS, IMAGE TAKING APPARATUS, IMAGE PROCESSING METHOD AND IMAGE PROCESSING PROGRAM HAVING MOVEMENT DETERMINATION

(75) Inventors: Katsuhisa Shinmei, Kanagawa (JP); Hiroshi Yamamoto, Chiba (JP); Shingo Nagataki, Kanagawa (JP); Kenji Wajima, Tokyo (JP)

(73) Assignee: Sony Corporation, Tokyo (JP)

( * ) Notice: Subject to any disclaimer, the term of this patent is extended or adjusted under 35 U.S.C. 154(b) by 623 days.

(21) Appl. No.: 13/067,474

(22) Filed: Jun. 3, 2011

(65) Prior Publication Data

US 2011/0317027 A1  Dec. 29, 2011

(30) Foreign Application Priority Data

Jun. 24, 2010  (JP) ................................ 2010-144205

(51) Int. Cl.
*H04N 9/73* (2006.01)
*H04N 5/235* (2006.01)

(52) U.S. Cl.
CPC ............. *H04N 9/735* (2013.01); *H04N 5/2355* (2013.01)

USPC ........................................................ 348/223.1

(58) Field of Classification Search
CPC .................................................... H04N 5/2355
USPC ....................................................... 348/223.1
See application file for complete search history.

(56) References Cited

U.S. PATENT DOCUMENTS

| 5,144,442 | A  | * | 9/1992 | Ginosar et al. ................. 348/362 |
| 6,134,424 | A  |   | 10/2000 | Nishihori et al. |
| 2009/0028462 | A1 | * | 1/2009 | Habuka et al. ................. 382/284 |
| 2010/0066810 | A1 | * | 3/2010 | Ryu et al. ......................... 348/36 |

FOREIGN PATENT DOCUMENTS

JP       07-322147       12/1995

* cited by examiner

*Primary Examiner* — Usman Khan
(74) *Attorney, Agent, or Firm* — Rader, Fishman & Grauer PLLC

(57) ABSTRACT

Disclosed herein is an image processing apparatus including a synthesizing processing section configured to synthesize a plurality of images taken at different exposure times wherein, in processing to synthesize the taken images, the synthesizing processing section acquires a taken-image blending ratio varying in accordance with components selected from the taken images and carries out a blending process on a blend area in which pixels of the taken images are to be blended by applying the blending ratio to the blend area.

18 Claims, 54 Drawing Sheets

IMAGE PROCESSING APPARATUS, IMAGE TAKING APPARATUS, IMAGE PROCESSING METHOD AND IMAGE PROCESSING PROGRAM HAVING MOVEMENT DETERMINATION

BACKGROUND

The present disclosure relates to an image processing apparatus for producing an image with a wide dynamic range by making use of a plurality of images taken at different exposure times, an image taking apparatus employing the image processing apparatus, an image processing method for the image processing apparatus and an image processing program implementing the image processing method.

More particularly, the present disclosure relates to a mechanism for suppressing flickers generated in a video and flickers of a color-signal system in an operation to generate an image with a wide dynamic range by making use of a plurality of images having different exposure times. These flickers are caused by differences between optical sources existing for taken images, fluctuations included in illuminated light as fluctuations of a power-supply frequency or characteristics of the afterglow. The flickers generated in a video are also referred to as optical-source flickers whereas the flickers of a color-signal system are also referred to as color flickers or color rolling.

An image taking apparatus for taking an image of an image taking object includes a mechanism for controlling the quantity of light incident to a pixel section of the apparatus. The image taking apparatus is typically a solid-state image taking apparatus of a CCD (Charge Couple Device), MOS (Metal Oxide Semiconductor) or CMOS (Complementary MOS) type. In the following description, the pixel section is also referred to as an image taking section, a pixel array section, an image sensor or an opto-electrical conversion sensor whereas the mechanism is referred to as an incident-light quantity controller.

The incident-light quantity controller is a controller having a mechanical diaphragm mechanism provided on an image taking lens thereof or a controller having a mechanical shutter mechanism provided on an image taking lens thereof. In the following description, the mechanical diaphragm mechanism is referred to as a mechanical iris whereas the mechanical shutter mechanism is referred to merely as a mechanical shutter. As an alternative, the incident-light quantity controller can also be a controller having the so-called electronic shutter function capable of controlling the length of an accumulation time of signal electrical charge in the pixel section of the solid-state image taking apparatus. In the following description, the accumulation time is also referred to as an exposure time.

The mechanical iris and the mechanical shutter can be used independently of each other. However, the mechanical iris can, also be used by combining the mechanical iris with the mechanical shutter or the electronic shutter.

By the way, a variety of image taking apparatus do not raise a problem if the apparatus are used for taking an image by making use of an optical source put in a steady state in which the brightness of light generated by the source does not change. If an image is taken by making use of an optical source such as a fluorescent lamp having a periodical light emitting characteristic and operating asynchronously with the exposure period of the semiconductor image taking apparatus, however, optical source flickers are generated.

It is to be noted that the optical source flickers are distinguished from luminance flickers which are flickers of screen luminance and from color reproduction flickers which are also referred to simply as color flickers or color rolling.

The optical source flickers are perceived as a phenomenon in which a video signal changes due to a relation between luminance changes of an optical source and the exposure period of an image taking apparatus.

For example, the luminance signal component of a video signal changes due to luminance changes of an optical source making use of a commercial power supply having a frequency f and due to beat components having a field period fv of the image taking apparatus. In this case, the luminance changes are changes within a period of 1/nf seconds where reference symbol n is normally the integer 2. Since the luminance signal component of a video signal changes, the output video also varies as well at a period also related to the afterglow characteristic of the eye of a human being. A phenomenon in which image flickers are felt is referred to as luminance flickers.

For example, luminance flickers are generated with ease in an area in which the NTSC system having a field frequency of 60 Hz is adopted and the frequency f of the commercial power supply is 50 Hz. Luminance flickers are also generated with ease in an area in which the PAL system having a field frequency of 50 Hz is adopted and the frequency f of the commercial power supply is 60 Hz. In addition, in comparison with the electrical light bulb, the luminance of the fluorescent lamp changes due to the light emitting characteristic of the fluorescent lamp so that luminance flickers are generated very considerably by the fluorescent lamp.

It is to be noted that a statement saying a field frequency of 60 Hz can be said in other words as a statement saying a frame frequency of 30 fps. Speaking more accurately, the field frequency is 59.94 Hz. On the other hand, a statement saying a field frequency of 50 Hz can be said in other words as a statement saying a frame frequency of 25 fps.

For example, the emission period of the fluorescent lamp is 10 ms whereas the period of the exposure operation in the NTSC system having a field frequency of 60 Hz is 16.7 ms. In this case, the lowest common multiple of the emission period of the fluorescent lamp and the period of the exposure operation in the NTSC system is 50 ms. That is to say, in three exposure operations, the relation between the emission period of the fluorescent lamp and the period of the exposure operation in the NTSC system is restored. Thus, there are three kinds of exposure period. Differences of the levels of signals output by the solid-state image taking apparatus between these three exposure periods cause flickers to be generated at a flicker frequency F of 20 Hz.

In addition, if the function of the electronic shutter is used, the higher the speed of the shutter operating in the shutter mode, the shorter the time included in the one field period as an accumulation time for accumulating electric charge in the solid-state image taking apparatus.

Thus, the amplitude of flickers becomes larger than that for a normal shutter speed of 1/60 seconds. The higher the speed of the electronic shutter, the more striking the generated flickers. As a result, flickers including mainly image luminance flickers appear on the screen, causing the quality of the image displayed on the screen to deteriorate considerably.

In addition, the green, red and blue colors are three colors of a fluorescent substance used in a fluorescent lamp. Even though the emissions of the three colors start with the same timing, the light quantities of the three colors decrease at different rates so that the three colors disappear eventually at different times. That is to say, the light emitted by the fluorescent lamp changes its spectrum with the lapse of time.

In general, the emission time of the green color is particularly longest among the three colors. On the other hand, the emission time of the blue color is shortest among the three colors. That is to say, the emission time of the red color is between those of the green and blue colors.

Thus, depending on the shutter timing of the shutter having a high speed, only one or two color components of the emitted light can be taken in some cases.

In an operation to take an image by making use of an electronic shutter having a high speed, a difference in taken spectrum appears a color change. As described above, color reproduction flickers are also referred to as color flickers or color rolling.

In particular, the light component of the blue color cannot be taken as color flickers. In many cases, if an image taking operation is carried out normally, the light component of the blue color is taken inadvertently as the light component of the yellow color.

SUMMARY

By the way, Japanese Patent Laid-open No. Hei 7-322147 describes a solid-state image taking apparatus for generating a video signal with a wide dynamic range by synthesizing images having different exposure quantities.

In the case of this image taking apparatus, if the image of a bright portion is taken at a normal image-taking exposure time, the output has a value exceeding the saturation level of an opto-electrical conversion sensor employed in the image taking apparatus so that the value cannot be used. Thus, in order to obtain a wide dynamic range, it is necessary to take images each having a small exposure quantity and then synthesize the taken images.

FIG. 1 is a conceptual diagram showing relations between the sensor output and the light quantity for images required for generating an image having a wide dynamic range.

Images taken at a normal exposure time include an image that cannot be acquired due to the fact that the light quantity of this unacquirable image exceeds the saturation level of the opto-electrical conversion sensor. For the image that cannot be acquired, the exposure time is shortened in order to prevent the light quantity from exceeding the saturation level of the opto-electrical conversion sensor so that meaningful information can be obtained.

The value of each pixel of the image taken at a short exposure time is multiplied by the reciprocal of an exposure ratio described below or added to an offset in order to produce a resulting pixel value. Then, for every pixel, the resulting pixel value is compared with the value of a corresponding pixel of an image taken at a long exposure time in order to select a particular one of the two pixels compared with each other and discard the other one. In this way, a synthesized image having a wide dynamic range can be generated.

It is to be noted that the exposure ratio is a ratio of the shutter speed of a normally taken image to the shutter speed of an image taken at a short exposure time.

As described above, in order to generate an image having a wide dynamic range, it is necessary to reduce the exposure time to a relatively short one by a shutter speed corresponding to an exposure time of (1/several thousands) seconds. In the following description, the exposure time is also referred to as a shutter time. Thus, an image taken at such a short exposure time has generated color flickers. In the following description, the image taken at such a short exposure time is referred to as a short exposure-time image.

On the other hand, an image taken at an exposure time equal to or longer than that for a standard video signal is normally obtained at a shutter speed corresponding to an exposure time of typically 1/60 or 1/100 seconds in many cases. In the following description, the image taken at such a long exposure time is referred to as a long exposure-time image. Thus, as explained before, a long exposure-time image is hardly affected by color flickers.

Accordingly, the effect of color flickers on a short exposure-time image is big but the effect of color flickers on a long exposure-time image is small. Thus, as a result, on a portion of a synthesized image having a wide dynamic range, color flickers are undesirably generated. Accordingly, since the synthesized image is different from the image actually seen by the eyes of the user, the user inevitably feels the synthesized image in an unnatural way.

In order to solve the problem described above, there has been made a proposal to carry out white-balance adjustment processing for an image taken by making use of short exposure time light and white-balance adjustment processing for an image taken by making use of long exposure time light separately from each other.

FIG. 2 is a block diagram showing a first typical image taking apparatus 1 for carrying out white-balance adjustment processing for an image taken by making use of short exposure time light and white-balance adjustment processing for an image taken by making use of long exposure time light separately from each other.

As shown in the figure, the image taking apparatus 1 employs a solid-state image taking device 2, front-stage processing sections 3-1 and 3-2, conversion processing sections 4-1 and 4-2 each used for converting RAW data into RGB data and an integrated-value computation processing section 5.

The image taking apparatus 1 also has white-balance adjustment processing sections 6-1 and 6-2, amplifiers 7-1 and 7-2, a synthesizing processing section 8, a rear-stage processing section 9 and a CPU 10.

The integrated-value computation processing section 5 employed in the image taking apparatus 1 computes an integrated value of the RGB data of the long exposure time light and an integrated value of the RGB data of the short exposure time light. The integrated-value computation processing section 5 supplies the computed integrated values to the CPU 10. On the basis of the integrated values, the CPU 10 computes a white-balance gain to be used as a multiplier for the long exposure-time image and a white-balance gain to be used as a multiplier for the short exposure-time image.

The CPU 10 supplies the computed white-balance gains to the white-balance adjustment processing sections 6-1 and 6-2. The white-balance adjustment processing section 6-1 carries out white-balance adjustment processing to multiply the RGB data of the long exposure-time image by the white-balance gain for the data whereas the white-balance adjustment processing section 6-2 carries out white-balance adjustment processing to multiply the RGB data of the short exposure-time image by the white-balance gain for the data.

As described above, by adoption of this system configuration, it is possible to multiply the long exposure-time image and the short exposure-time image by their respective white-balance gains different from each other.

FIG. 3 is a block diagram showing a second typical image taking apparatus 1A for carrying out white-balance adjustment processing for an image taken by making use of short exposure time light and white-balance adjustment processing for an image taken by making use of long exposure time light separately from each other.

The image taking apparatus 1A shown in FIG. 3 is a typical modification of the image taking apparatus 1 shown in FIG. 2.

In the image taking apparatus 1A shown in FIG. 3, the integrated-value computation processing section 5 and the white-balance adjustment processing section 6 are provided at stages following the synthesizing processing section 8.

If it is possible to supply information indicating the long exposure-time image or the short exposure-time image from which a pixel has been selected in the synthesizing processing carried out by the synthesizing processing section 8 of the image taking apparatus 1A shown in FIG. 3 as a flag FLG for every pixel to the following stage, the same processing as that of the image taking apparatus 1 shown in FIG. 2 can be carried out in the post-synthesizing processing. As described earlier, the processing carried out by the image taking apparatus 1 shown in FIG. 2 includes the integrated-value computation processing and the white-balance adjustment processing.

In the image taking apparatus 1A shown in FIG. 3, the flag FLG is supplied to the white-balance adjustment processing section 6.

Thus, the white-balance adjustment processing section 6 has a circuit configuration like one shown in FIG. 4.

As shown in FIG. 4, the white-balance adjustment processing section 6 employs a selector 61 and a multiplier 62.

The selector 61 selects white-balance gains on the basis of the flag FLG indicating whether the long exposure-time image or the short exposure-time image has been selected in the synthesizing processing carried out by the synthesizing processing section 8.

If the flag FLG indicates that the long exposure-time image has been selected, the selector 61 selects white-balance gains WBG_R_Long, WBG_G_Long and WBG_B_Long for the long exposure-time image and supplies the selected white-balance gains WBG_R_Long, WBG_G_Long and WBG_B_Long to the multiplier 62.

If the flag FLG indicates that the short exposure-time image has been selected, on the other hand, the selector 61 selects white-balance gains WBG_R_Short, WBG_G_Short and WBG_B_Short for the short exposure-time image and supplies the selected white-balance gains WBG_R_Short, WBG_G_Short and WBG_B_Short to the multiplier 62.

The multiplier 62 multiplies R, G and B signals obtained as a result of conversion processing carried out by the RAW-RGB conversion processing section 4 to convert RAW data into the R, G and B signals by the white-balance gains selected by the selector 61 in order to output a white-balance adjusted image.

The configuration shown in FIG. 3 offers a merit that the number of pixels subjected to the integrated-value computation processing and the white-balance adjustment processing is half the number of pixels subjected to the integrated-value computation processing and the white-balance adjustment processing which are carried out in the configuration shown in FIG. 2. That is to say, the image taking apparatus 1 shown in FIG. 2 carries out the processing on pixels of two images, i.e., the long exposure-time image and the short exposure-time image, whereas the image taking apparatus 1A shown in FIG. 3 carries out the processing on only pixels of one image, i.e., the synthesized image. Thus, the image taking apparatus 1A shown in FIG. 3 has a circuit size smaller than the image taking apparatus 1 shown in FIG. 2.

In the processing carried out by the system shown in FIG. 3 to generate an image having a wide dynamic range, most of the long exposure-time image PXLE and most of the short exposure-time image PXSE are multiplied by their respective white-balance gains which are different from each other. Thus, the color of a naturally white image taking object is white.

In the system shown in FIG. 3, however, in a blend area PXMX where pixels of the long exposure-time image and pixels of the short exposure-time image are blended with each other, a false color is undesirably generated as shown in FIG. 5.

The false color is attributed to different causes according to the synthesizing processing method adopted by the synthesizing processing section 8 provided at the front stage. By referring to some conceptual diagrams described below, the causes are explained as follows.

FIG. 6 shows a flowchart representing pixel selection processing carried out at a synthesized-image generation time.

FIGS. 7A and 7B are explanatory diagrams to be referred to in describing causes of generation of a false color in a blend area at a short or long exposure-time image selection time in accordance with a technology in related art.

FIGS. 8A and 8B are explanatory diagrams to be referred to in describing causes of generation of a false color in a blend area at a blending time in accordance with a technology in related art.

FIG. 9 is a diagram showing a graph representing the relation between a blending ratio and a pixel value or a luminance level.

The flowchart shown in FIG. 6 begins with a step ST1 at which a pixel is received. Then, at the next step ST2, the pixel is examined in order to determine whether or not the value of the pixel or the luminance level of the pixel is equal to or greater than a threshold value LVTH. If the value of the pixel or the luminance level of the pixel is equal to or greater than the threshold value LVTH, the short exposure-time image is selected at a step ST3. If the value of the pixel or the luminance level of the pixel is smaller than the threshold value LVTH, on the other hand, the long exposure-time image is selected at a step ST4. In either case, the flow of the processing then goes on to the next step ST5 in order to determine whether or not the last pixel has been processed. The processing is carried out repeatedly till the last pixel has been processed.

If RAW data of the long exposure-time image or the short exposure-time image has been selected in a blend area portion in the processing described above, as shown in FIG. 7A, depending on the scene, data (pixel values) of the long exposure-time image and the short exposure-time image is supplied in a mixed state as data to be selected.

When the processing to convert RAW data into RGB data is carried out, information of at least one adjacent RAW data (pixel values) is used. Thus, the operation to supply the data (pixel values) of the long exposure-time image and the short exposure-time image in a mixed state makes it impossible to express a color with a high degree of accuracy as shown in FIG. 7B. As a result, a false color is undesirably generated in some cases.

In addition, in order to get rid of the operation to supply the data (pixel values) of the long exposure-time image and the short exposure-time image in a mixed state, as shown in FIG. 8A, in the case of the blend area, a method is adopted in some cases to blend the RAW data of the long exposure-time image and the RAW data of the short exposure-time image in order to generate a synthesized image.

FIG. 9 is a diagram showing the relation between the signal level or the luminance level and a blending ratio α.

In this case, it is impossible to know which of the white-balance gain for the long exposure-time image and the white-balance gain for the short exposure-time image is to be used as a multiplier for the blend area portion by the white-balance adjustment processing section 6 provided at the rear stage.

In addition, even if either white-balance gain is used as a multiplier, the gain does not match well so that, as a result, a false color is generated as shown in FIG. 8B. The white-balance gain does not match well because of a difference in origin between the gain used as a multiplier and RAW data used as the multiplicand. In this case, the RAW data is a mixture of the long exposure-time image and the short exposure-time image.

It is to be noted that, in the typical example shown in FIGS. 8A and 8B, the white-balance gain for the long time exposure image is used as a multiplier. In addition, the white-balance gain for the long exposure-time image or the short exposure-time image to be used as a multiplier is determined on the basis of information acquired by making use of the long exposure-time image or the short exposure-time image respectively.

As described above, in the system in related art capable of multiplying the long exposure-time image and the short exposure-time image by their respective white-balance gains different from each other, in some cases, there is raised a problem that a false color is generated in a blend area of a plurality of images.

The present disclosure provides an image processing apparatus capable of effectively suppressing a false color generated in a blend area even if different optical sources exist for the long exposure-time image and the short time exposure image and even if color flickers (or color rolling) exist and provides an image taking apparatus employing the image processing apparatus, an image processing method to be adopted by the image processing apparatus as well as an image processing program implementing the image processing method.

An image processing apparatus according to a first mode of the present disclosure has a synthesizing processing section configured to synthesize a plurality of images taken at different exposure times. In processing to synthesize the taken images, the synthesizing processing section acquires a taken-image blending ratio varying in accordance with components selected from the taken images and carries out a blending process on a blend area in which pixels of the taken images are to be blended by applying the blending ratio to the blend area.

An image taking apparatus according to a second mode of the present disclosure has an image taking device for taking a plurality of images at different exposure times and a synthesizing processing section configured to synthesize the images taken by the image taking device. In processing to synthesize the taken images, the synthesizing processing section acquires a taken-image blending ratio varying in accordance with components selected from the taken images and carries out a blending process on a blend area in which pixels of the taken images are to be blended by applying the blending ratio to the blend area.

In accordance with an image processing method according to a third mode of the present disclosure, processing to synthesize a plurality of images taken at different exposure times includes an operation to acquire a taken-image blending ratio varying in accordance with components selected from the taken images and a blending process carried out on a blend area in which pixels of the taken images are to be blended by applying the blending ratio to the blend area.

An image processing program according to a fourth mode of the present disclosure is a program to be executed by a computer in a process of synthesizing a plurality of images taken at different exposure times in order to carry out an operation to acquire a taken-image blending ratio varying in accordance with components selected from the taken images and carry out a blend process on a blend area in which pixels of the taken images are to be blended by applying the blending ratio to the blend area.

In accordance with the present disclosure, it is possible to effectively suppress a false color generated in a blend area even if different optical sources exist for a long exposure-time image and a short time exposure image and even if color flickers (or color rolling) exist.

DETAILED DESCRIPTION OF THE PREFERRED EMBODIMENTS

Embodiments of the present disclosure are explained by referring to the diagrams.

Figure 10:
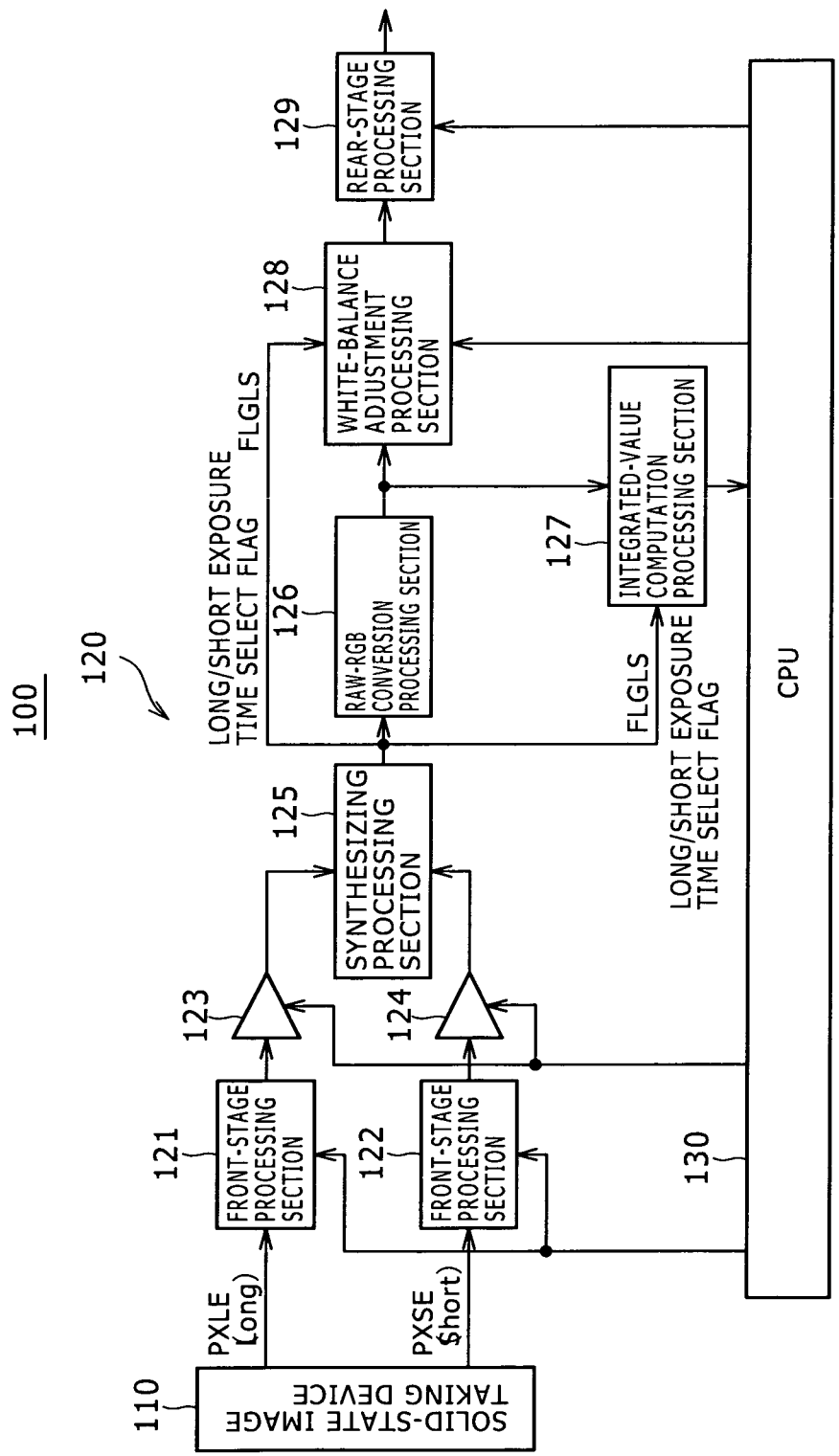
FIG. 10 is a block diagram showing a typical configuration of an image taking apparatus employing an image processing apparatus according to a first embodiment of the present disclosure.

It is to be noted that the embodiments are described in chapters arranged as follows:

1: First Embodiment Implementing a First Typical Image Processing Apparatus of an Image Taking Apparatus 2: Second Embodiment Implementing a Second Typical Image Processing Apparatus of an Image Taking Apparatus 3: Third Embodiment Implementing a Third Typical Image Processing Apparatus of an Image Taking Apparatus 4: Fourth Embodiment Implementing a Fourth Typical Image Processing Apparatus of an Image Taking Apparatus 5: Fifth Embodiment Implementing a Fifth Typical Image Processing Apparatus of an Image Taking Apparatus 6: Sixth Embodiment Implementing a Sixth Typical Image Processing Apparatus of an Image Taking Apparatus 7: Seventh Embodiment Implementing a Seventh Typical Image Processing Apparatus of an Image Taking Apparatus 8: Eighth Embodiment Implementing an Eighth Typical Image Processing Apparatus of an Image Taking Apparatus 9: Ninth Embodiment Implementing a Ninth Typical Image Processing Apparatus of an Image Taking Apparatus 10: Tenth Embodiment Implementing a Tenth Typical Image Processing Apparatus of an Image Taking Apparatus 11: Eleventh Embodiment Implementing an Eleventh Typical Image Processing Apparatus of an Image Taking Apparatus 12: Twelfth Embodiment Implementing a Twelfth Typical Image Processing Apparatus of an Image Taking Apparatus 13: Thirteenth Embodiment Implementing a Thirteenth Typical Image Processing Apparatus of an Image Taking Apparatus 14: Fourteenth Embodiment Implementing a Fourteenth Typical Image Processing Apparatus of an Image Taking Apparatus 15: Fifteenth Embodiment Implementing a Fifteenth Typical Image Processing Apparatus of an Image Taking Apparatus 1: First Embodiment FIG. 10 is a block diagram showing a typical configuration of an image taking apparatus 100 employing an image processing apparatus 120 according to a first embodiment of the present disclosure.

Configuration of the Image Taking Apparatus

The image taking apparatus 100 employs a solid-state image taking device 110 and the image processing apparatus 120.

The image processing apparatus 120 has front-stage processing sections 121 and 122, amplifiers 123 and 124 as well as a synthesizing processing section 125.

In addition, the image processing apparatus 120 also includes an RAW-RGB conversion processing section 126, an integrated-value computation processing section 127, a white-balance adjustment processing section 128, a rear-stage processing section 129 and a CPU (central processing unit) 130 functioning as a control section.

The blocks composing the image taking apparatus 100 are explained in an order according to the sequence of processing operations carried out to generate an image having a wide dynamic range.

The solid-state image taking device 110 is configured as an image sensor such as a CCD image sensor or a CMOS image sensor. In this specification of the present disclosure, the technical term 'sensor' is also used to imply the solid-state image taking device 110.

The solid-state image taking device 110 carries out opto-electrical conversion to convert a taken image created by an optical system not shown in the figure into a digital signal, supplying the digital signal to the front-stage processing sections 121 and 122 employed in the image processing apparatus 120.

In the solid-state image taking device 110, a plurality of images taken at different exposure times are created in order to generate an image having a wide dynamic range. To put it concretely, the solid-state image taking device 110 outputs digital signals representing at least two images taken at different exposure times.

In the configuration shown in the figure, reference notation PXSE denotes a short exposure-time image which is an image taken at a short exposure time. On the other hand, reference notation PXLE denotes a long exposure-time image which is an image taken at a long exposure time equal to a normal exposure time longer than the short exposure time or even longer than the normal exposure time. The short exposure-time image and the long exposure-time image are used for generating an image having a wide dynamic range.

The front-stage processing carried out by the front-stage processing sections 121 and 122 is processing which must be carried out at a location relatively close to the lens output. The front-stage processing includes black-level balancing processing, noise elimination processing and shading correction processing.

The front-stage processing section 121 carries out the black-level balancing processing, the noise elimination processing and the shading correction processing on the long exposure-time image.

On the other hand, the front-stage processing section 122 carries out the black-level balancing processing, the noise elimination processing and the shading correction processing on the short exposure-time image.

The amplifier 123 multiplies the long exposure-time image already subjected to the front-stage processing carried out in the front-stage processing section 121 by a gain received from the CPU 130 in order to produce a product and supplies the product to the synthesizing processing section 125.

By the same token, the amplifier 124 multiplies the short exposure-time image already subjected to the front-stage processing carried out in the front-stage processing section 122 by the gain received from the CPU 130 in order to produce a product and supplies the product to the synthesizing processing section 125.

The gain output from the CPU 130 can be the reciprocal of an exposure ratio or a corrected value of the reciprocal. The exposure ratio is a ratio of the shutter speed for the normally taken image to the shutter speed for the short exposure-time image.

The synthesizing processing section 125 carries out processing to synthesize the long exposure-time image with the short exposure-time image in pixel units.

Details of the synthesizing method will be described later.

As a result of the synthesizing processing, the synthesizing processing section 125 outputs a synthesized image and flag information provided for each synthesized-image pixel of the synthesized image to indicate which of a pixel of the long exposure-time image and a pixel of the short exposure-time image has been selected as the synthesized-image pixel. In the following description, the flag information is referred to as a long/short exposure-time select flag FLGLS.

The synthesizing processing section 125 outputs the synthesized image to the RAW-RGB conversion processing section 126 which then carries out RAW-RGB conversion processing on the synthesized image.

The RAW-RGB conversion processing is processing to convert RAW data output by the solid-state image taking device 110 for every pixel into three pieces of data, i.e., R data, G data and B data. The RAW-RGB conversion processing is also referred to as de-mosaic processing.

It is to be noted that the RAW data includes values of a Bayer array of R, G and B colors or complementary colors and pixel values each obtained for a pixel by passing the pixel value through a color filter and carrying out opto-electrical conversion on the pixel value.

The RAW-RGB conversion processing section 126 outputs the R, G and B synthesized images obtained as a result of the RAW-RGB conversion processing to the integrated-value computation processing section 127 and the white-balance adjustment processing section 128.

First of all, the following description explains the configurations of the white-balance adjustment processing section 128 and the rear-stage processing section 129 as well as functions carried out by the white-balance adjustment processing section 128 and the rear-stage processing section 129.

In accordance with the long/short exposure-time select flag FLGLS received from the synthesizing processing section 125, the white-balance adjustment processing section 128 multiplies the pixel values of the R, G and B synthesized images received from the RAW-RGB conversion processing section 126 by their respective R, G and B white-balance gains received from the CPU 130 for pixels of the long exposure-time image and the short exposure-time image.

In the following description, the R, G and B white-balance gains received from the CPU 130 for pixels of the long exposure-time image and the short exposure-time image are referred to as WBG_R_Long, WBG_G_Long, WBG_B_Long, WBG_R_Short, WBG_G_Short and WBG_B_Short.

As described earlier, the long/short exposure-time select flag FLGLS is a flag indicating which of a pixel of the long exposure-time image and a pixel of the short exposure-time image has been selected as the synthesized-image pixel.

The rear-stage processing section 129 carries out rear-stage processing on an image received from the white-balance adjustment processing section 128. The rear-stage processing includes noise elimination, an edge emphasis process, gradation conversion and gamma processing.

As described above, the RAW-RGB conversion processing section 126 outputs the R, G and B synthesized images obtained as a result of the RAW-RGB conversion processing to the integrated-value computation processing section 127.

The integrated-value computation processing section 127 determines pixels each meeting a given condition on the basis of the R, G and B synthesized images and the long/short exposure-time select flag FLGLS, carrying out processing to integrate the values of every pixel. Finally, the integrated-value computation processing section 127 outputs every integration result of R, G and B images obtained as a result of the processing carried out on pixels of the entire screen to the CPU 130.

The given condition mentioned above implies area specification, which is specification of position coordinates of an image, and specification of a range from a certain level of a pixel value to another certain level of the pixel value. In addition, the given condition may also imply a condition requiring the long/short exposure-time select flag FLGLS to indicate that the long exposure-time image or the short exposure-time image has been selected.

In the following description, the integration results produced by the integrated-value computation processing section 127 are referred to as Sum_R_Long, Sum_G_Long, Sum_B_Long, Sum_R_Short, Sum_G_Short and Sum_B_Short.

From the R, G and B integration results supplied by the integrated-value computation processing section 127, the CPU 130 computes the white-balance gains WBG_R_Long, WBG_G_Long and WBG_B_Long for the long exposure-time image as well as the white-balance gains WBG_R_Short, WBG_G_Short and WBG_B_Short for the short exposure-time image.

As a method for computing the white-balance gains, the CPU 130 adopts a computation method like a typical one based on Equations (1-1) to (1-6) given below. However, the computation method based on Equations (1-1) to (1-6) is no more than a typical method or the computation method adopted by the CPU is not limited particularly to this typical method. That is to say, the CPU 130 may adopt any computation method as long as the method is an existing method according to a technology in related art.

[Equations 1]

$$WBG\_R\_Long = Sum\_G\_Long / Sum\_R\_Long \quad (1\text{-}1)$$

$$WBG\_G\_Long = 1.0 \quad (1\text{-}2)$$

$$WBG\_B\_Long = Sum\_G\_Long / Sum\_B\_Long \quad (1\text{-}3)$$

$$WBG\_R\_Short = Sum\_G\_Short / Sum\_R\_Short \quad (1\text{-}4)$$

$$WBG\_G\_Short = 1.0 \quad (1\text{-}5)$$

$$WBG\_B\_Short = Sum\_G\_Short / Sum\_B\_Short \quad (1\text{-}6)$$

Detailed Description of the Synthesizing Processing

The following description explains details of a synthesizing method for suppressing a false color generated in a blend area.

Figure 11:
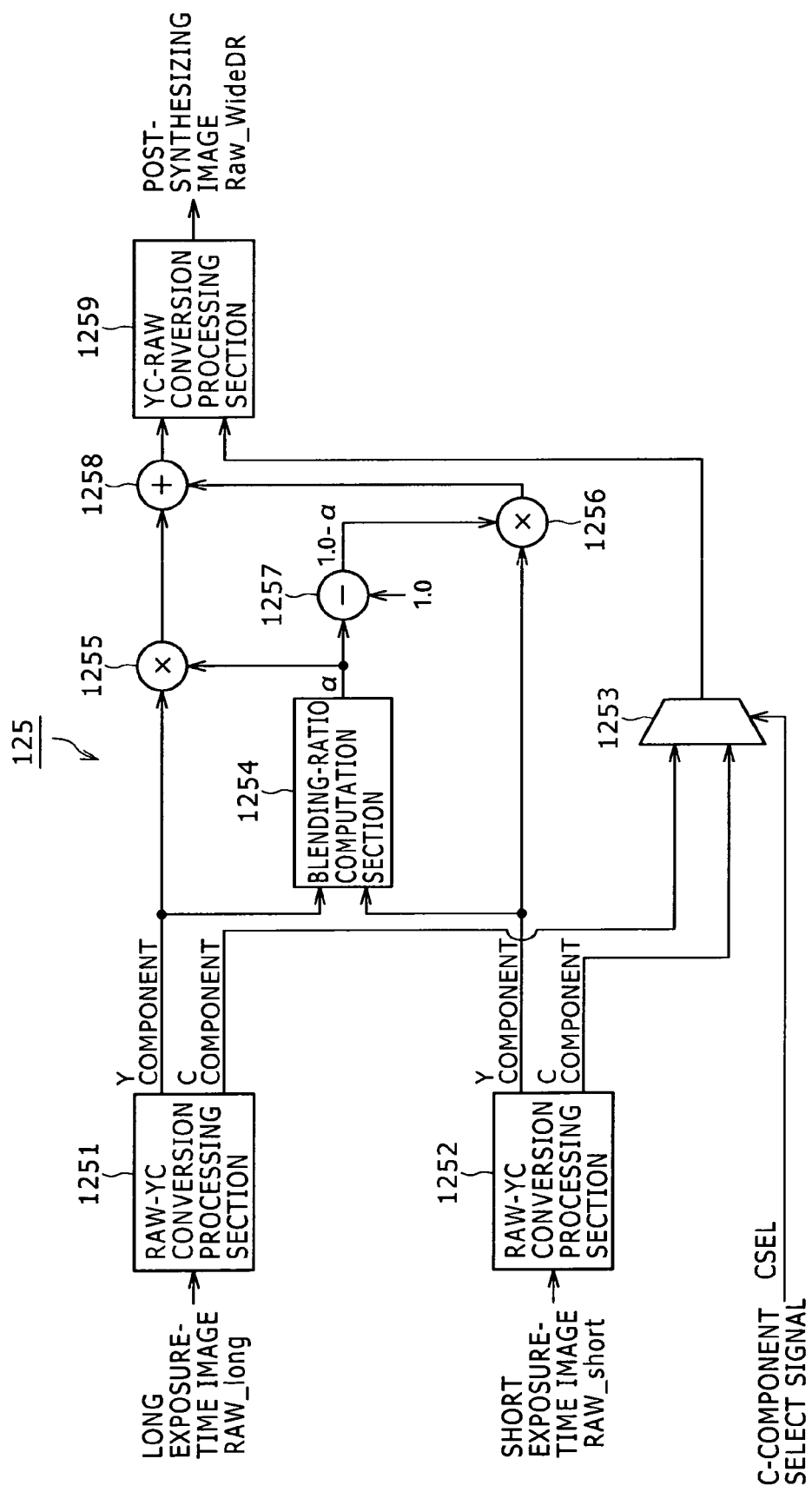
FIG. 11 is a block diagram showing a typical configuration of a synthesizing processing section adopting a synthesizing method for suppressing a false color generated in a blend area in accordance with the first embodiment.

FIG. 11 is a block diagram showing a typical configuration of the synthesizing processing section 125 adopting a synthesizing method for suppressing a false color generated in a blend area in accordance with the first embodiment.

As shown in the figure, the synthesizing processing section 125 employs RAW-YC conversion processing sections 1251 and 1252, a selector 1253, a blending-ratio computation section 1254, multipliers 1255 and 1256, a subtractor 1257, an adder 1258 and a YC-RAW conversion processing section 1259.

The RAW-YC conversion processing section 1251 carries out RAW-YC conversion processing on the RAW data RAW_Long of the long exposure-time image received by the RAW-YC conversion processing section 1251.

The RAW-YC conversion processing section 1252 carries out RAW-YC conversion processing on the RAW data RAW_Short of the short exposure-time image received by the RAW-YC conversion processing section 1252.

The RAW-YC conversion processing is processing to convert RAW data into a luminance (Y) component and a color (C) component.

The conversion formula used in the RAW-YC conversion processing varies in accordance with the origin and the evaluation value of the RAW data, the luminance (Y) component and the color (C) component. Here, the origin of the RAW data indicates which color filter has been used by the image taking device to acquire image-taking information. The color filter can be an R (Red), G (Green), B (Blue), C (Cyan), M (Magenta), Y (Yellow) or G (Green) filter. The evaluation value indicates an existing color space which can be YCrCb, YUV or YPrPb.

Equations (2-1) to (2-3) given below are typical conversion formulas of transformation into YCrCb for a case in which the color filter of the image taking device is a filter of the RGB primary-color system.

Equations (3-1) to (3-3) given below are available as equations for expressing relations between the RGB primary-color system and the CMYG complementary-color system. Thus, by substituting Equations (3-1) to (3-3) into Equations (2-1) to (2-3), the CMYG complementary-color system can be transformed into YCrCb.

[Equations 2]

$$Y = 0.257 \times R + 0.504 \times G + 0.098 \times B \quad (2\text{-}1)$$

$$Cr = -0.148 \times R - 0.291 \times G + 0.439 \times B \quad (2\text{-}2)$$

$$Cb = 0.439 \times R - 0.368 \times G - 0.071 \times B \quad (2\text{-}3)$$

[Equations 3]

$$C = 1.0 - R \quad (3\text{-}1)$$

$$M = 1.0 - G \quad (3\text{-}2)$$

$$Y = 1.0 - B \quad (3\text{-}3)$$

The equations given above are typical transformation formulas. Other transformation formulas or simplified formulas can also be used. In addition, other evaluation values can also be used as well. On top of that, there are no particular restrictions on how to make use of pixel information or surrounding-pixel information in the conversion processing described above.

As results of the conversion processing, the RAW-YC conversion processing sections 1251 and 1252 generate luminance (Y) components and color (C) components for the long exposure-time image and the short exposure-time image respectively. The luminance (Y) component is subjected to synthesizing processing making use of a blending ratio α also referred to as a mixing ratio in the blending-ratio computation section 1254, the multipliers 1255 and 1256 as well as the subtractor 1257.

In the synthesizing processing, the blending-ratio computation section 1254 computes the blending ratio α by making use of the luminance (Y) component of the long exposure-time image and the luminance (Y) component of the short exposure-time image. The method for computing the blending ratio α can be the technique explained earlier by referring to FIG. 9 or a method adopted by a modification version to be explained later.

The color (C) component is not subjected to the synthesizing processing. The color (C) component of the long exposure-time image or the color (C) component of the short exposure-time image is selected by the selector 1253 in accordance with a C-component select signal CSEL and the selected color (C) component is used by the YC-RAW conversion processing section 1259.

The selected one of the color (C) component of the long exposure-time image and the color (C) component of the short exposure-time image does not raise a problem. In the case of a system for generating an image having a wide dynamic range, however, the signal level of the short exposure-time image is low. Thus, it is quite within the bounds of possibility that a relatively large number of noises are generated in the short exposure-time image.

For the reason described above, it is quite within the bounds of possibility that a selected color (C) component of the long exposure-time image is better than a selected color (C) component of the short exposure-time image in many cases.

Finally, the YC-RAW conversion processing section 1259 makes use of the blended luminance (Y) component and the selected color (C) component to carry out processing of converting the components back into RAW data. The processing is based on a conversion method making use of formulas obtained by inverting the formulas described earlier.

As explained before, the synthesizing processing section 125 outputs a synthesized image obtained as a result of the synthesizing processing and a long/short exposure-time select flag FLGLS provided for each synthesized-image pixel of the synthesized image to indicate which of a pixel of the long exposure-time image and a pixel of the short exposure-time image has been selected as the synthesized-image pixel.

Here, in the case of the first embodiment, the value of the long/short exposure-time select flag FLGLS for the blend area indicates that the color (C) component of the long exposure-time image or the color (C) component of the short exposure-time image has been selected. Thus, a method for determining the value of the long/short exposure-time select flag FLGLS can be represented by a flowchart shown in FIG. 12.

Figure 12:
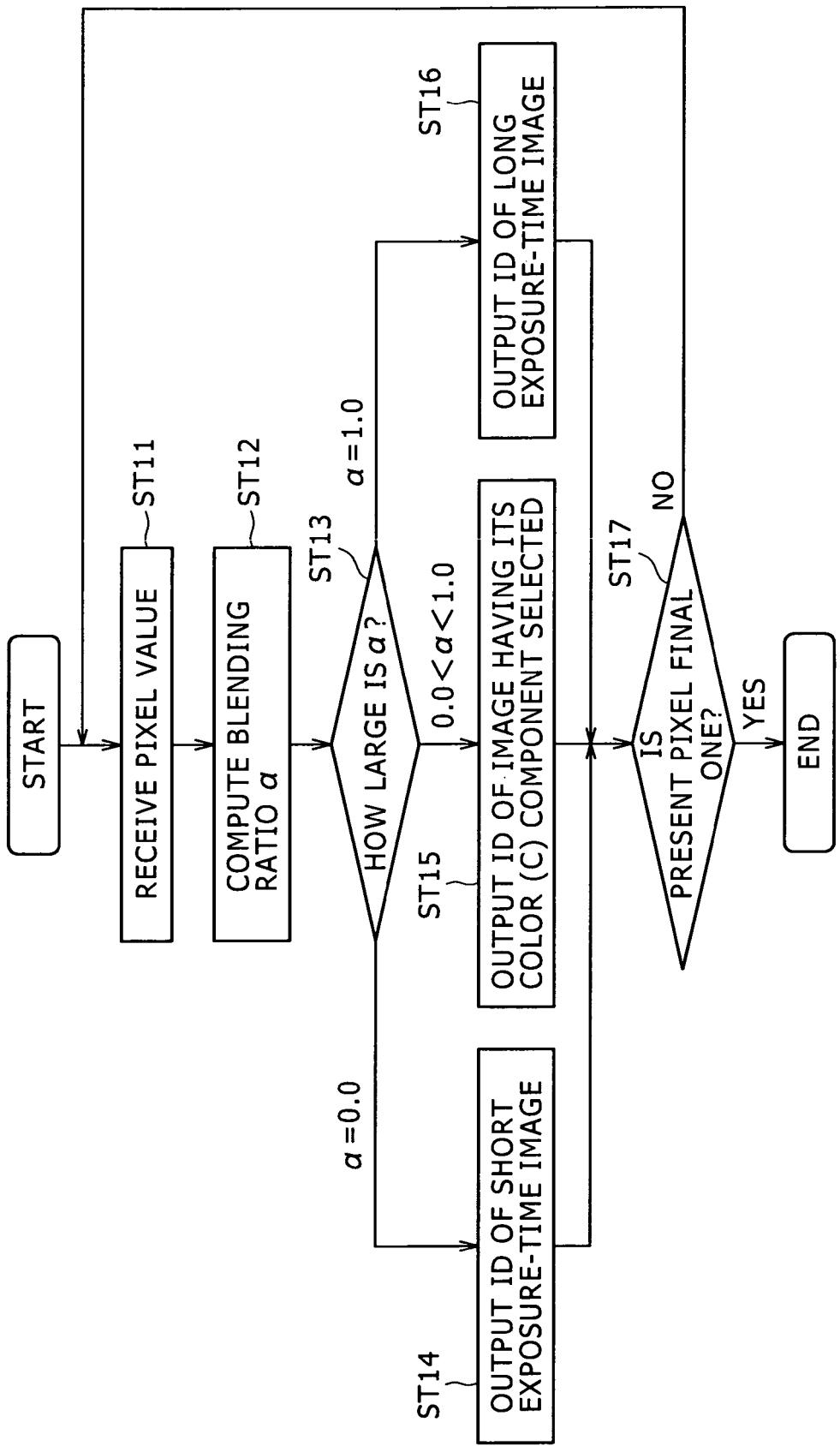
FIG. 12 shows a flowchart representing processing to determine the value of a long/short exposure-time select flag in accordance with the first embodiment.

FIG. 12 shows a flowchart representing processing to determine the value of a long/short exposure-time select flag FLGLS in accordance with the first embodiment.

The flowchart representing the above processing begins with a step ST11 at which a pixel value is received. Then, at the next step ST12, a blending ratio α is computed. If the computed value of the blending ratio α is obtained at the next step ST13 to be 0.0, the ID (identifier) of the short exposure-time image is output at a step ST14. If the computed value of the blending ratio α is obtained at the next step ST13 to be a value in the range of 0.0<α<1.0, the ID (identifier) of an image having the color (C) component thereof selected is output at a step ST15. If the computed value of the blending ratio α is obtained at the next step ST13 to be 1.0, the ID (identifier) of the long exposure-time image is output at a step ST16.

In either case, the flow of the processing then goes on to the next step ST17 in order to determine whether or not the last pixel has been processed. The processing is carried out repeatedly till the last pixel has been processed.

The synthesizing processing section 125 according to the first embodiment has been described above.

Figure 13:
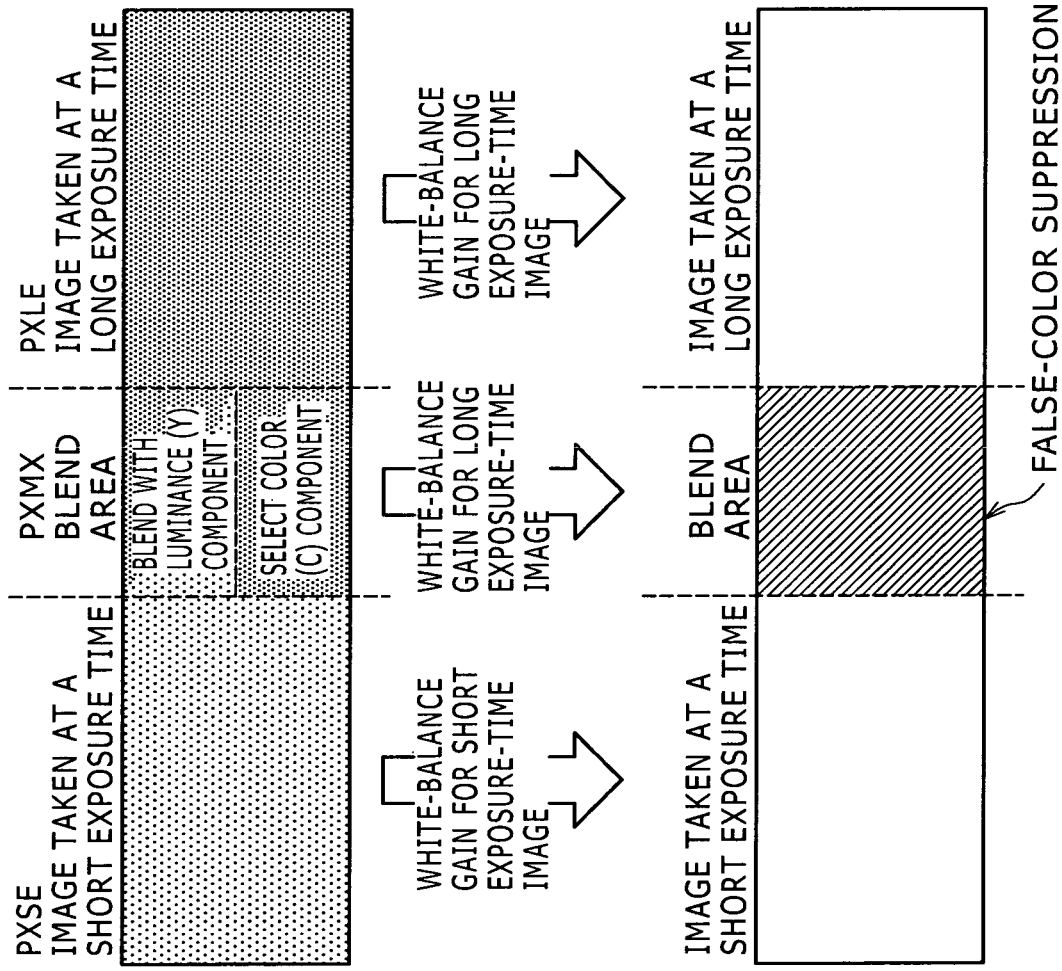
FIGS. 13A and 13B are a plurality of conceptual diagrams to be referred to in explanation of a reason why a false color generated in a blend area can be suppressed in accordance with the'first embodiment.

FIGS. 13A and 13B are conceptual diagrams referred to in the following explanation of a reason why a false color generated in a blend area can be suppressed in accordance with the first embodiment.

FIG. 13A is a conceptual diagram referred to in the following explanation of a synthesizing processing method according to the first embodiment.

In the first embodiment, the color (C) component is not subjected to synthesizing processing. That is to say, the color (C) component of an image taken at a long or short exposure time is used as it is. Thus, also in the white-balance adjustment processing section 128 provided at the rear stage, the used color (C) component is just multiplied by a white-balance gain for the color (C) component.

As a result, as shown in FIG. 13B, in a blend area PXMX, a proper white-balance gain can be used as a multiplier to suppress the false color generated in the blend area PXMX.

2: Second Embodiment

Figure 14:
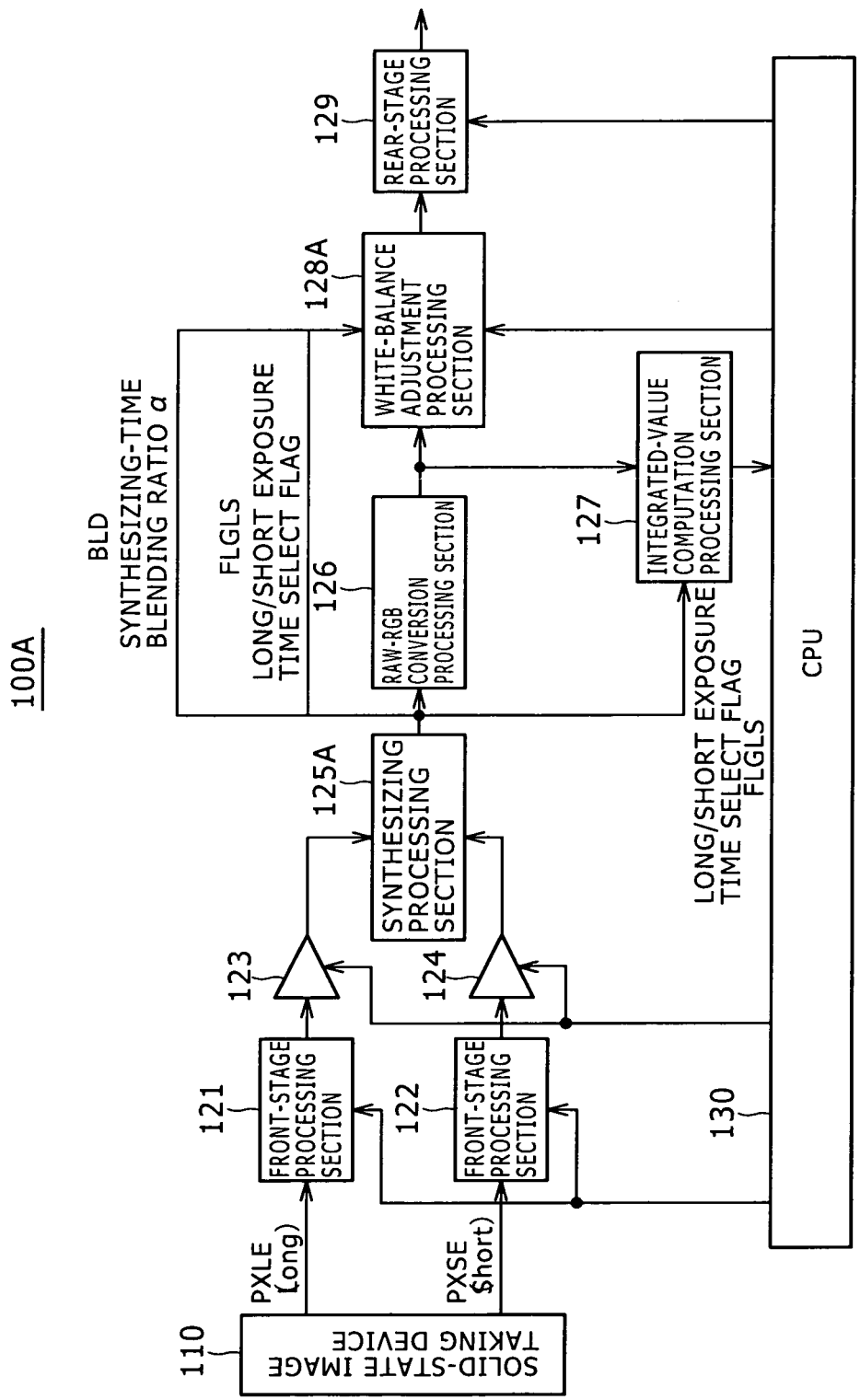
FIG. 14 is a block diagram showing a typical configuration of an image taking apparatus employing an image processing apparatus according to a second embodiment of the present disclosure.

FIG. 14 is a block diagram showing a typical configuration of an image taking apparatus 100A employing an image processing apparatus 120A according to the second embodiment of the present disclosure.

The image taking apparatus 100A according to the second embodiment is different from the image taking apparatus 100 according to the first embodiment in that, in the case of the second embodiment, a new signal is transmitted from the synthesizing processing section 125A to the white-balance adjustment processing section 128A to convey a blending ratio. The synthesizing processing section 125A and the white-balance adjustment processing section 128A will be explained in detail later.

Thus, in addition to the synthesized-image signal and the long/short exposure-time select flag FLGLS, the synthesizing processing section 125A in the second embodiment also outputs the blending ratio (BLD ratio) a used in the synthesizing processing to the white-balance adjustment processing section 128A.

Since the other sections are identical with the corresponding ones employed in the first embodiment, their explanation is not repeated.

Detailed Description of the Synthesizing Processing

The following description explains details of a synthesizing method for suppressing a false color generated in the blend area in accordance with the second embodiment.

Figure 15:
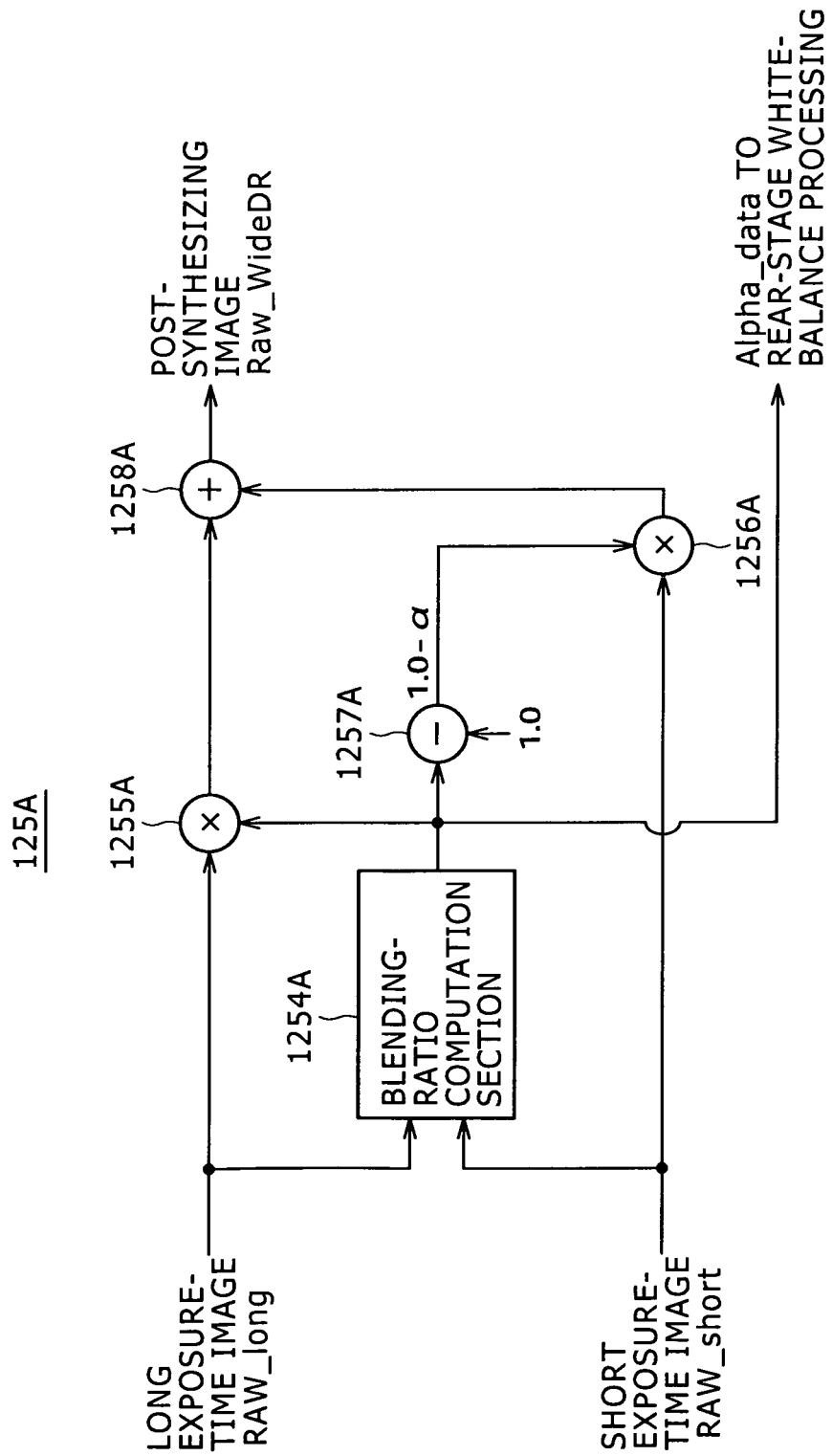
FIG. 15 is a diagram showing a typical configuration of a synthesizing processing section applying a synthesizing method to taken images in order to suppress a false color generated in a blend area in accordance with the second embodiment.

FIG. 15 is a diagram showing a typical configuration of the synthesizing processing section 125A applying the synthesizing method to taken images in order to suppress the false color generated in the blend area in accordance with the second embodiment. Components composing the synthesizing processing section 125A are explained one after another as follows.

As shown in FIG. 15, the synthesizing processing section 125A employs a blending-ratio computation section 1254A, multipliers 1255A and 1256A, a subtractor 1257A and an adder 1258A.

First of all, the synthesizing processing section 125A carries out synthesizing processing on the RAW data RAW_Long of the long exposure-time image and the RAW data RAW_Short of the short exposure-time image.

In the synthesizing processing, the blending-ratio computation section 1254A computes the blending ratio $\alpha$ by making use of the RAW data RAW_Long of the long exposure-time image and the RAW data RAW_Short of the short exposure-time image. As the method for computing the blending ratio $\alpha$, the blending-ratio computation section 1254A may adopt the technique explained earlier by referring to FIG. 9 or a method adopted by a modification version to be explained later.

The RAW data is blended by the multipliers 1255A and 1256A on the basis of the computed blending ratio $\alpha$ which is also output by the synthesizing processing section 125A to the white-balance adjustment processing section 128A provided at the rear stage.

The above description explains the synthesizing processing section 125A according to the second embodiment.

Detailed Description of the White-Balance Adjustment Processing

The following description explains details of a white-balance adjustment method adopted by the white-balance adjustment processing section 128A according to the second embodiment to suppress a false color generated in a blend area.

Figure 16:
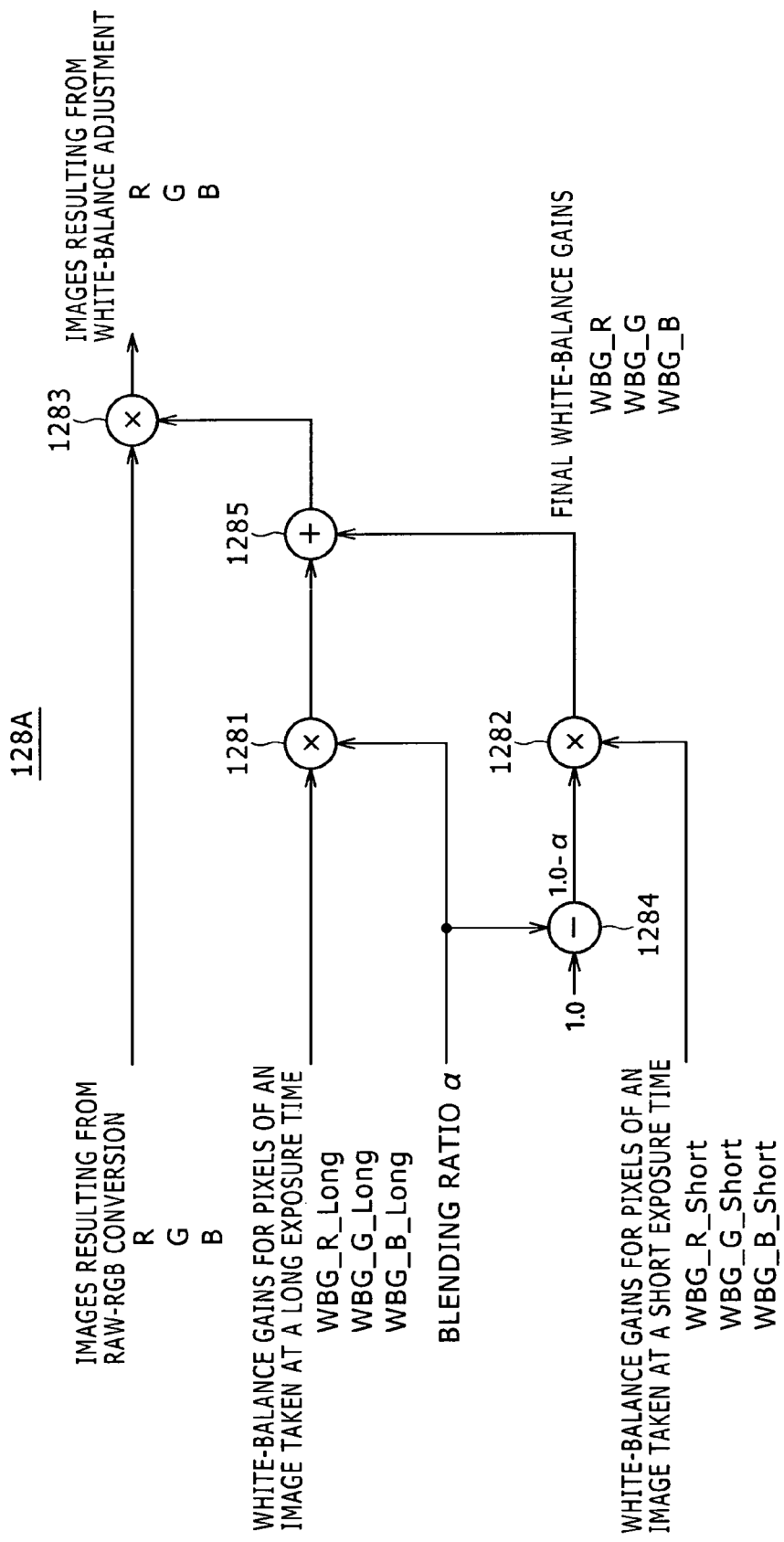
FIG. 16 is a diagram showing a typical configuration of a white-balance adjustment processing section applying a synthesizing method to white-balance gains in order to suppress a false color generated in a blend area in accordance with the second embodiment.

FIG. 16 is a diagram showing a typical configuration of a white-balance adjustment processing section 128A applying the synthesizing method to white-balance gains in order to suppress a false color generated in a blend area in accordance with the second embodiment.

As shown in FIG. 16, the white-balance adjustment processing section 128A employs multipliers 1281 to 1283, a subtractor 1284 and an adder 1285.

Figure 4:
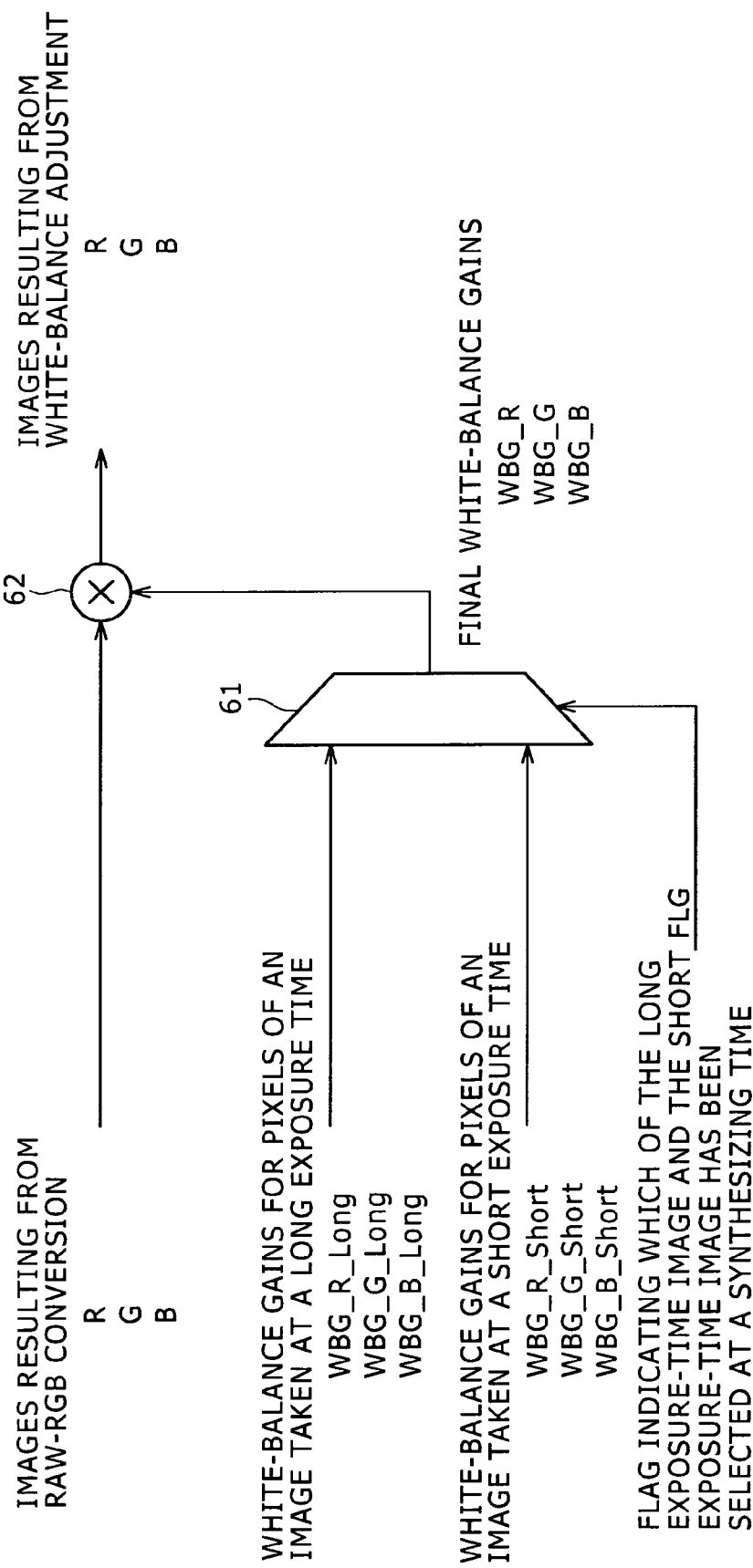
FIG. 4 is a diagram showing a typical configuration of a white-balance adjustment processing section provided at a rear stage.
Figure 5:
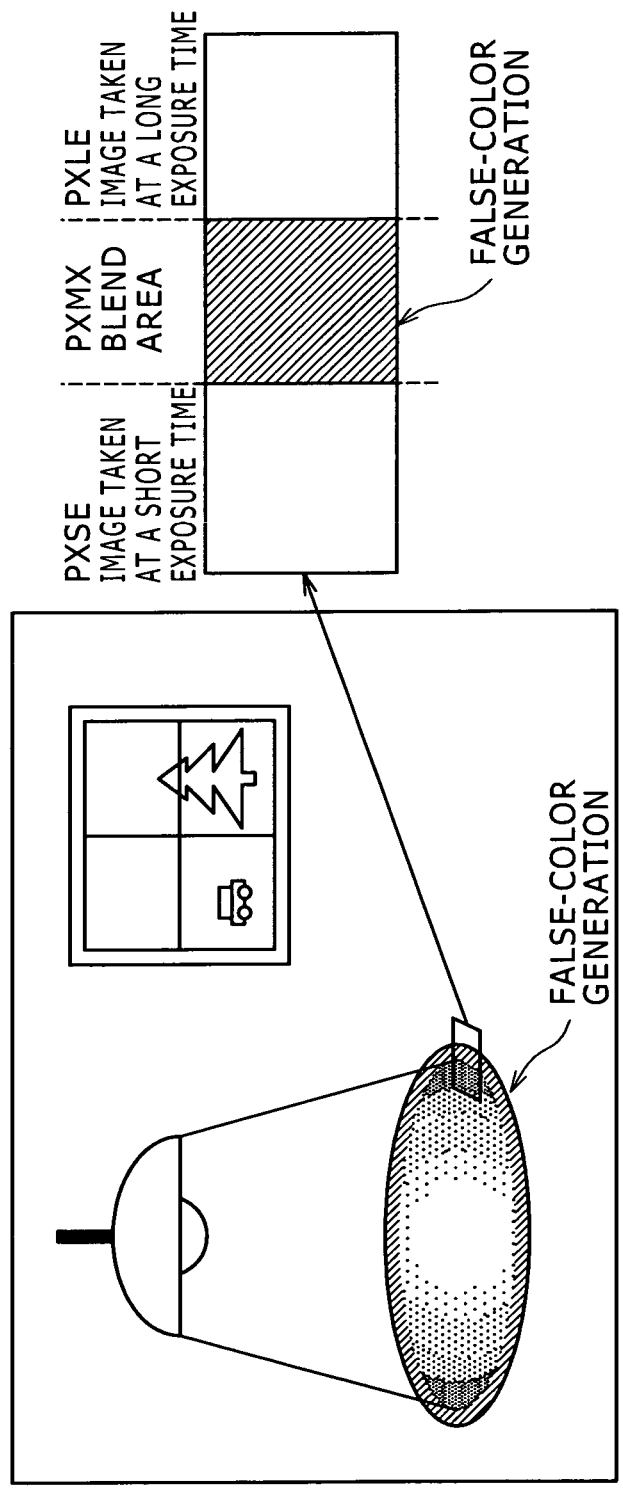
FIG. 5 is an explanatory diagram to be referred to in description of a false color generated in a blend area.
Figure 6:
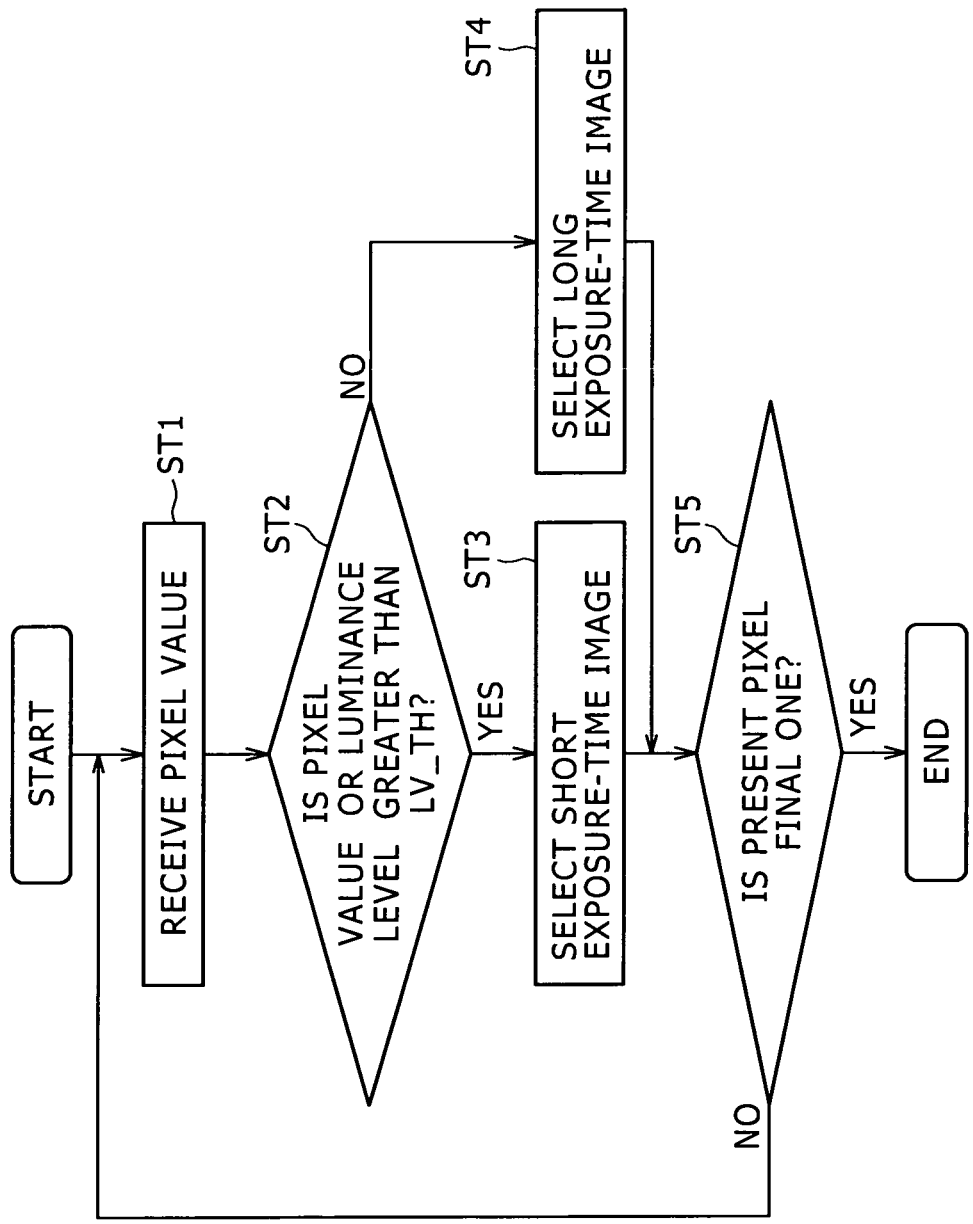
FIG. 6 shows a flowchart representing pixel selection processing carried out at a synthesized-image generation time.
Figure 7:
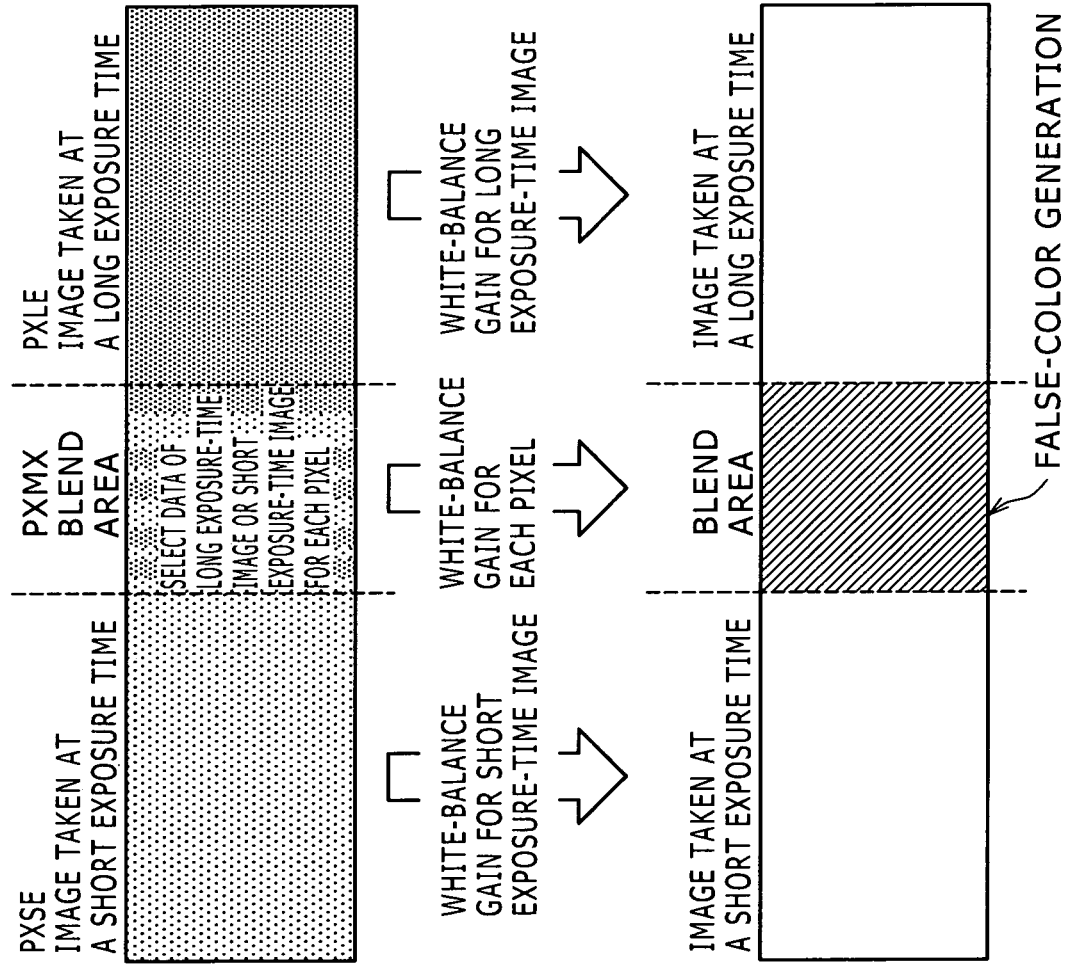
FIGS. 7A and 7B are a plurality of explanatory diagrams to be referred to in describing causes of generation of a false color in a blend area at a short or long exposure-time image selection time in accordance with a technology in related art.
Figure 8:
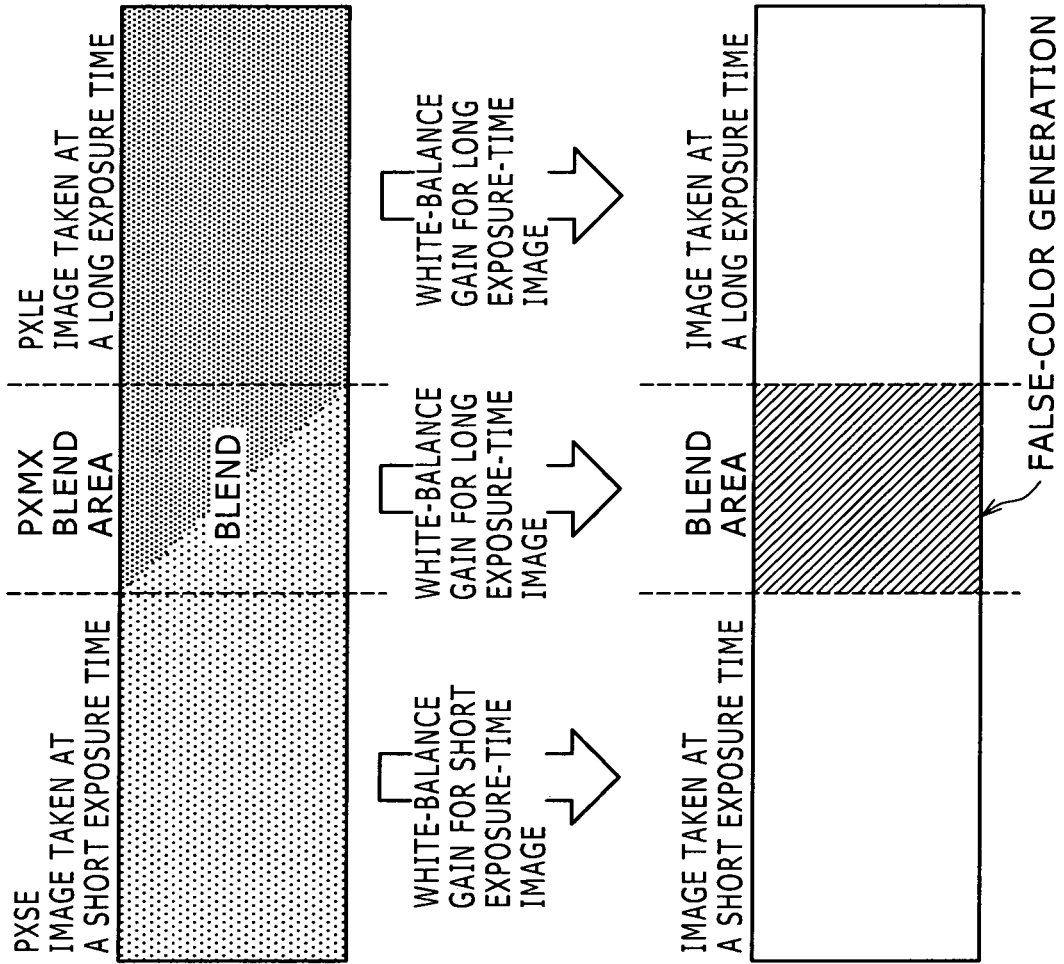
FIGS. 8A and 8B are a plurality of explanatory diagrams to be referred to in describing causes of generation of a false color in a blend area at a blending time in accordance with a technology in related art.

In accordance with an existing technology, the white-balance adjustment processing is carried out by making use of the long/short exposure-time select flag FLGLS as shown in FIG. 4.

In the white-balance adjustment processing section 128A according to the second embodiment, on the other hand, the long/short exposure-time select flag FLGLS is not used. Instead, the white-balance adjustment processing is carried out by making use of a blending ratio $\alpha$ received from the synthesizing processing section 125A for every pixel as a ratio used in synthesizing processing. The sequence of the white-balance adjustment processing is described as follows.

Signals input to the white-balance adjustment processing section 128A include R, G and B images obtained as a result of RAW-RGB conversion and the blending ratio $\alpha$ used in the synthesizing processing. In addition, input signals supplied to the white-balance adjustment processing section 128A also include the white-balance gains WBG_R_Long, WBG_G_Long and WBG_B_Long for the long exposure-time image as well as the white-balance gains WBG_R_Short, WBG_G_Short and WBG_B_Short for the short exposure-time image. These white-balance gains have been computed by the CPU 130 on the basis of RGB integrated values.

On the basis of the blending ratio $\alpha$ used in the synthesizing processing, the circuit of the white-balance adjustment processing section 128A shown in FIG. 16 computes final white-balance gains WBG_R, WBG_G and WBG_B for every pixel from the white-balance gains WBG_R_Long, WBG_G_Long and WBG_B_Long for the long exposure-time image as well as the white-balance gains WBG_R_Short, WBG_G_Short and WBG_B_Short for the short exposure-time image.

Then, white-balance adjustment processing is carried out on the R, G and B images by making use of the final white-balance gains WBG_R, WBG_G and WBG_B.

The white-balance adjustment processing section 128A according to the second embodiment has been explained above.

In the case of the existing white-balance adjustment processing section, pixels of one screen serve as a multiplicand whereas two groups of multipliers are used for the multiplicand. The first group has the white-balance gains WBG_R_Long, WBG_G_Long and WBG_B_Long for the long exposure-time image whereas the second group has the white-balance gains WBG_R_Short, WBG_G_Short and WBG_B_Short for the short exposure-time image.

In the case of the second embodiment, on the other hand, the white-balance adjustment processing section 128A is utilized in order to make it possible to make use of white-balance gains, which each vary from pixel to pixel, as a multiplier. As a result, combinations of a number of white-balance gains are used as multipliers for pixels on one screen.

The above description explains the synthesizing processing section 125A and the white-balance adjustment processing section 128A which are included in the second embodiment.

Figures 17A, 17B:
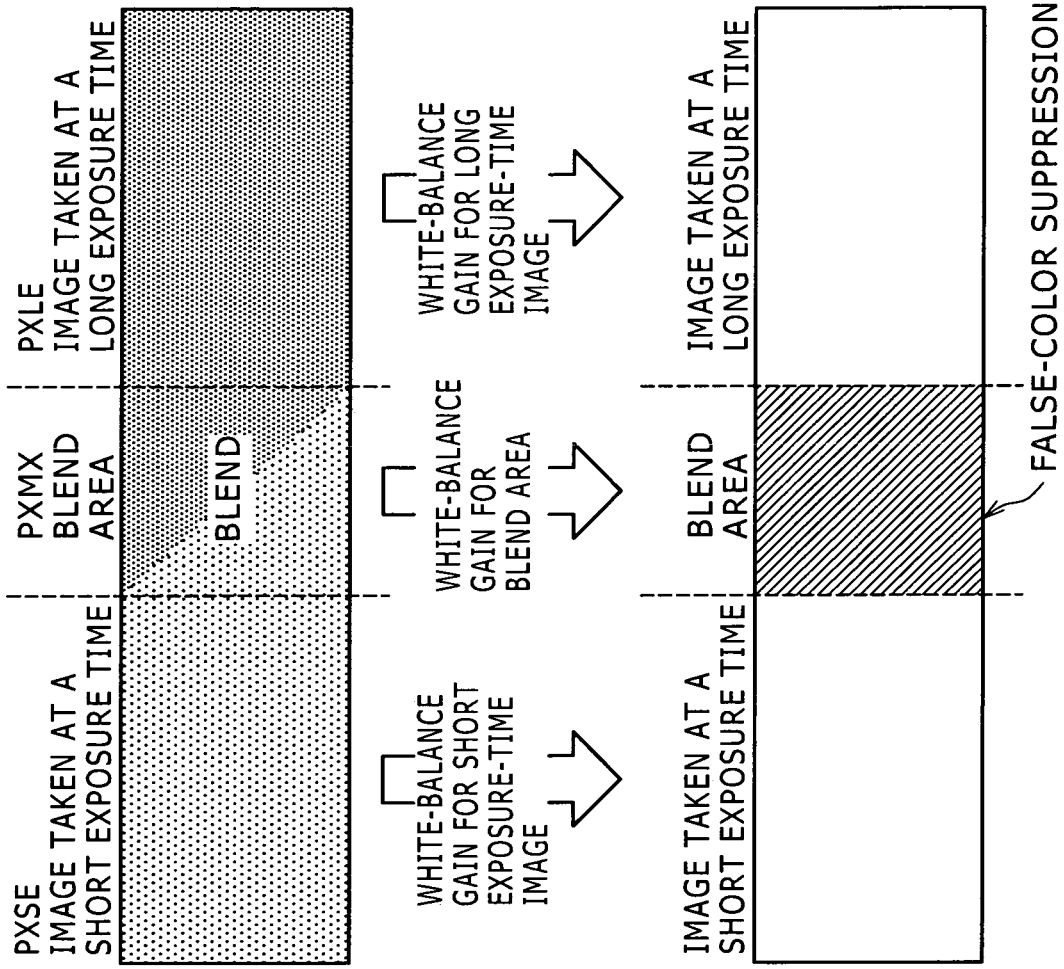
FIGS. 17A and 17B are a plurality of conceptual diagrams to be referred to in explanation of a reason why a false color generated in a blend area can be suppressed by making use of the synthesizing processing section and the white-balance adjustment processing section which are provided in accordance with the second embodiment.

FIGS. 17A and 17B are conceptual diagrams of explaining a reason why a false color generated in a blend area can be suppressed by making use of the synthesizing processing section 125A and the white-balance adjustment processing section 128A which are provided in accordance with the second embodiment.

FIG. 17A is a conceptual diagram of synthesizing processing carried out in accordance with the second embodiment.

In accordance with the second embodiment, the synthesizing processing section 125A carries out the synthesizing processing on the RAW data of the long exposure-time image and the RAW data of the short exposure-time image in the same way as the existing technology.

The white-balance adjustment processing section 128A according to the second embodiment multiplies the value of every pixel in the blend area, in which the RAW data of the long exposure-time image has been blended with the RAW data of the short exposure-time image, by a white-balance gain obtained by the CPU 130 for the pixel. In this way, for every pixel, it is possible to carry out white-balance adjustment based on the blending ratio used in the synthesizing processing.

As a result, it is possible to solve the problem of the technique in related art by substantially suppressing the false color generated in the blend area as shown in FIG. 17B.

3: Third Embodiment

In an embodiment described below as the third embodiment of the present disclosure, processing to compute the blending ratio α used in the synthesizing processing includes static/dynamic-state determination.

Figure 18:
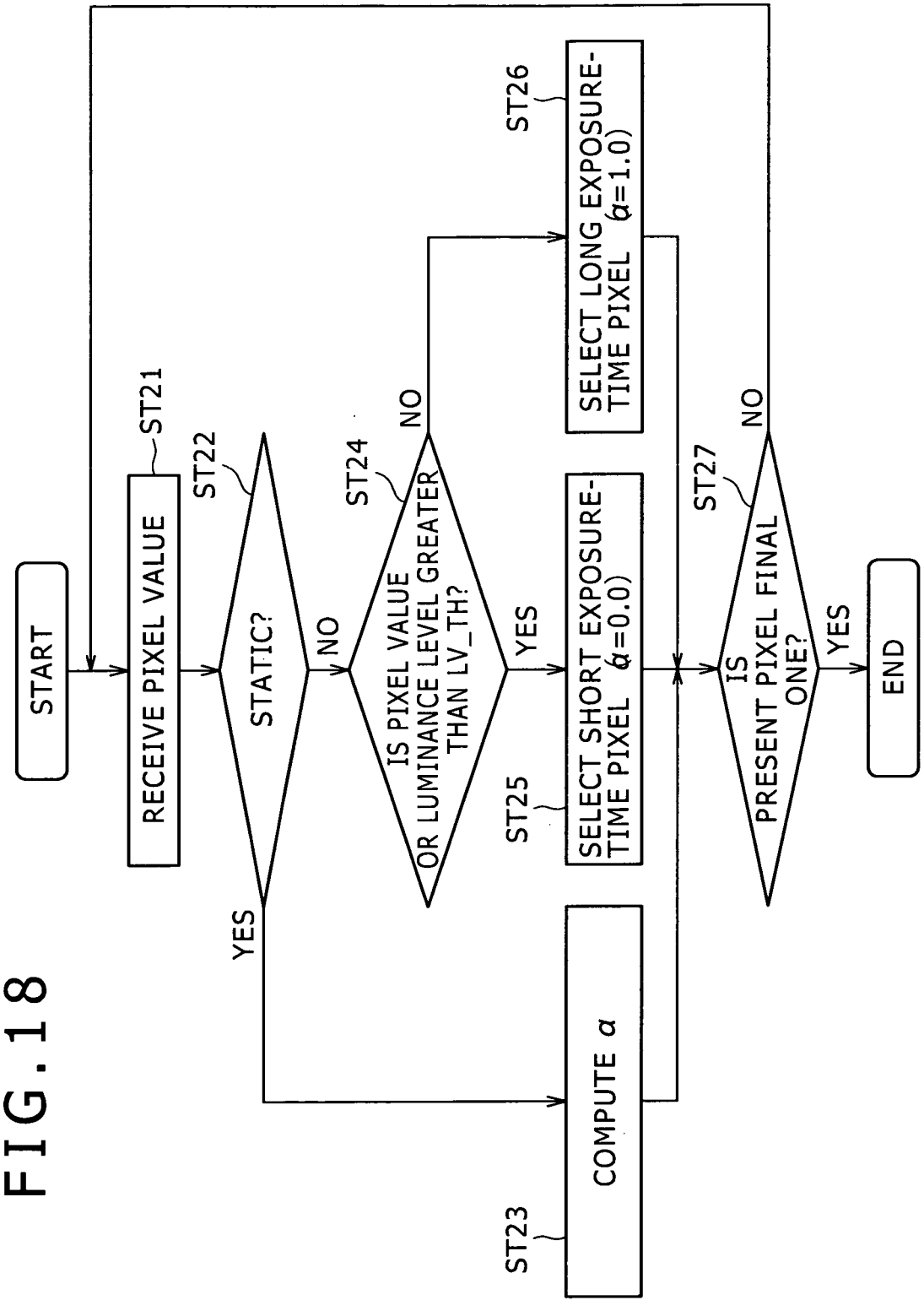
FIG. 18 shows a flowchart representing processing to compute a blending ratio in accordance with a third embodiment of the present disclosure.

FIG. 18 shows a flowchart representing processing to compute the blending ratio in accordance with the third embodiment of the present disclosure.

Typical Processing to Compute the Blending Ratio α by Making Use of Static/Dynamic-State Determination The method explained before by referring to FIG. 9 is adopted by the first and second embodiments as a method for computing the blending ratio α.

Since there is a small difference in image taking time between the long exposure-time image and the short exposure-time image, however, a moving object may pass through during this short time difference. If a moving object passes through during this short time difference, the moving object probably exists only on the long exposure-time image or the short exposure-time image in some cases.

Figure 9:
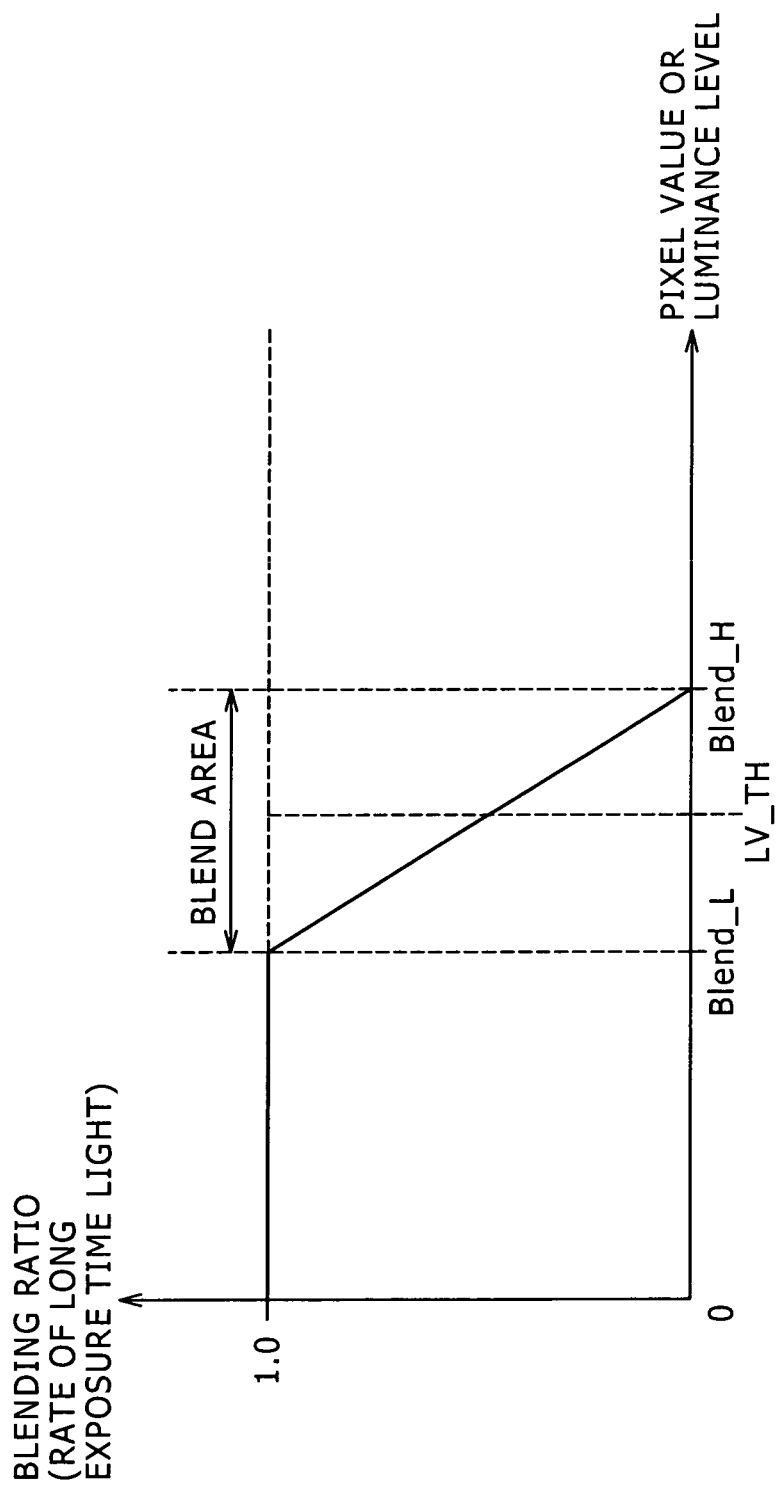
FIG. 9 is a diagram showing a graph representing the relation between a blending ratio and a pixel value or a luminance level.

In such cases, if the synthesizing processing is carried out by making use of a blending ratio obtained in accordance with the level of the pixel as shown in FIG. 9, as a result, information on pixels of entirely different image-taking objects is blended. Thus, the reader may easily imagine a case in which the synthesizing processing for generating a synthesized image ends in a failure.

In order to solve the problem described above, in the case of the third embodiment, the flowchart shown in FIG. 18 includes a step ST22 executed to determine whether a pixel or a pixel area also referred to as a pixel block is a static one pertaining to an image of an image taking object or a dynamic one pertaining to an image of a moving object.

If the pixel or the pixel area is determined to be a static one, the value of the blending ratio α is computed at a step ST23.

If the pixel or the pixel area is determined to be a dynamic one, on the other hand, the blending processing is not carried out. Instead, the pixel value or the luminance level is compared with a threshold value LV_TH at a step ST24. In accordance with the result of the comparison, the short exposure-time image is selected at a step ST25, or the long exposure-time image is selected at a step ST26.

The processing represented by this flowchart can also be carried out in the first and second embodiments.

Figure 19:
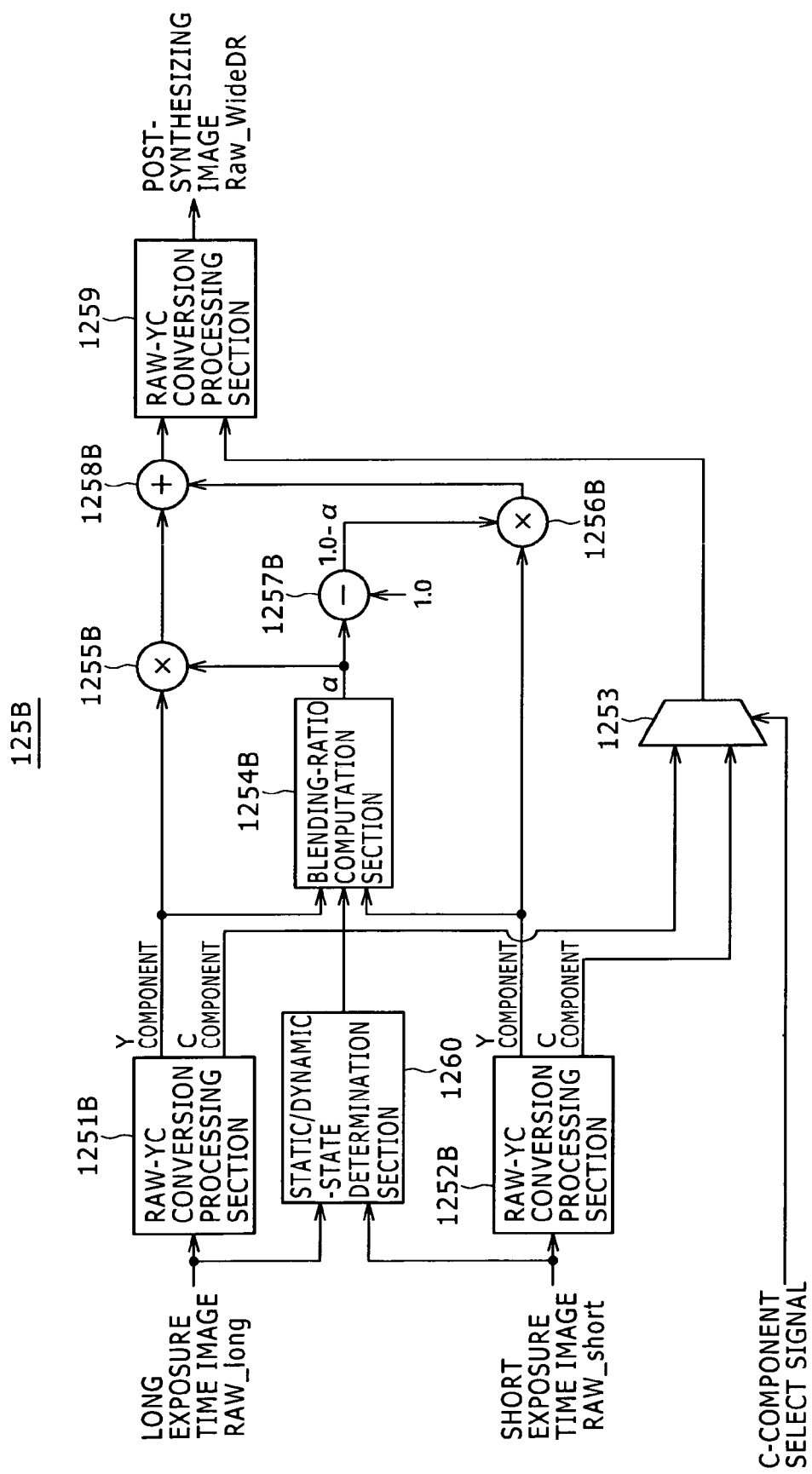
FIG. 19 is a block diagram showing a typical configuration of a synthesizing processing section provided with a static/dynamic-state determination function according to the third embodiment to serve as a modification of the synthesizing processing section shown in FIG. 11.

FIG. 19 is a block diagram showing a typical configuration of a synthesizing processing section 125B provided with a static/dynamic-state determination function according to the third embodiment to serve as a modification of the synthesizing processing section 125 shown in FIG. 11.

As shown in FIG. 19, the synthesizing processing section 125B employs RAW-YC conversion processing sections 1251B and 1252B, a selector 1253, a blending-ratio computation section 1254B, multipliers 1255B and 1256B, a subtractor 1257B, an adder 1258B, a YC-RAW conversion processing section 1259B and a static/dynamic-state determination section 1260.

These sections carry out their respective pieces of processing in order to accomplish the synthesizing processing described above.

Figure 20:
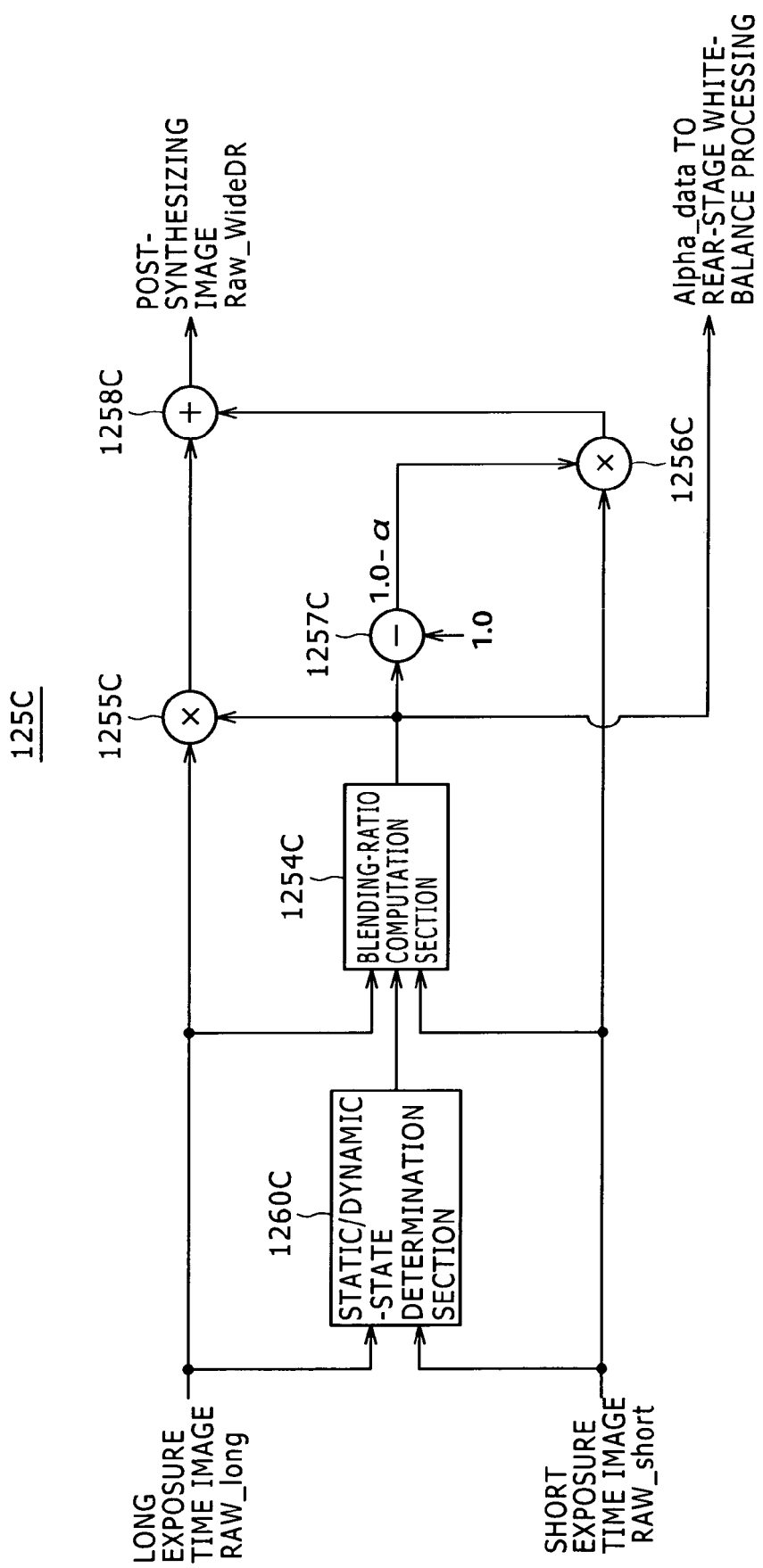
FIG. 20 is a block diagram showing a typical configuration of a synthesizing processing section provided with a static/dynamic-state determination function according to the third embodiment to serve as a modification of the synthesizing processing section shown in FIG. 15.

FIG. 20 is a block diagram showing a typical configuration of a synthesizing processing section 125C provided with a static/dynamic-state determination function according to the third embodiment to serve as a modification of the synthesizing processing section 125A shown in FIG. 15.

As shown in FIG. 20, the synthesizing processing section 125C employs a blending-ratio computation section 1254C, multipliers 1255C and 1256C, a subtractor 1257C, an adder 1258C and a static/dynamic-state determination section 1260C.

These sections carry out their respective pieces of processing in order to accomplish the synthesizing processing described above.

4: Fourth Embodiment

Each of fourth and fifth embodiments of the present disclosure implements a typical configuration in which the blending ratio α is computed and delay adjustment is carried out in order to cope with the delayed white-balance gains for suppression processing.

Figure 21:
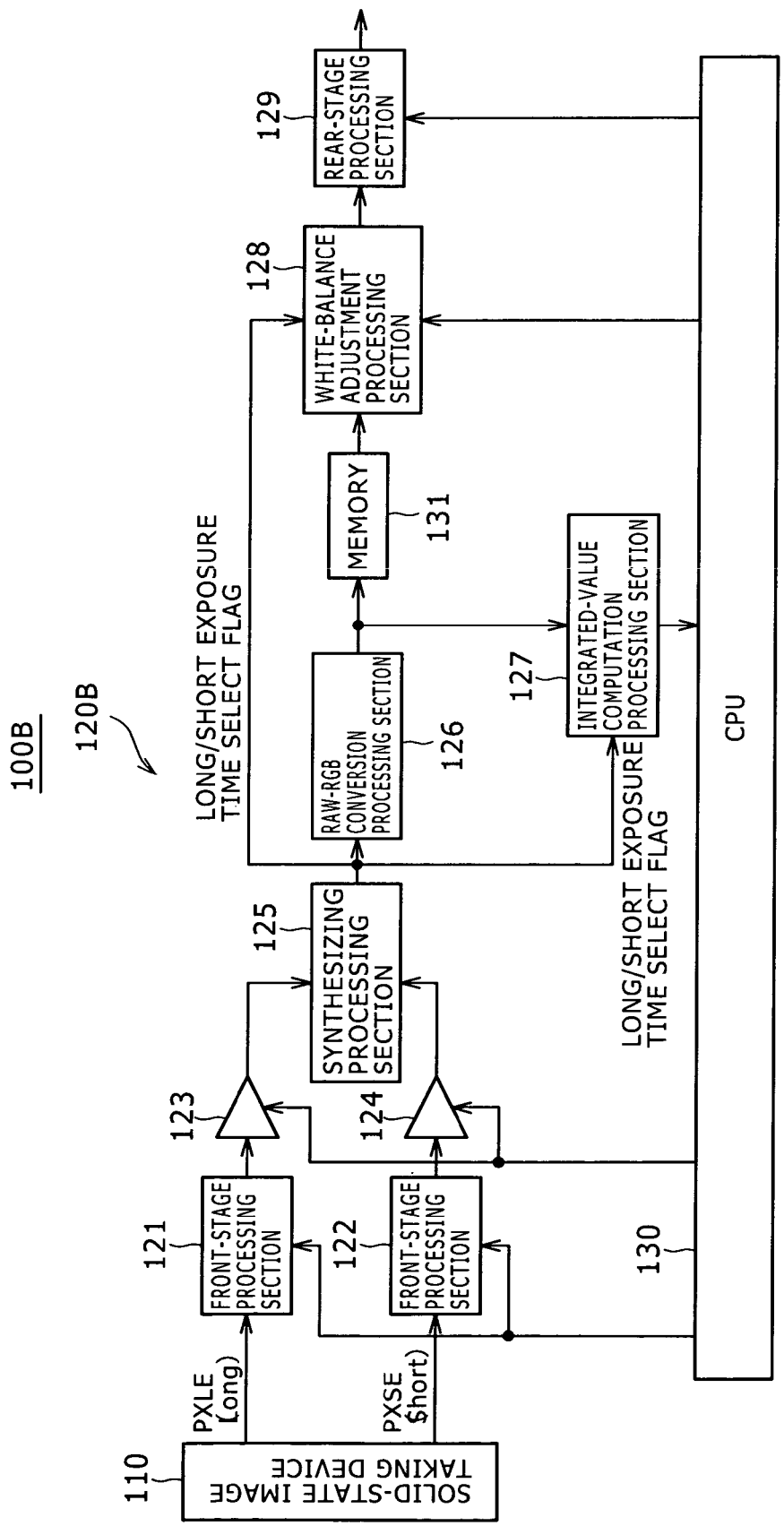
FIG. 21 is a block diagram showing a typical configuration of an image taking apparatus employing an image processing apparatus according to a fourth embodiment of the present disclosure.

FIG. 21 is a block diagram showing a typical configuration of an image taking apparatus 100B employing an image processing apparatus 120B according to the fourth embodiment of the present disclosure.

The image taking apparatus 100B according to the fourth embodiment is different from the image taking apparatus 100 according to the first embodiment in that the image taking apparatus 100B employs an additional memory 131 for the delay adjustment. The delay adjustment is carried out in order to make a frame, from which evaluation values have been computed, the same as a frame for which white-balance gains have been computed for the white-balance adjustment processing.

5: Fifth Embodiment

The fifth embodiment of the present disclosure implements a typical configuration in which the blending ratio α is computed and delay adjustment is carried out in order to cope with delayed white-balance gains for suppression processing.

Figure 22:
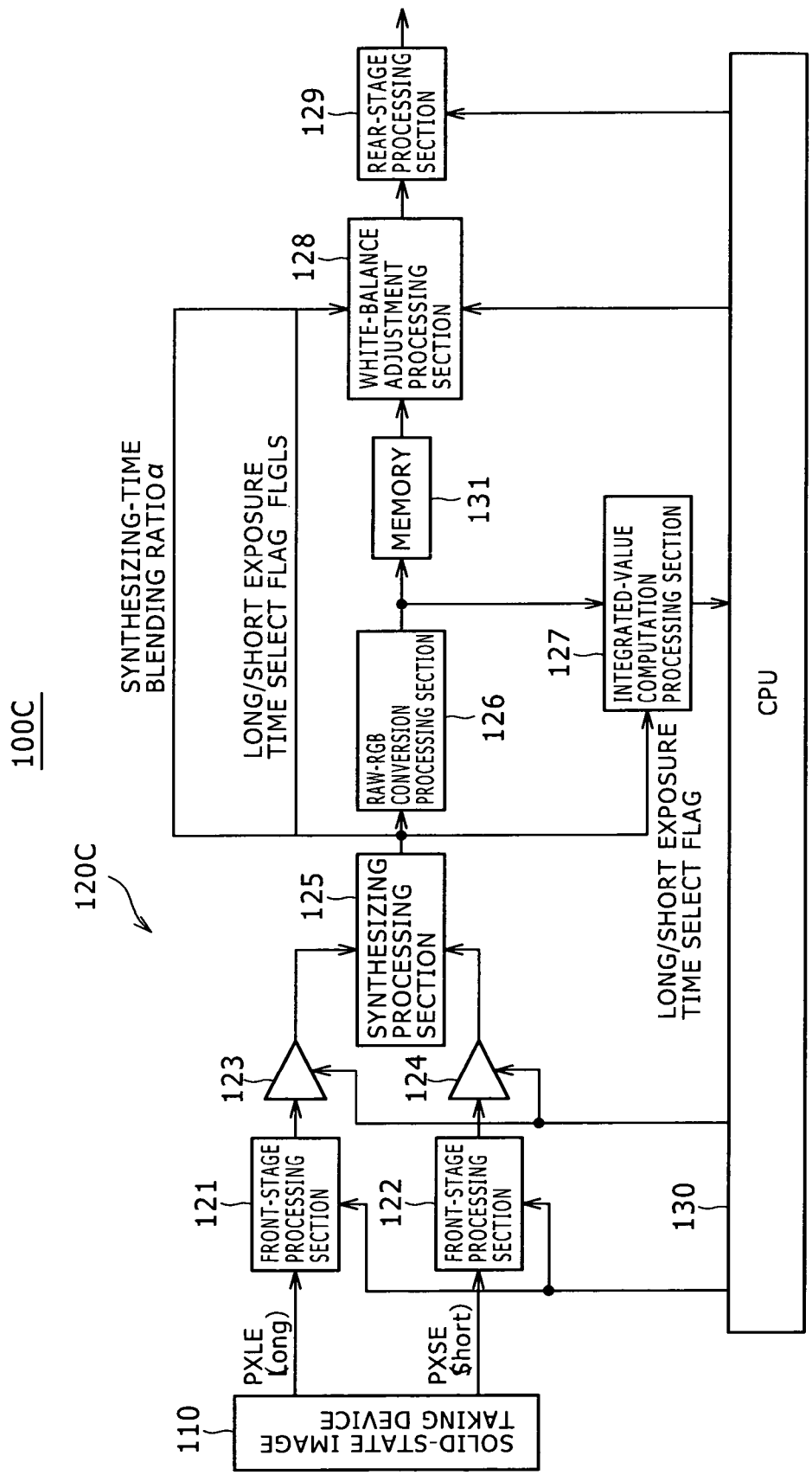
FIG. 22 is a block diagram showing a typical configuration of an image taking apparatus employing an image processing apparatus according to a fifth embodiment of the present disclosure.

FIG. 22 is a block diagram showing a typical configuration of an image taking apparatus 100C employing an image processing apparatus 120C according to the fifth embodiment of the present disclosure.

The image taking apparatus 100C according to the fifth embodiment is different from the image taking apparatus 100A according to the second embodiment in that the image taking apparatus 100C employs an additional memory 131 for delay adjustment. The delay adjustment is carried out in order to make a frame, from which evaluation values have been computed, the same as a frame for which white-balance gains have been computed for the white-balance adjustment processing.

Delay Adjustment for Blending Ratio α and White-Balance Gains for Suppression Processing In the first and second embodiments, the white-balance gains for each of the long exposure-time image and the short exposure-time image are computed from integration results by adoption of the ordinary technique. In accordance with the ordinary technique, in the integration processing carried out to produce the integration results by the integrated-value computation processing section 127 of the configurations shown in FIGS. 10 and 14, pixels of the entire screen are used.

Accordingly, in order to complete the integration processing, it takes time longer than a time period corresponding to at least one frame. As a result, the computation of the white-balance gains to be supplied to the white-balance adjustment processing section 128 or 128A in the CPU 130 are delayed.

In addition, the CPU 130 also carries out processing to compute evaluation values from the integration values so that it also takes time as well to compute the evaluation values. Thus, in the case of the first and second embodiments, a frame from which evaluation values have been computed from the integration results obtained by carrying out the integration processing is different from a frame for which white-balance gains are computed for the white-balance adjustment processing. That is to say, a frame from which evaluation values have been computed is different from a frame for which the white-balance adjustment is to be executed by making use of the white-balance gains in actuality.

By making use of the circuits according to the first and second embodiments as well as the processing method adopted by these embodiments, white-balance adjustment proper for every individual pixel can be carried out in comparison with the ordinary technique. Due to this frame difference, it is quite within the bounds of possibility that the performance to suppress the false color deteriorates.

In the case of the fourth and fifth embodiments, on the other hand, the memory 131 is added for delay adjustment in order to make a frame, from which evaluation values have been computed, the same as a frame for which white-balance gains have been computed for the white-balance adjustment processing.

By adding the memory 131 to each of the image taking apparatus 100 shown in FIG. 10 and the image taking apparatus 100A shown in FIG. 14 to obtain respectively image taking apparatus 100B shown in FIG. 21 and the image taking apparatus 100C shown in FIG. 22 as described above, it is possible to carry out delay adjustment in the image taking apparatus 100B and the image taking apparatus 100C.

6: Sixth Embodiment

In the sixth embodiment of the present disclosure, the long/short exposure-time select flag FLGLS is omitted.

Figure 23:
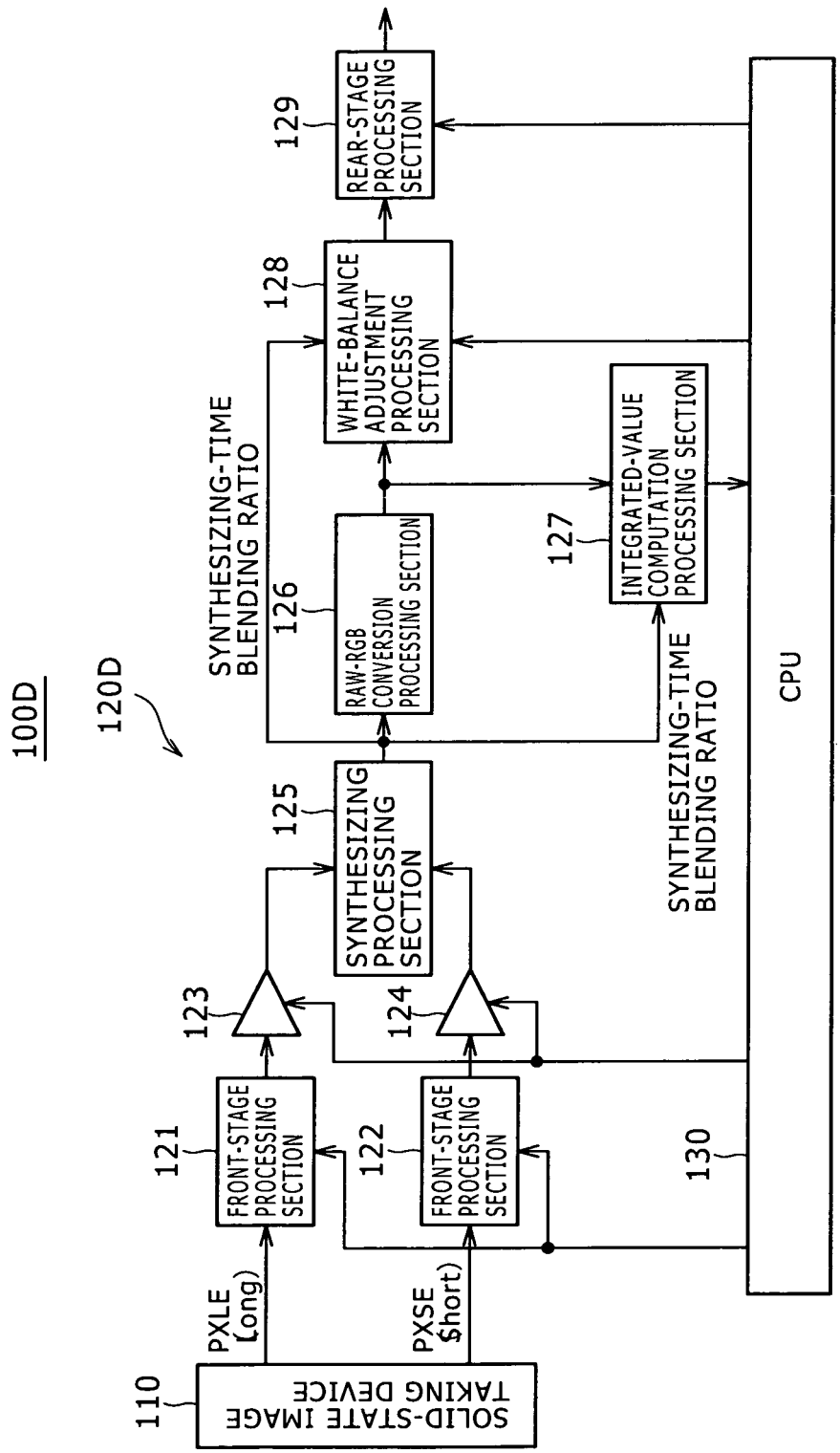
FIG. 23 is a block diagram showing a typical configuration of an image taking apparatus employing an image processing apparatus according to a sixth embodiment of the present disclosure.

FIG. 23 is a block diagram showing a typical configuration of an image taking apparatus 100D employing an image processing apparatus 120D according to the sixth embodiment of the present disclosure.

The image taking apparatus 100D according to the sixth embodiment is different from the image taking apparatus 100A according to the second embodiment in that, in the case of the image taking apparatus 100D according to the sixth embodiment, the long/short exposure-time select flag. FLGLS is omitted.

Typical Configuration without the Long/Short Exposure-Time Select Flag

The long/short exposure-time select flag FLGLS is a signal indicating pixels of which of the long exposure-time image and the short exposure-time image have been selected in the synthesizing processing.

On the other hand, as shown in FIGS. 9 and 12, the value of the blending ratio α proposed in the second embodiment can be used to indicate that the pixels of the long exposure-time image only or that the pixels of the short exposure-time image only have been selected.

To put it concretely, $\alpha=1.0$ indicates that the pixels of the long exposure-time image have been selected whereas $\alpha=0.0$ indicates that the pixels of the short exposure-time image have been selected.

As is obvious from the above description, in the case of the second embodiment, the long/short exposure-time select flag FLGLS can be replaced by the blending ratio α. Thus, it is not necessary to make use of the long/short exposure-time select flag FLGLS.

For the reason described above, a typical configuration of an image taking apparatus 100D provided by the sixth embodiment shown in FIG. 23 is obtained by eliminating the long/short exposure-time select flag FLGLS from the configuration of the second embodiment shown in FIG. 14.

Merits of the First and Second Embodiments

Merits of the first and second embodiments are described as follows.

Merits of the First Embodiment

Since the processing according to the first embodiment is all but completed in the synthesizing processing section 125, a delay circuit (or the like) for delaying a signal supplied to the rear stage does not exist. Thus, the size of the hardware can be made small.

It is possible to make use of the color (C) component of an image signal generated by light of a long exposure time as a signal having few noises in comparison with an image signal generated by light of a short exposure time if the color (C) component of the long exposure-time image has been selected.

Merits of the Second Embodiment

Since the white-balance gain varying from pixel to pixel can be used as a multiplier, in comparison with the first embodiment, proper suppression of a false color can be carried out.

Since RAW data is blended, there is no spatial changeover point between the long exposure-time image and the short exposure-time image as long as the color (C) component is concerned. That is to say, a smooth changeover can be made. Thus, it is difficult for the user to recognize a false color even if sufficient suppression of the false color cannot be carried out.

As described above, in accordance with the first to sixth embodiments, the following effects are exhibited.

In processing to generate an image with a wide dynamic range on the basis of a plurality of images taken with exposure times different from each other, a false color generated in a blend area of the taken images can be suppressed effectively. The false color is contained in the blend area and raises a problem because the optical source varies from taken image to taken image, causing color flickers (color rolling) to be generated.

7: Seventh Embodiment

An embodiment described below as the seventh embodiment of the present disclosure is obtained by adding a color-flicker detection function to the function to suppress generation of a false color in a blend portion of the long exposure-time image and the short exposure-time image.

Figure 24:
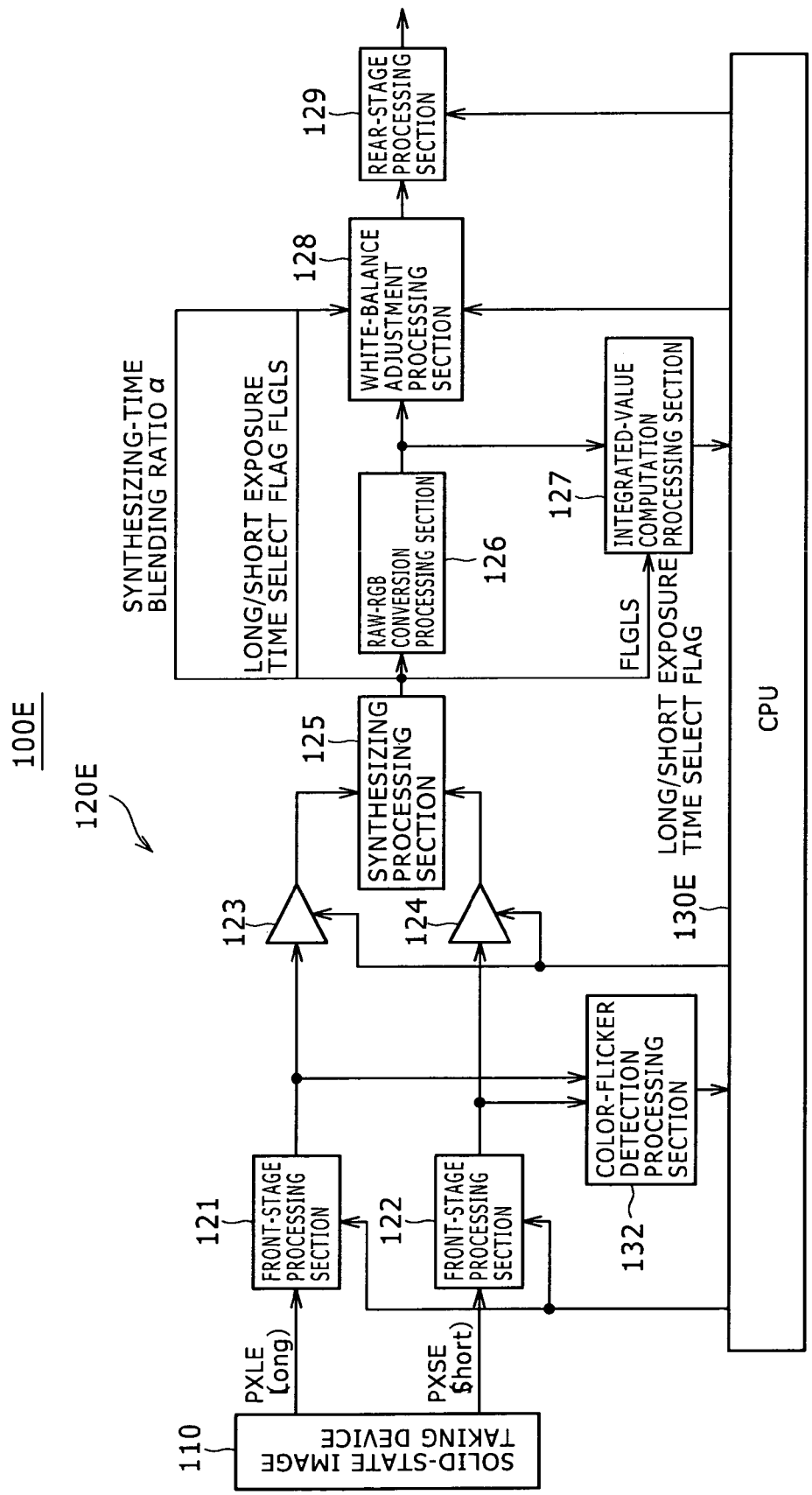
FIG. 24 is a block diagram showing a typical configuration of an image taking apparatus employing an image processing apparatus according to a seventh embodiment of the present disclosure.

FIG. 24 is a block diagram showing a typical configuration of an image taking apparatus 100E employing an image processing apparatus 120E according to the seventh embodiment of the present disclosure.

As shown in FIG. 24, the image processing apparatus 120E employs a color-flicker detection processing section 132 in addition to sections included in the configuration shown in FIG. 10.

The color-flicker detection processing section 132 is explained as follows.

The color-flicker detection processing section 132 determines the existence/nonexistence of color flickers from received data and further computes the degree of certainty of the existence/nonexistence of the color flickers. Then, the color-flicker detection processing section 132 supplies the degree of certainty to the CPU 130.

A method adopted by the color-flicker detection processing section 132 to detect color flickers is explained in detail as follows.

Detailed Description of the Color-Flicker Detection

A method adopted by the color-flicker detection processing section 132 to detect color flickers is explained in detail as follows.

Figure 25:
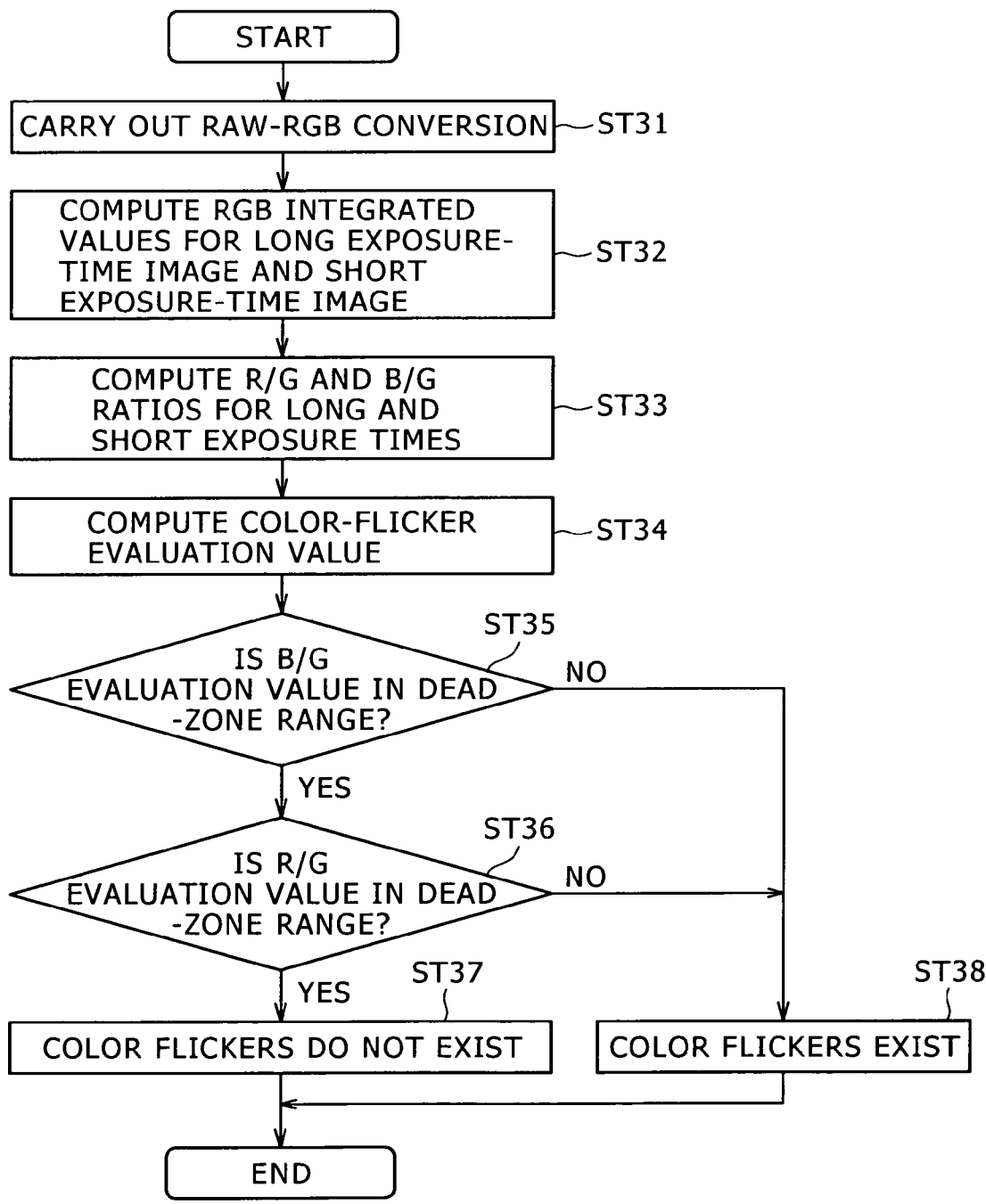
FIG. 25 shows a flowchart representing processing to detect color flickers in accordance with the seventh embodiment.

FIG. 25 shows a flowchart representing processing to detect color flickers in accordance with the seventh embodiment.

The flowchart begins with a step ST31 at which a RAW-RGB conversion process is carried out. Then, at the next step ST32, the color-flicker detection processing section 132 computes R, G and B integrated values for the long exposure-time image and the short exposure-time image. This computation of integrated values is similar to the integrated-value computation carried out by the integrated-value computation section 5 employed in the configurations shown in FIGS. 2 and 3.

As the main process of the integrated-value computation, the color-flicker detection processing section 132 integrates the values of pixels meeting certain conditions. Finally, the color-flicker detection processing section 132 outputs an integration result of the integrated-value computation carried out on pixels of the entire screen to the CPU 130E.

Figure 26:
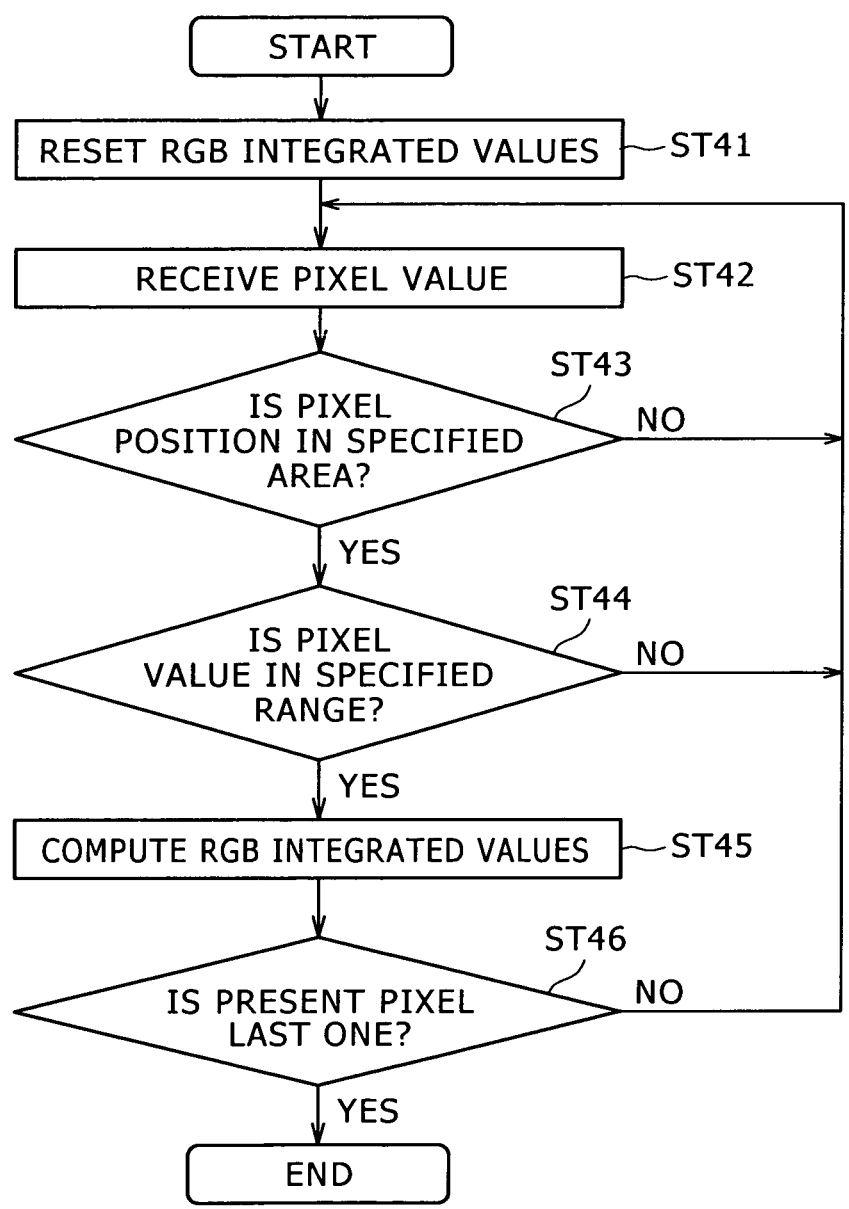
FIG. 26 shows a flowchart representing processing to integrate R, G and B pixel values.

FIG. 26 shows a flowchart representing the processing to integrate R, G and B pixel values, computing the integration results at the step ST32. In the flowchart shown in FIG. 26, the color-flicker detection processing section 132 determines whether or not a pixel meets the certain conditions by determining whether or not the position of the pixel is in a specified area and determining whether or not the value of the pixel is in a specified range. For a pixel meeting these two conditions, RGB pixel value integration processing is carried out (refer to steps ST41 to ST46 of the flowchart shown in FIG. 26).

A method for specifying an integration range of pixel values is explained as follows.

Figure 27:
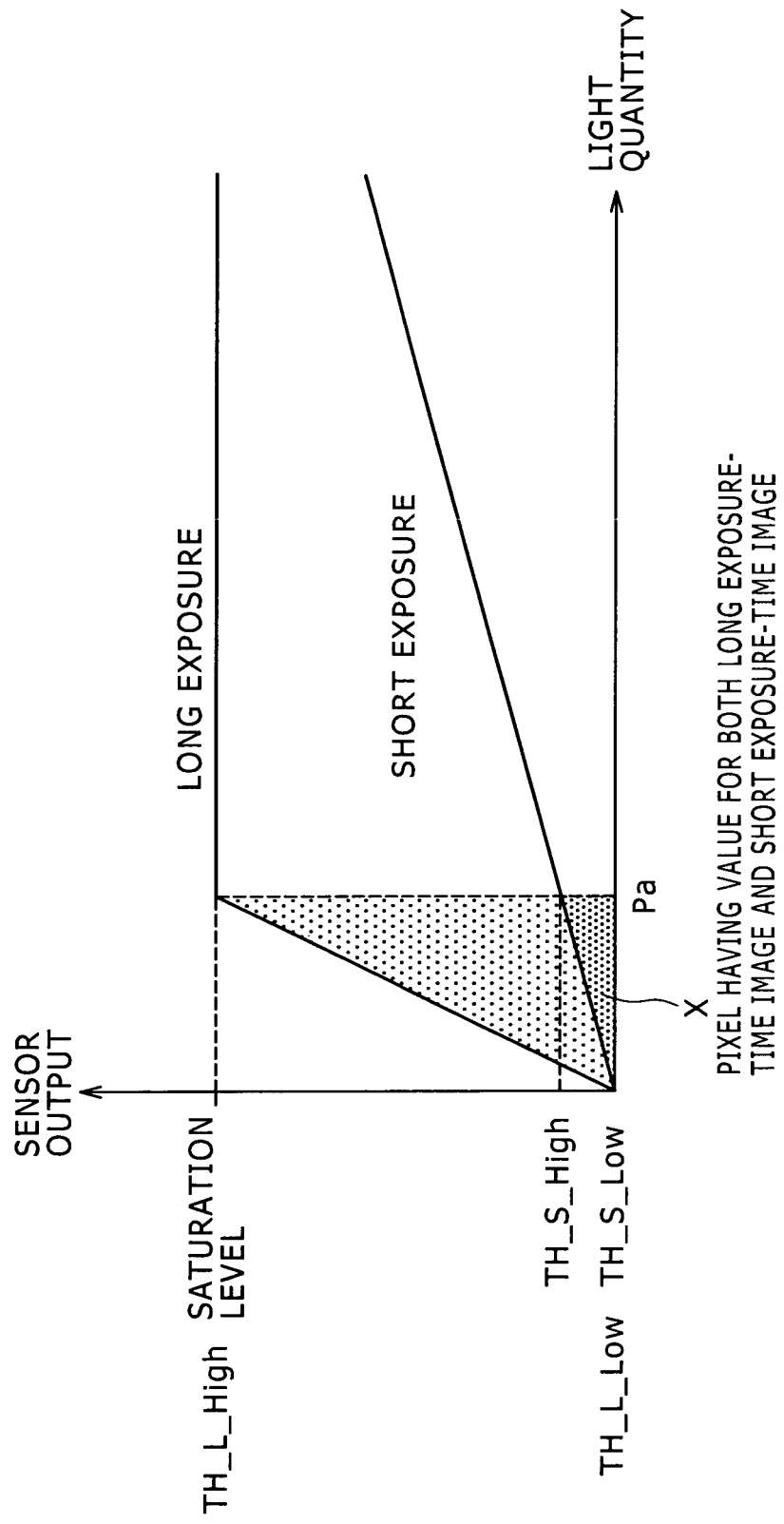
FIG. 27 is a conceptual diagram to be referred to in description of a method for specifying a range of integration of pixel values for a case in which a noise margin is not taken into consideration.

FIG. 27 is a conceptual diagram referred to in the following description of a method for specifying a range of integration of pixel values for a case in which a noise margin is not taken into consideration. The figure shows relations between the sensor output representing the pixel value and the light quantity for the long exposure-time image and the short exposure-time image.

This embodiment is characterized in that an integration range is so specified that the integration range includes pixel values to be integrated for both the long exposure-time image and the short exposure-time image.

As is obvious from FIG. 27, for light quantities smaller than Pa, the output generated by the sensor to represent the pixel value for the long exposure-time image is lower than the saturation level. Thus, the pixel value generated by the sensor exists. For light quantities greater than Pa, on the other hand, the sensor gets saturated inevitably so that the sensor outputs no meaningful information.

Accordingly, it is nice to specify an integration range including pixel values produced by light quantities smaller than Pa for the long exposure-time image and short exposure-time image. In the typical example shown in the figure, pixel values included in a portion denoted by symbol X are pixel values to be integrated.

FIG. 27 is a conceptual diagram referred to in the above description of the method for specifying an integration range of pixel values for a case in which noises are not taken into consideration.

In an actual image taking operation, however, noises do exist and, the larger the exposure-time ratio, the smaller the number of pixels included in the short exposure-time image as integration-object pixels each generating a low-level signal. Thus, a large exposure-time ratio deteriorates the precision of the determination as to whether or not color flickers exist. In order to solve this problem, the integration range can be specified by taking a noise margin into consideration in advance.

Figure 28:
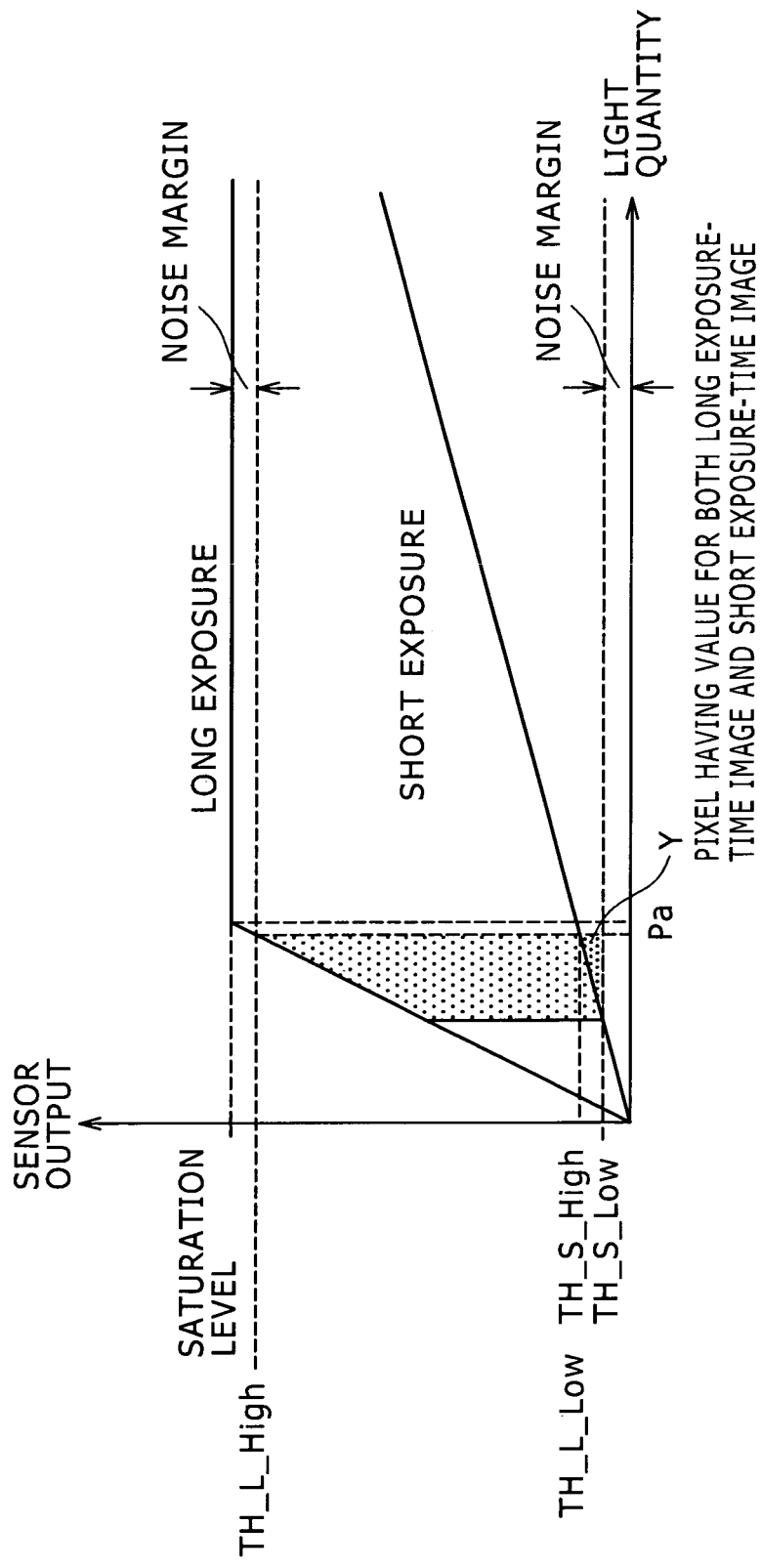
FIG. 28 is a conceptual diagram to be referred to in description of a method for specifying a range of integration of pixel values for a case in which a noise margin is taken into consideration.

FIG. 28 is a conceptual diagram to be referred to in the following description of a method for specifying a range of integration of pixel values for a case in which a noise margin is taken into consideration. In the diagram, a noise level is provided on the sensor-output axis at the sensor output of 0 and the sensor saturation level. As shown in FIG. 28, pixel values included in the noise margins are not subjected to integration.

Thus, pixel values to be integrated are sensor outputs in a portion denoted by symbol Y in the figure. In comparison with the case in which a noise margin is not taken into consideration, the number of pixel values to be integrated is small.

By specifying such a range of integration of pixel values and integrating the pixel values, six final integration results can be obtained at the step ST32 of the flowchart shown in FIG. 25. The final integration results are R, G and B integration results for the long exposure-time image and R, G and B integration results for the short exposure-time image. In the following description, the R, G and B integration results for the long exposure-time image and R, G and B integration results for the short exposure-time image are denoted by reference notations Sum_R_Long, Sum_G_Long, Sum_B_Long, Sum_R_Short, Sum_G_Short and Sum_B_Short respectively.

Then, by making use of Equations (4-1) to (4-4) given below as equations based on the computed integration results, R/G and B/G ratios for the long exposure-time image and the short exposure-time image are computed at a step ST33 of the flowchart shown in FIG. 25 as follows:

[Equations 4]

$$(R/G)\_\text{Long} = \text{Sum}\_R\_\text{Long}/\text{Sum}\_G\_\text{Long} \quad (4\text{-}1)$$

$$(B/G)\_\text{Long} = \text{Sum}\_B\_\text{Long}/\text{Sum}\_G\_\text{Long} \quad (4\text{-}2)$$

$$(R/G)\_\text{Short} = \text{Sum}\_R\_\text{Short}/\text{Sum}\_G\_\text{Short} \quad (4\text{-}3)$$

$$(B/G)\_\text{Short} = \text{Sum}\_B\_\text{Short}/\text{Sum}\_G\_\text{Short} \quad (4\text{-}4)$$

Figure 29:
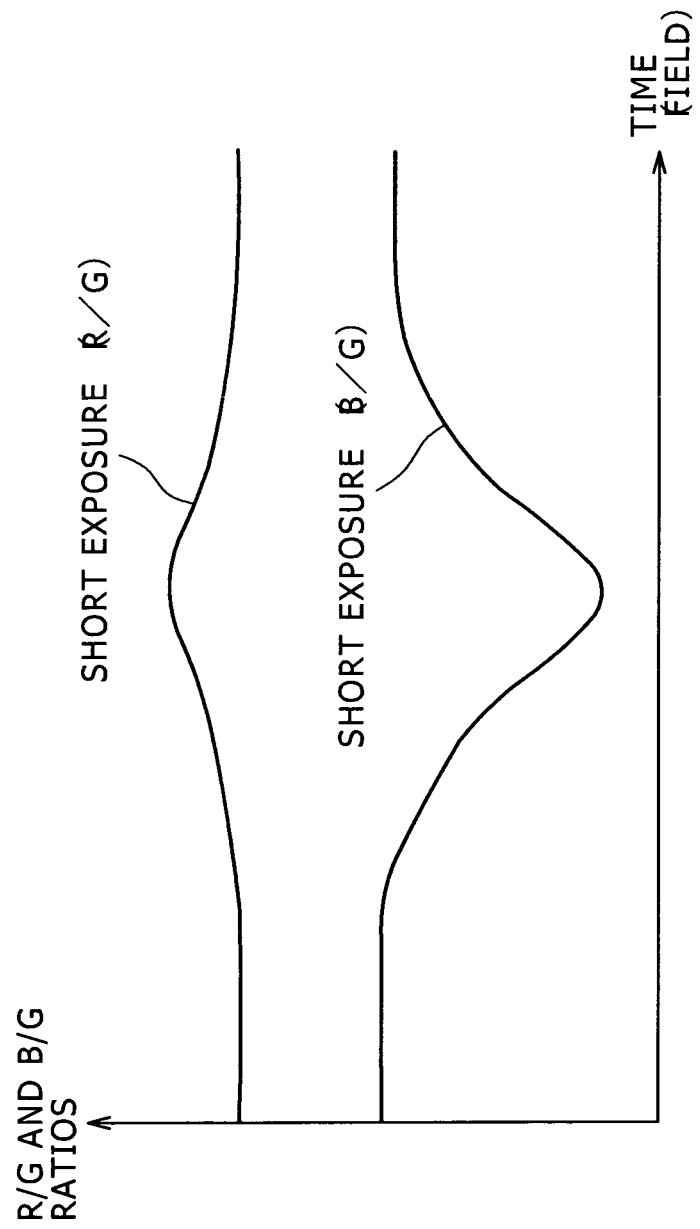
FIG. 29 is a conceptual diagram showing a ratio of R to G and a ratio of B to G for a short exposure-time image.
Figure 30:
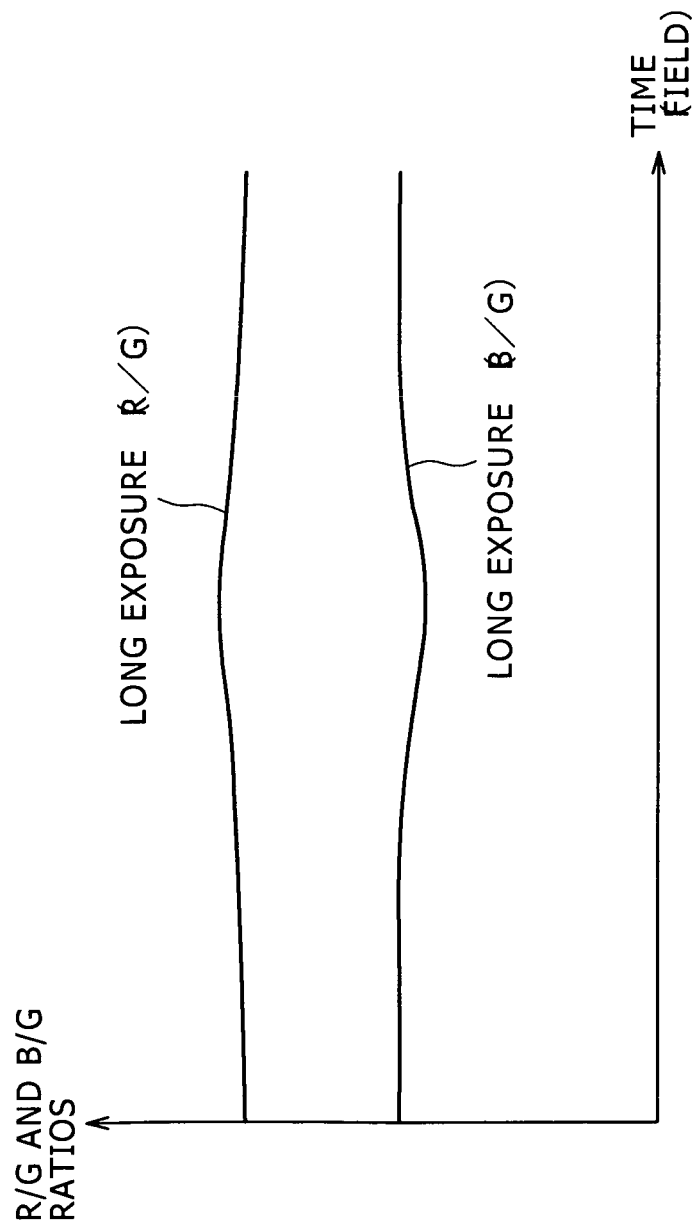
FIG. 30 is a conceptual diagram showing a ratio of R to G and a ratio of B to G for a long exposure-time image.

Typical ratios computed by making use of Equations (4-1) to (4-4) are shown in FIGS. 29 and 30 for the short exposure-time image and the long exposure-time image respectively.

FIG. 29 is a conceptual diagram showing a ratio of R to G and a ratio of B to G for a short exposure-time image.

FIG. 30 is a conceptual diagram showing a ratio of R to G and a ratio of B to G for a long exposure-time image.

Both the figures show typical ratios for a case in which color flickers are generated. The ratios shown in the figure are no more than typical ratios since the dent and protrusion of each graph representing the ratio and the upper-lower relation between the graphs vary from situation to situation. That is to say, the graph representing the R/G ratio is not always above the graph representing the B/G ratio and the graph representing the B/G ratio is not necessarily a graph having a dent.

As described before, the short exposure-time image is an image taken at a relatively high shutter speed. Thus, the short exposure-time image is easily affected by color flickers, and the R/G and B/G ratios change with the lapse of time as shown by the graphs of FIG. 29.

On the other hand, the long exposure-time image is an image taken at a relatively low shutter speed. Thus, the long exposure-time image is hardly affected by color flickers. However, the long exposure-time image may not be said to be an image not affected by color flickers at all. In comparison with curves representing the R/G and B/G ratios for the short exposure-time image, the R/G and B/G ratios for the long exposure-time image change with the lapse of time only a little bit as shown by the curves of FIG. 30.

Then, at the next step ST34, evaluation values of the color flickers are computed.

The evaluation values of the color flickers are computed in accordance with Equations (5-1) and (5-2) given as follows:
[Equations 5]

$$CR\_Est\_R = (R/G)\_Short/(R/G)\_Long \quad (5\text{-}1)$$

$$CR\_Est\_B = (B/G)\_Short/(B/G)\_Long \quad (5\text{-}2)$$

Figure 31:
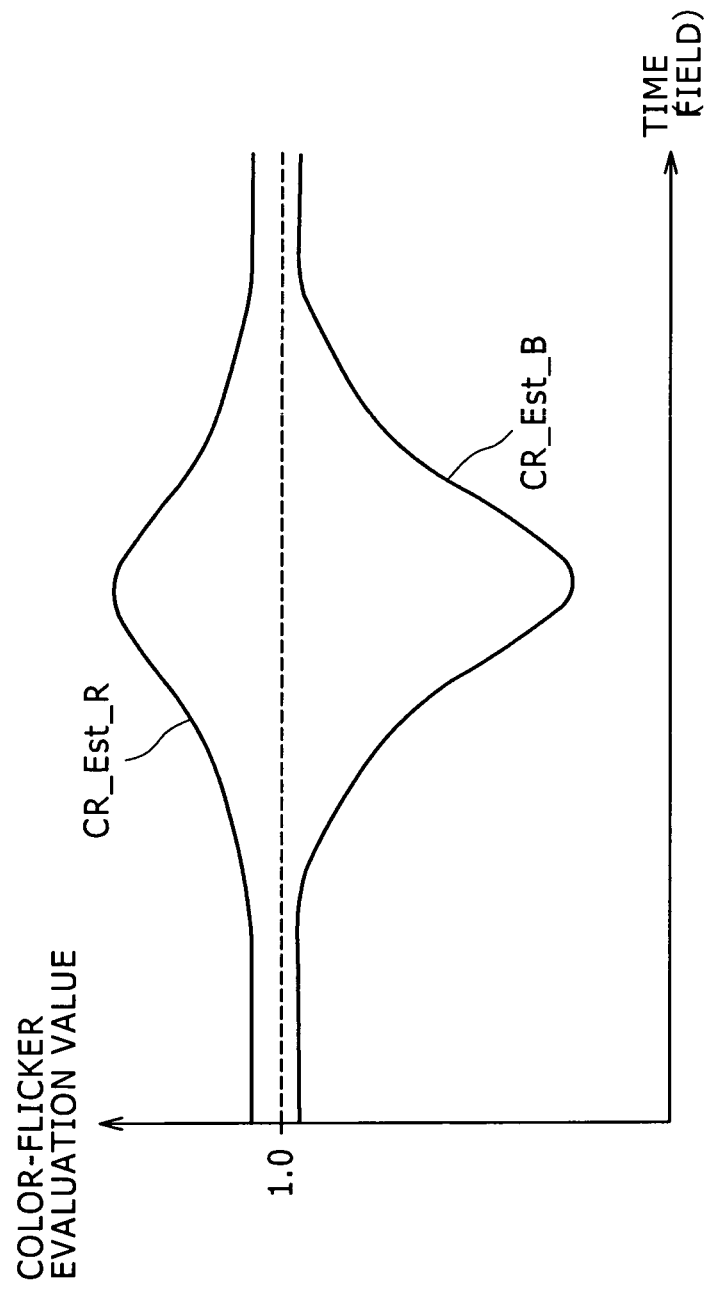
FIG. 31 is a diagram showing typical color-flicker evaluation values obtained by making use of equations.

FIG. 31 is a diagram showing typical color-flicker evaluation values obtained by making use of the above equations.

As indicated by Equations (5-1) and (5-2), an evaluation value is a ratio for the short exposure-time image to a ratio for the long short exposure-time image. By examining the evaluation value, the flicker components having an effect also on the long exposure-time image can be canceled from the short exposure-time image. In addition, the ratio for the short exposure-time image is normalized automatically with respect to the ratio for the long exposure-time image.

Even though the short exposure-time image and the long exposure-time image have a difference in exposure time, each particular pixel on the long exposure-time image is compared with a pixel on the short exposure-time image at the same position as the particular pixel. Thus, information on image taking of the same image taking object should be obtained.

Accordingly, if no color flickers are generated, the short exposure-time image has B/G and R/G ratios equal to those of the long exposure-time image regardless of the exposure time. At that time, the values to be compared as described above are the B/G and R/G ratios. Thus, even if the magnitude of a pixel value (or the absolute pixel value) of the long exposure-time image is different from that of the short exposure-time image, no problem is raised. Accordingly, if no color flickers are generated, the evaluation values which are each a ratio should be 1.0.

If color flickers are generated, on the other hand, as described earlier, even for the same image-taking object, the hue changes due to the effect of the afterglow characteristic exhibited by the illuminated light. In this case, the evaluation values which are each a ratio each have a value greater or smaller than 1.0.

For the reason described above, if color flickers are generated, the evaluation values change from the value of 1.0 with the lapse of time as shown by curves of FIG. 31.

Then, at steps ST35 to ST38, the evaluation values are used to determine whether or not color flickers exist.

As explained before, in an ideal state with no color flickers generated, the evaluation values should be 1.0.

However, the following facts exist:
1): Errors caused by noises and the like exist.
2): Even though the flicker components having an effect on the long exposure-time light can be canceled from the short exposure-time light in accordance with Equations (5-1) and (5-2), the effect of the flickers components on the long exposure-time image is not zero.
3): An integrated value is not a result of integration of evaluation values but a result of integrating each of R, G and B pixel values.

Thus, there is a difference from a case in which an evaluation value is obtained from R, G and B integrated values. As a result, there is almost no case in which the evaluation value is just equal to 1.0.

Figure 32:
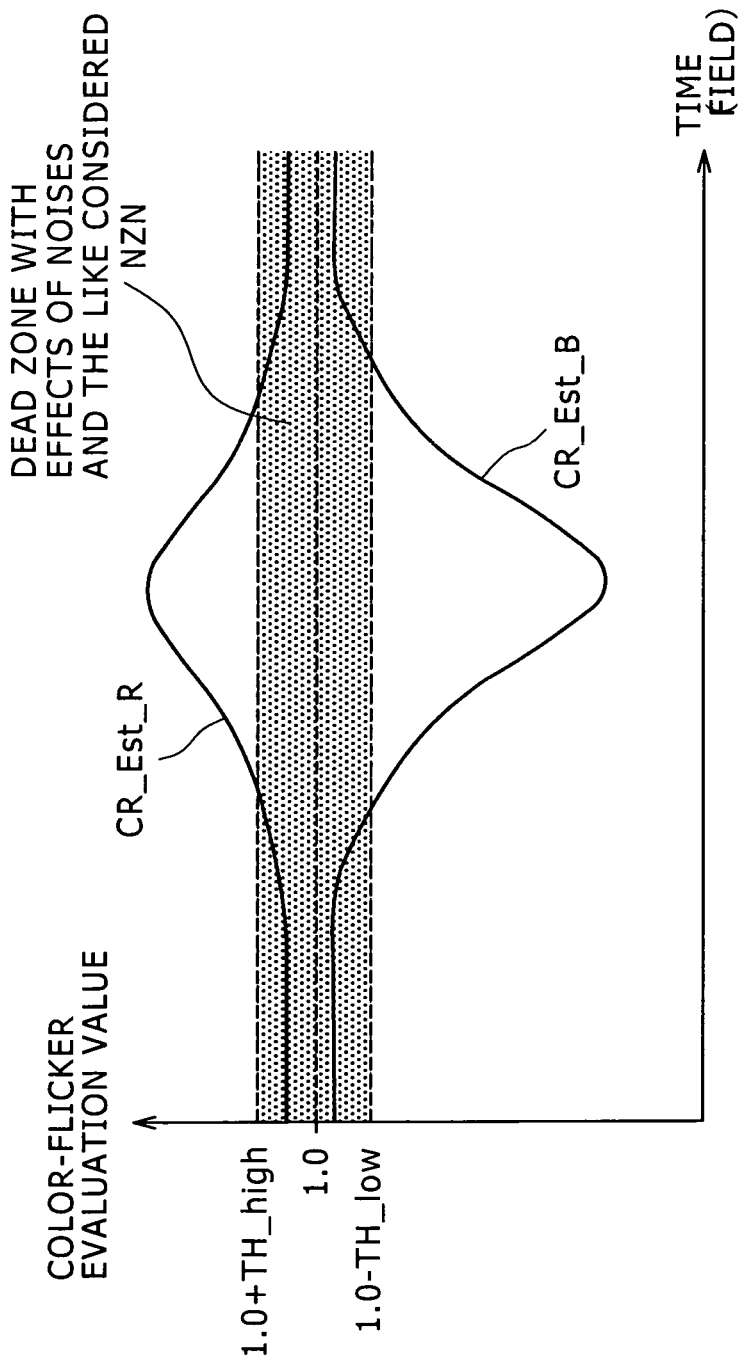
FIG. 32 is an explanatory diagram to be referred to in description of a typical color-flicker determination method.

For this reason, a dead zone NZN like one shown in FIG. 32 is defined and a color-flicker evaluation value existing in this dead zone NZN is regarded as a value indicating that no color flickers have been generated.

To be more specific, the evaluation value CR_Est_R for the R color and the evaluation value CR_Est_B for the B color are examined to determine whether or not the evaluation values CR_Est_R and CR_Est_B are in the dead zone NZN. If at least one of the evaluation values CR_Est_R and CR_Est_B is outside the dead zone NZN, the existence of color flickers is confirmed.

The above description has explained a method for determining whether or not color flickers exist.

If a result of the determination method indicates that color flickers exist, the existing color-flicker suppression method described before can be applied.

Figure 33:
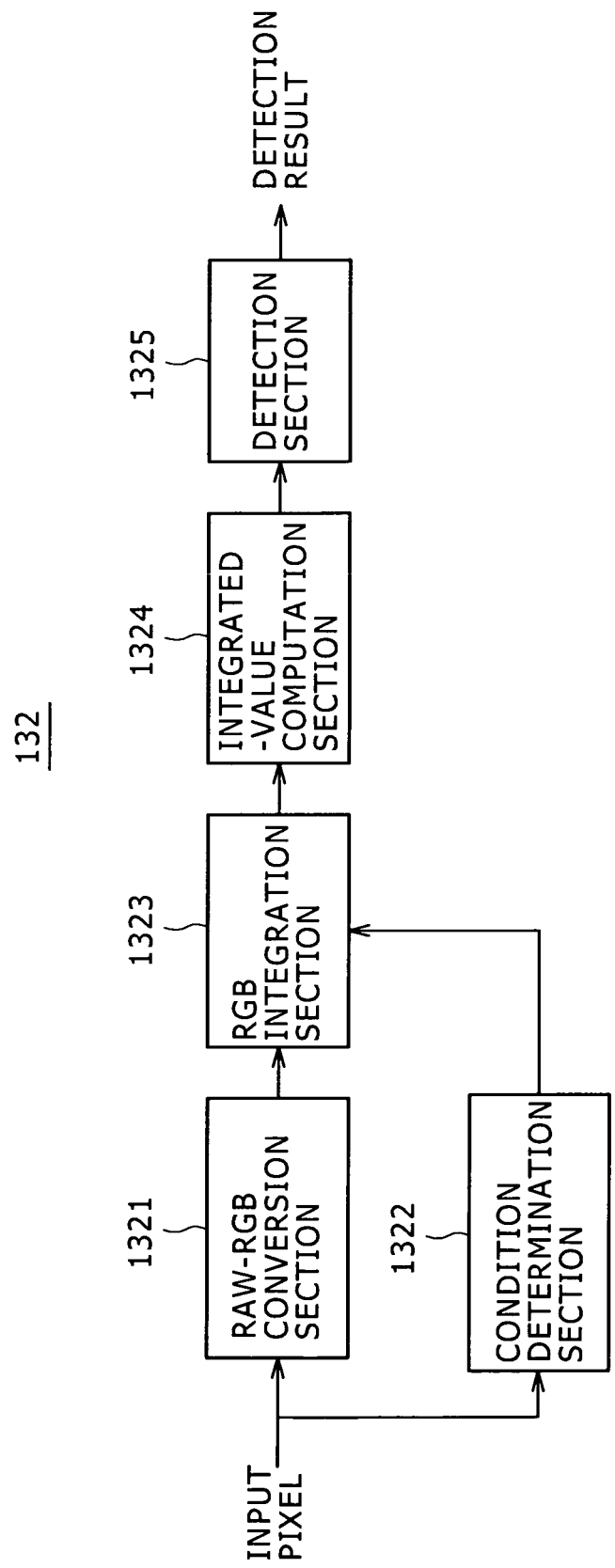
FIG. 33 is a block diagram showing a typical configuration of a color-flicker detection processing section.

FIG. 33 is a block diagram showing a typical configuration of the color-flicker detection processing section 132.

As shown in the figure, the color-flicker detection processing section 132 employs an RAW-RGB conversion section 1321, a condition determination section 1322, an RGB integration section 1323, an evaluation-value computation section 1324 and a detection section 1325.

These sections carry out their respective pieces of processing in order to accomplish the processing to detect color flickers as described before.

Color-Flicker Suppression Method

As explained earlier, color flickers are detected in accordance with this embodiment and, if the existence of the color flickers is confirmed, the ordinary color-flicker suppression method can be applied.

On the other hand, additional processing can also be carried out besides the color-flicker detection according to the embodiment. The additional processing is carried out in order to compute the degree of certainty at which a result of the color-flicker detection is obtained. Then, it is possible to apply a color-flicker suppression method based on the degree of certainty.

The following description explains a method for computing the degree of certainty and a method for suppressing color flickers on the basis of the degree of certainty.

First of all, the following description explains the method for computing the degree of certainty at which a result of the color-flicker detection is obtained.

Figure 34:
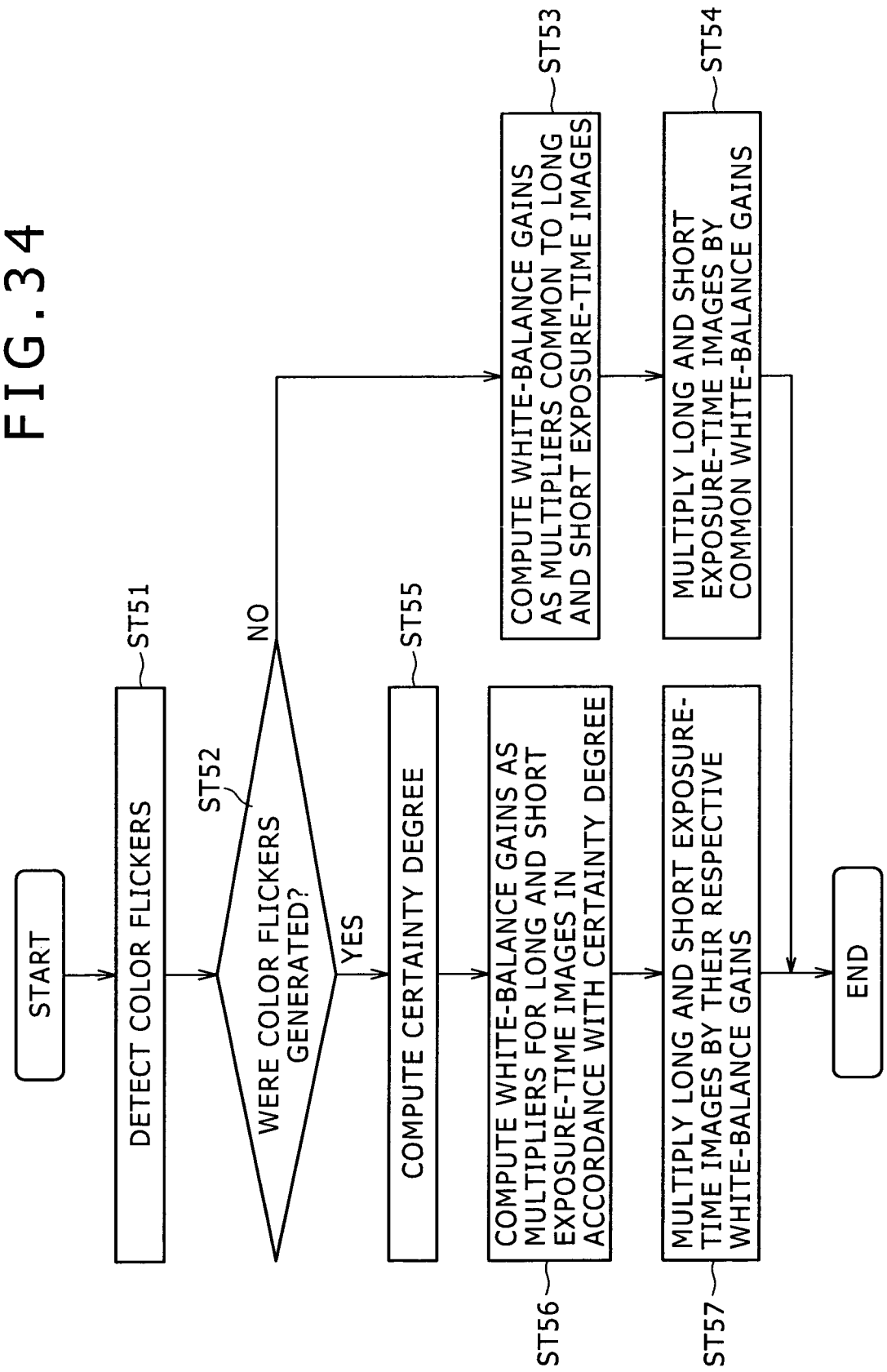
FIG. 34 shows a flowchart representing color-flicker detection and certainty-degree computation processing.

FIG. 34 shows a flowchart representing color-flicker detection and certainty-degree computation processing.

As shown in FIG. 34, the flowchart representing the processing begins with a step ST51 at which color flickers are detected. Color flickers are detected in the same way as the color-flicker detection processing represented by the flow-chart shown in FIG. 26.

The result of the color-flicker detection carried out at the step ST51 is examined at the next step ST52 in order to determine whether or not color flickers exist. If color flickers do not exist, the flow of the processing represented by the flowchart shown in FIG. 34 goes on to a step ST53 in order to compute white-balance gains as multipliers common to long and short exposure-time images from R, G and B integrated values.

The R, G and B integrated values used in the computation of the white-balance gains can be integrated values computed at the flicker detection time or integrated values computed by the integrated-value computation section. One of differences between the integrated values computed at the flicker detection time and the integrated values computed by the integrated-value computation section is conceivably a difference in conditions such as the computation range.

In addition, a method for computing white-balance gains as multipliers common to long and short exposure-time images from R, G and B integrated values can be a gain computation method based on Equations (6-1) to (6-3) given below. However, Equations (6-1) to (6-3) are no more than typical equations. That is to say, any gain computation method can be adopted as long as the gain computation method is an already existing method.

[Equations 6]

$$WBG\_R = (Sum\_G\_Long + Sum\_G\_Short)/(Sum\_R\_Long + Sum\_R\_Short) \quad (6\text{-}1)$$

$$WBG\_G = 1.0 \quad (6\text{-}2)$$

$$WBG\_B = (Sum\_G\_Long + Sum\_G\_Short)/(Sum\_B\_Long + Sum\_B\_Short) \quad (6\text{-}3)$$

Then, at the next ST54, the white-balance adjustment processing block carries out white-balance adjustment processing to multiply long and short exposure-time images by the common white-balance gains.

If color flickers exist, on the other hand, processing described below is carried out at a step ST55 in order to compute the degree of certainty at which the existence of the color flickers has been detected.

Figure 35:
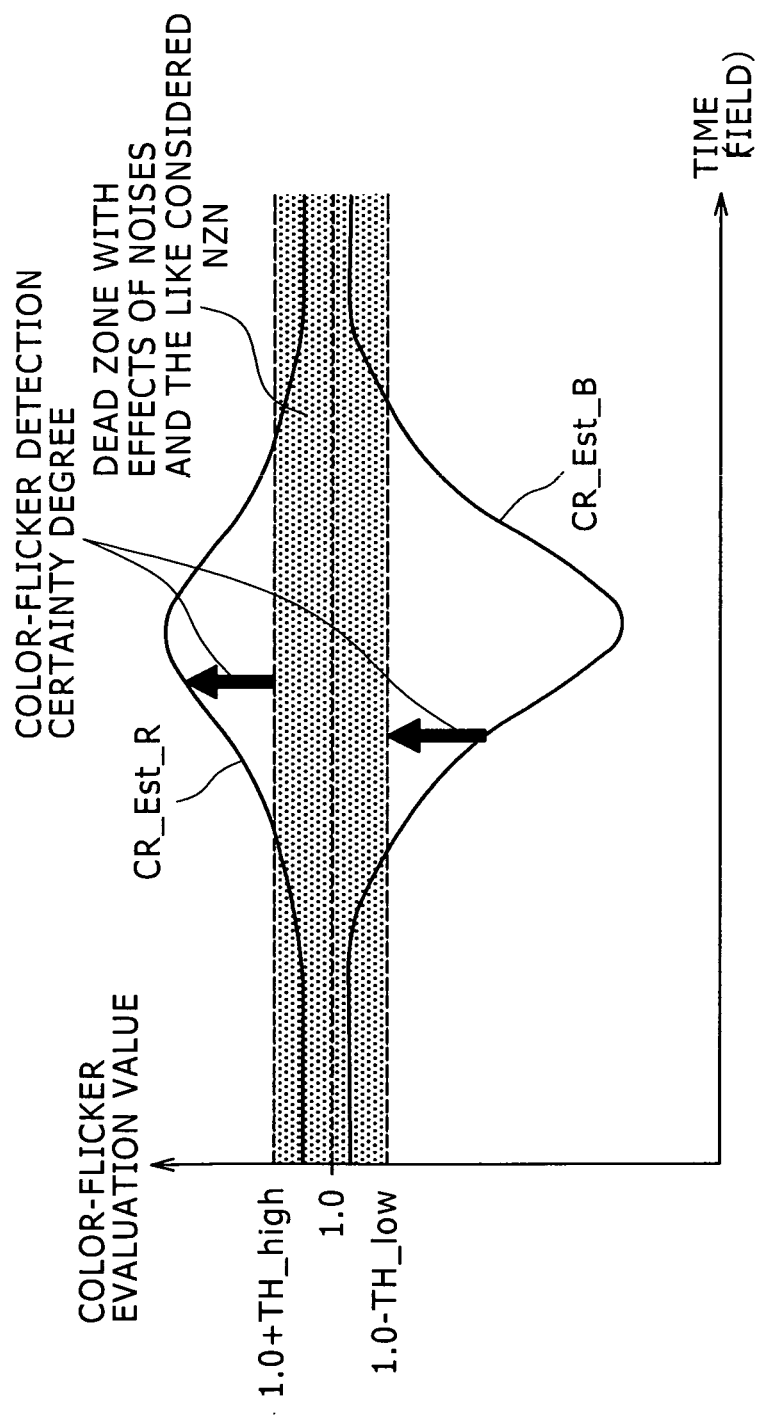
FIG. 35 is a diagram to be referred to in explanation of a method for computing the degree of certainty at which color flickers are detected.

FIG. 35 is a diagram referred to a method for computing the degree of certainty at which color flickers are detected.

Figure 36:
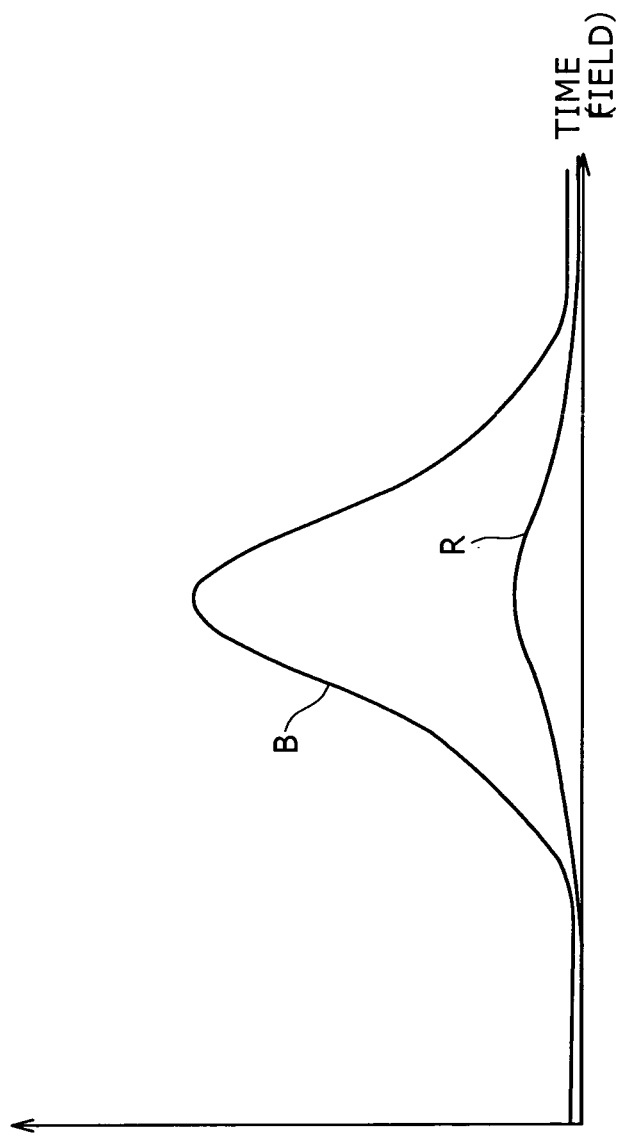
FIG. 36 is a diagram showing degrees of certainty at which color flickers are detected.

FIG. 36 is a diagram showing degrees of certainty at which color flickers are detected.

The degree of certainty is defined as the amount of deviation of a color-flicker evaluation value computed at a color-flicker detection time from a dead zone NZN as shown in FIG. 35. In the figure, the length of an arrow is the degree of certainty. In this case, the amount of deviation is handled as a scalar quantity. Thus, the degree of certainty is always a positive number. The certainty degree obtained by adoption of such a method is shown in FIG. 36.

Figure 37:
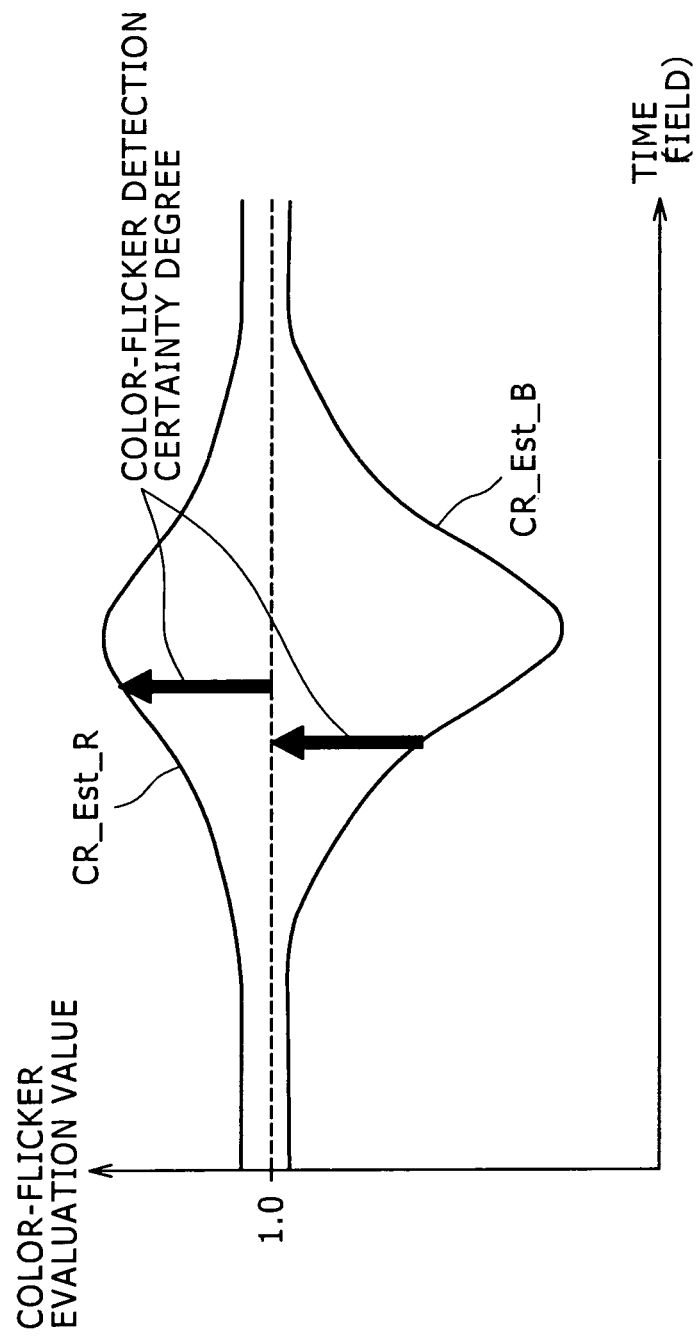
FIG. 37 is a diagram to be referred to in explanation of another method for computing the degree of certainty at which color flickers are detected.

FIG. 37 is a diagram referred to in the following explanation of another method for computing the degree of certainty at which color flickers are detected.

In accordance with the method explained above by referring to FIG. 35, the degree of certainty is defined as the amount of deviation of a color-flicker evaluation value from a dead zone NZN. As shown in FIG. 37, however, the degree of certainty is defined as the amount of deviation of a color-flicker evaluation value from the value of 1. The certainty degree defined as shown in FIG. 37 can also be obtained by setting each of TH_high and TH_low shown in FIG. 35 at 0.

Next, the following description explains a method adopted at a step ST56 to compute a white-balance gain, which is used for suppressing color flickers, on the basis of the computed degree of certainty.

At the step ST56, first of all, white-balance gains are computed as multipliers for each of the long exposure-time image and the short exposure-time image from the R, G and B integrated values.

As a method for computing the white-balance gains, a computation method based on Equations (7-1) to (7-6) given below can be adopted. Much like Equations (6-1) to (6-3), Equations (7-1) to (7-6) are also typical equations.

[Equations 7]

$$R\_gain\_Long = Sum\_G\_Long/Sum\_R\_Long \quad (7\text{-}1)$$

$$G\_gain\_Long = 1.0 \quad (7\text{-}2)$$

$$B\_gain\_Long = Sum\_G\_Long/Sum\_B\_Long \quad (7\text{-}3)$$

$$R\_gain\_Short = Sum\_G\_Short/Sum\_R\_Short \quad (7\text{-}4)$$

$$G\_gain\_Short = 1.0 \quad (7\text{-}5)$$

$$B\_gain\_Short = Sum\_G\_Short/Sum\_B\_Short \quad (7\text{-}6)$$

The R, G and B integrated values used in computing the white-balance gains in accordance with Equations (7-1) to (7-6) can be integrated values computed at the flicker detection time or integrated values computed by the integrated-value computation section. One of differences between the integrated values computed at the flicker detection time and the integrated values computed by the integrated-value computation section is conceivably a difference in conditions such as the computation range.

From the six white-balance gains R_gain_Long, G_gain_Long, B_gain_Long, R_gain_Short, G_gain_Short and B_gain_Short computed in accordance with Equations (7-1) to (7-6) respectively, six final white-balance gains WBG_R_Long, WBG_G_Long, WBG_B_Long, WBG_R_Short, WBG_G_Short and WBG_B_Short are obtained to be used eventually as multipliers for the long exposure-time image and the short exposure-time image.

Figure 38:
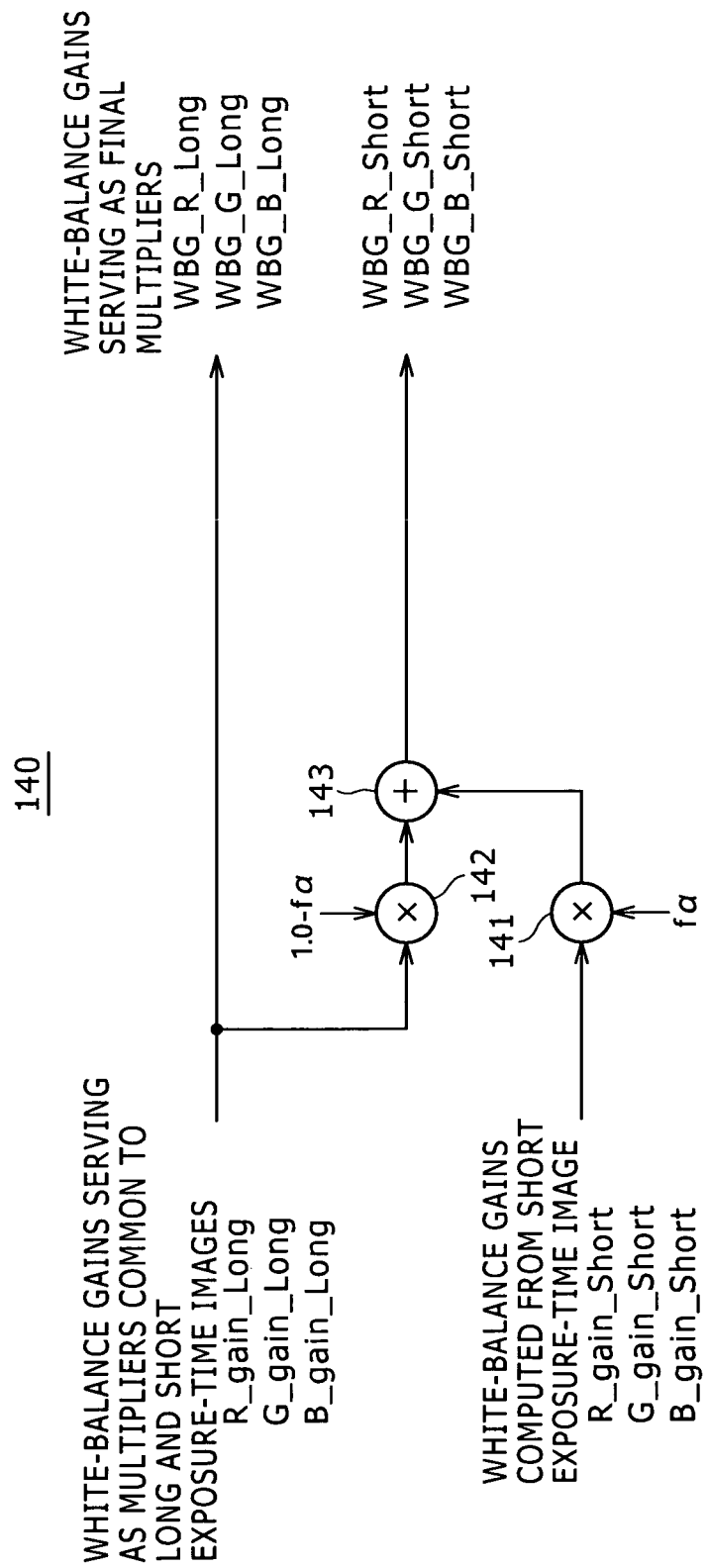
FIG. 38 is a diagram showing a white-balance gain computation system for computing different final white-balance gains for short and long exposure-time images.

FIG. 38 is a diagram showing a white-balance gain computation system 140 for computing the different final white-balance gains for short and long exposure-time images.

As shown in the figure, the white-balance gain computation system 140 employs multipliers 141 and 142 as well as an adder 143.

A blending ratio fα is computed from a color-flicker certainty degree obtained at the step ST55. Then, the white-balance gains for the long exposure-time image are blended with the white-balance gains for the short exposure-time image on the basis of the blending ratio fα.

Figure 39:
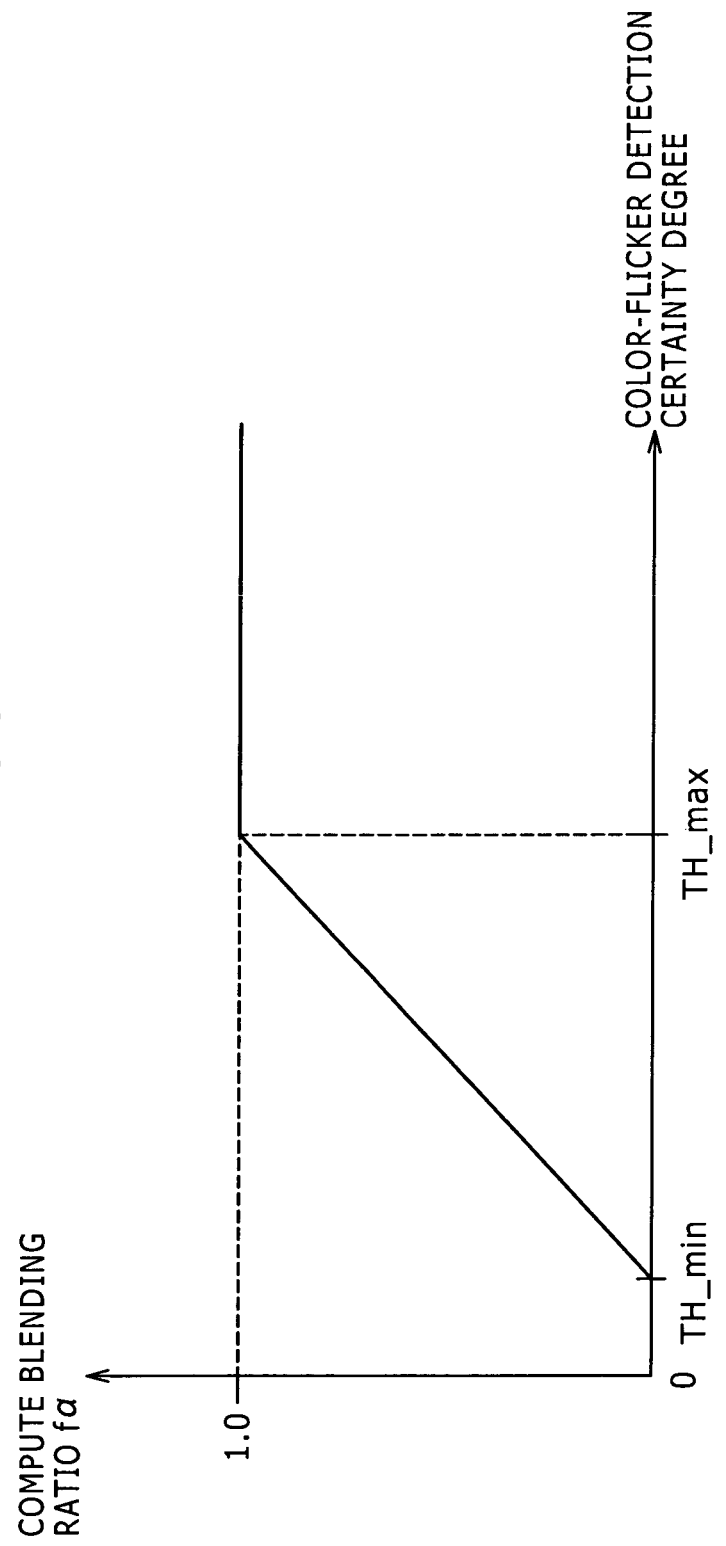
FIG. 39 is an explanatory diagram to be referred to in description of a method for computing a blending ratio α.

FIG. 39 is an explanatory diagram referred to a method for computing the blending ratio fα.

The horizontal axis of FIG. 39 represents the color-flicker certainty degree obtained at the step ST55 whereas the vertical axis of the figure represents the blending ratio fα.

For certainty degrees smaller than a lower-side threshold value TH_min, the blending ratio fα is set at 0. For certainty degrees greater than an upper-side threshold value TH_max, the blending ratio fα is set at 1.0.

The blending ratio fα for any particular certainty degree between the lower-side threshold value TH_min and the upper-side threshold value TH_max has the value in the range 0 to 1.0. The value in the range 0 to 1.0 is determined from a straight line connecting a point representing the blending ratio fα of 0 and the lower-side threshold value TH_min to a point representing the blending ratio fa of 1.0 and the upper-side threshold value TH_max as shown in FIG. 39. To put it concretely, the blending ratio fα for the particular degree of certainty is obtained by multiplying the difference between the lower-side threshold value TH_min and the particular degree of certainty with the gradient of the straight line. The gradient of the straight line is equal to 1.0/(TH_max−THh_min).

By adoption of the method described above, it is possible to find the six final white-balance gains WBG_R_Long, WBG_G_Long, WBG_B_Long, WBG_R_Short, WBG_G_Short and WBG_B_Short to be used eventually as multipliers for the long exposure-time image and the short exposure-time image. Then, these multipliers are used by the white-balance adjustment processing section in order to adjust the white balance.

Figure 40:
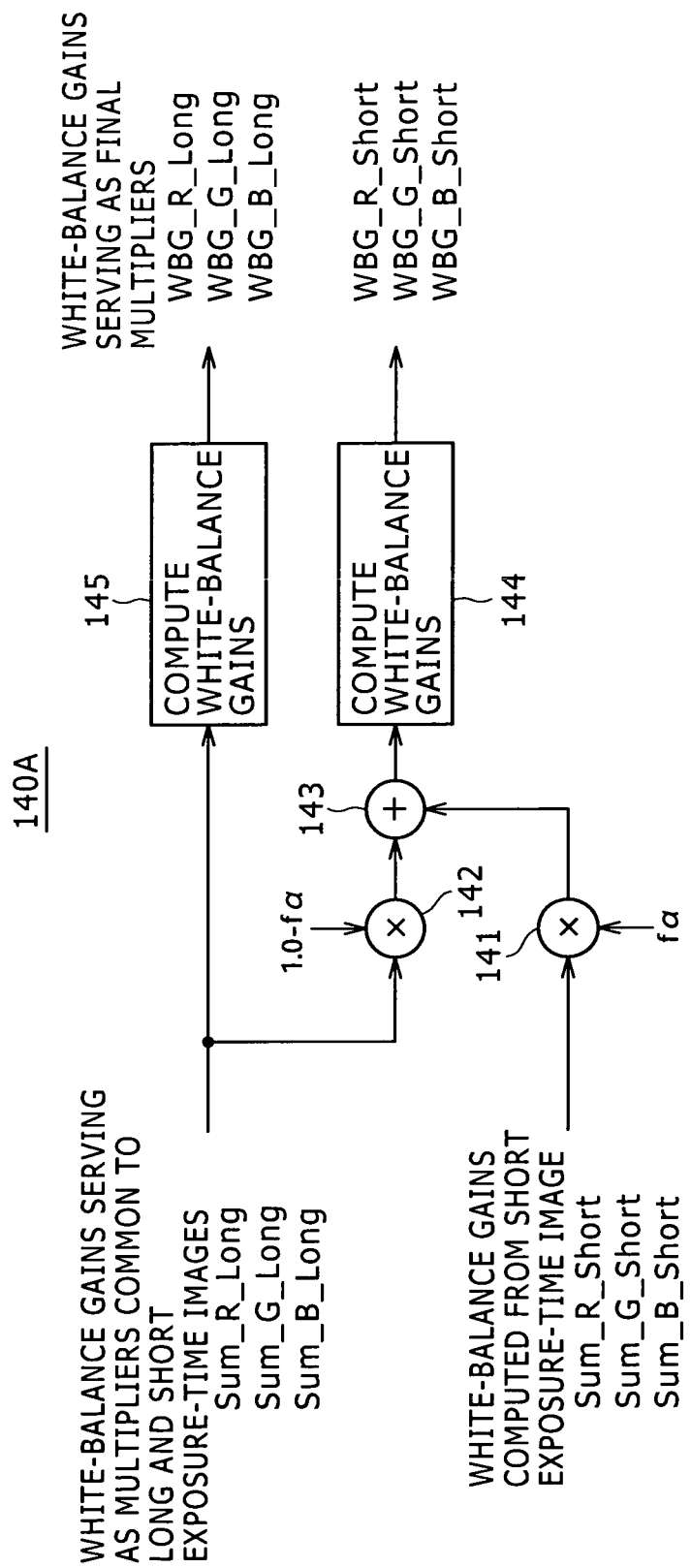
FIG. 40 is a diagram showing another white-balance gain computation system for computing different final white-balance gains for short and long exposure-time images.

In accordance with the method explained above by referring to FIG. 38, the blending ratio fα is used in a blending process carried out on the six white-balance gains R_gain_Long, G_gain_Long, B_gain_Long, R_gain_Short, G_gain_Short and B_gain_Short in order to compute the six final white-balance gains WBG_R_Long, WBG_G_Long, WBG_B_Long, WBG_R_Short, WBG_G_Short and WBG_B_Short. However, the blending process can also be carried out on the R, G and B integrated values in place of the six white-balance gains R_gain_Long, G_gain_Long, B_gain_Long, R_gain_Short, G_gain_Short and B_gain_Short in order to compute the six final white-balance gains WBG_R_Long, WBG_G_Long, WBG_B_Long, WBG_R_Short, WBG_G_Short and WBG_B_Short as shown in FIG. 40. As shown in the figure, the blending process is carried out on six R, G and B integrated values SUM_R_Long, SUM_G_Long, SUM_B_Long, SUM_R_Short, SUM_G_Short and SUM_B_Short in order to compute the six final white-balance gains WBG_R_Long, WBG_G_Long, WBG_B_Long, WBG_R_Short, WBG_G_Short and WBG_B_Short.

The above description explains a method for suppressing color flickers by carrying out color-flicker detection in accordance with this embodiment.

Figure 41:
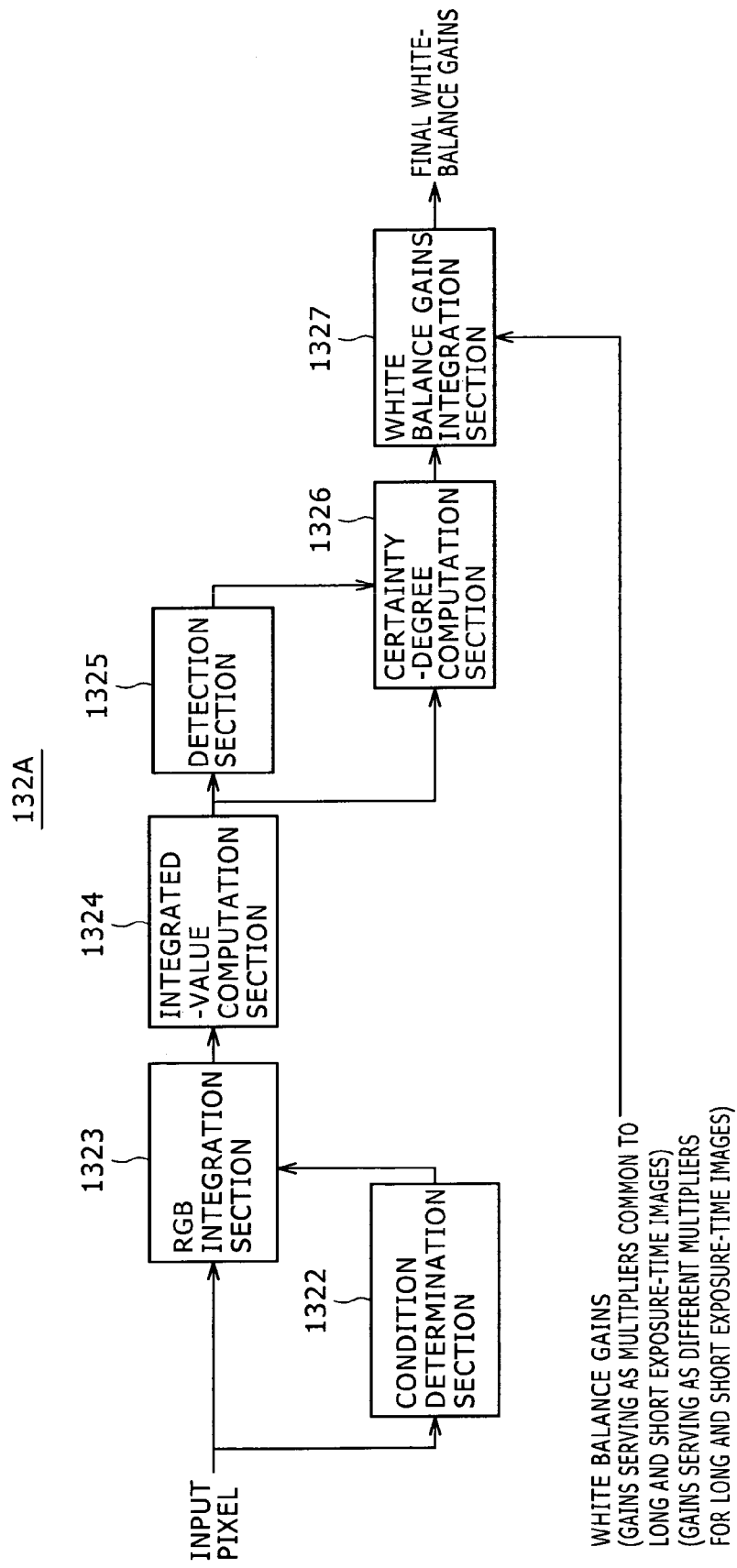
FIG. 41 is a block diagram showing a typical configuration of a color-flicker detection processing section having a function to suppress color flickers.

FIG. 41 is a block diagram showing a typical configuration of a color-flicker detection processing section 132A having a function to suppress color flickers.

As shown in the figure, the color-flicker detection processing section 132A employs a condition determination section 1322, an RGB integration section 1323, an evaluation-value computation section 1324, a detection section 1325, a certainty-degree computation section 1326 and a white-balance gain computation section 1327.

These sections carry out their respective pieces of processing in order to accomplish the processing to detect color flickers and suppress the flickers.

The following description explains the eighth to fifteenth embodiments used for mainly carrying out the processing to detect color flickers.

8: Eighth Embodiment

Figure 42:
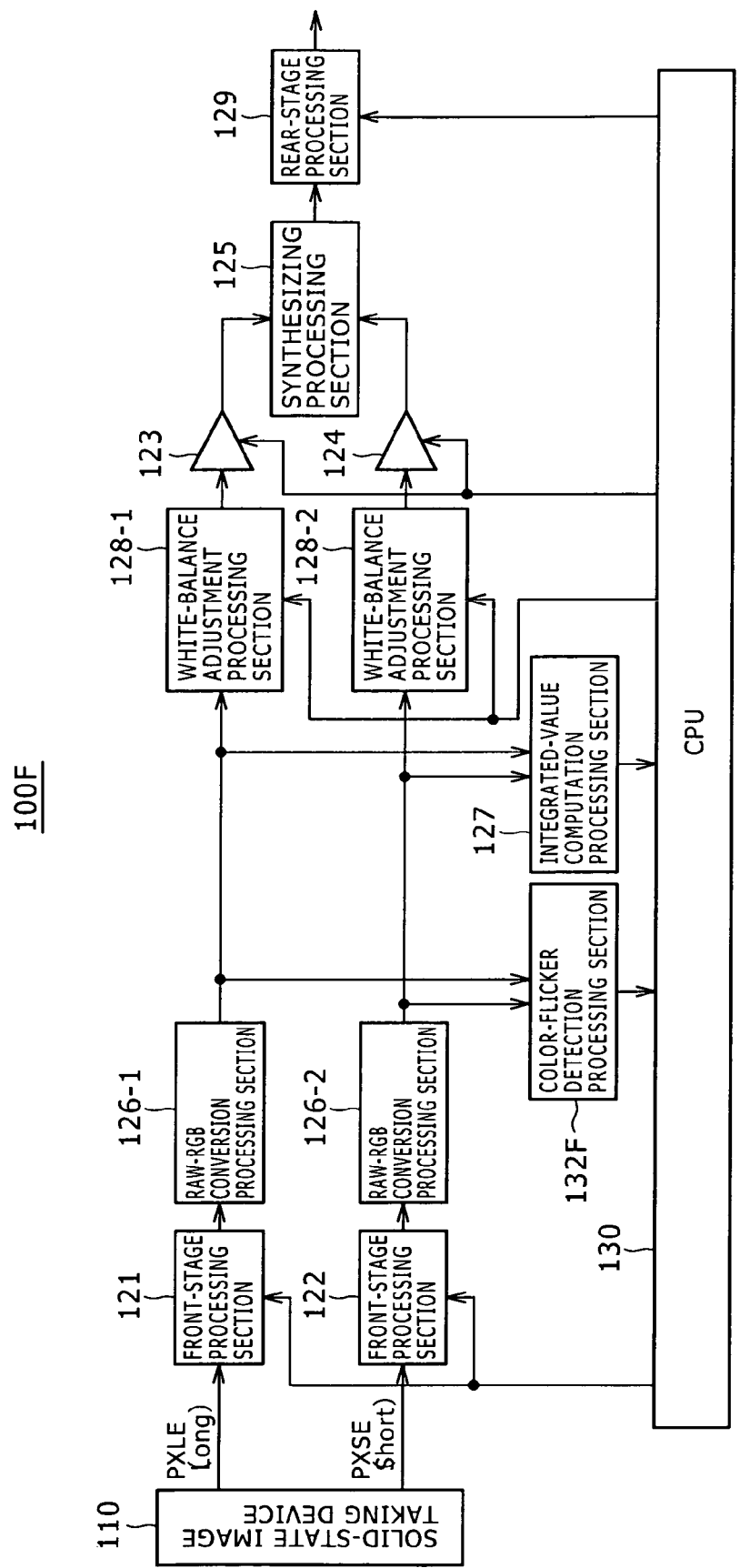
FIG. 42 is a block diagram showing a typical configuration of an image taking apparatus employing an image processing apparatus according to an eighth embodiment of the present disclosure.

FIG. 42 is a block diagram showing a typical configuration of an image taking apparatus 100F employing an image processing apparatus according to the eighth embodiment of the present disclosure.

Figure 43:
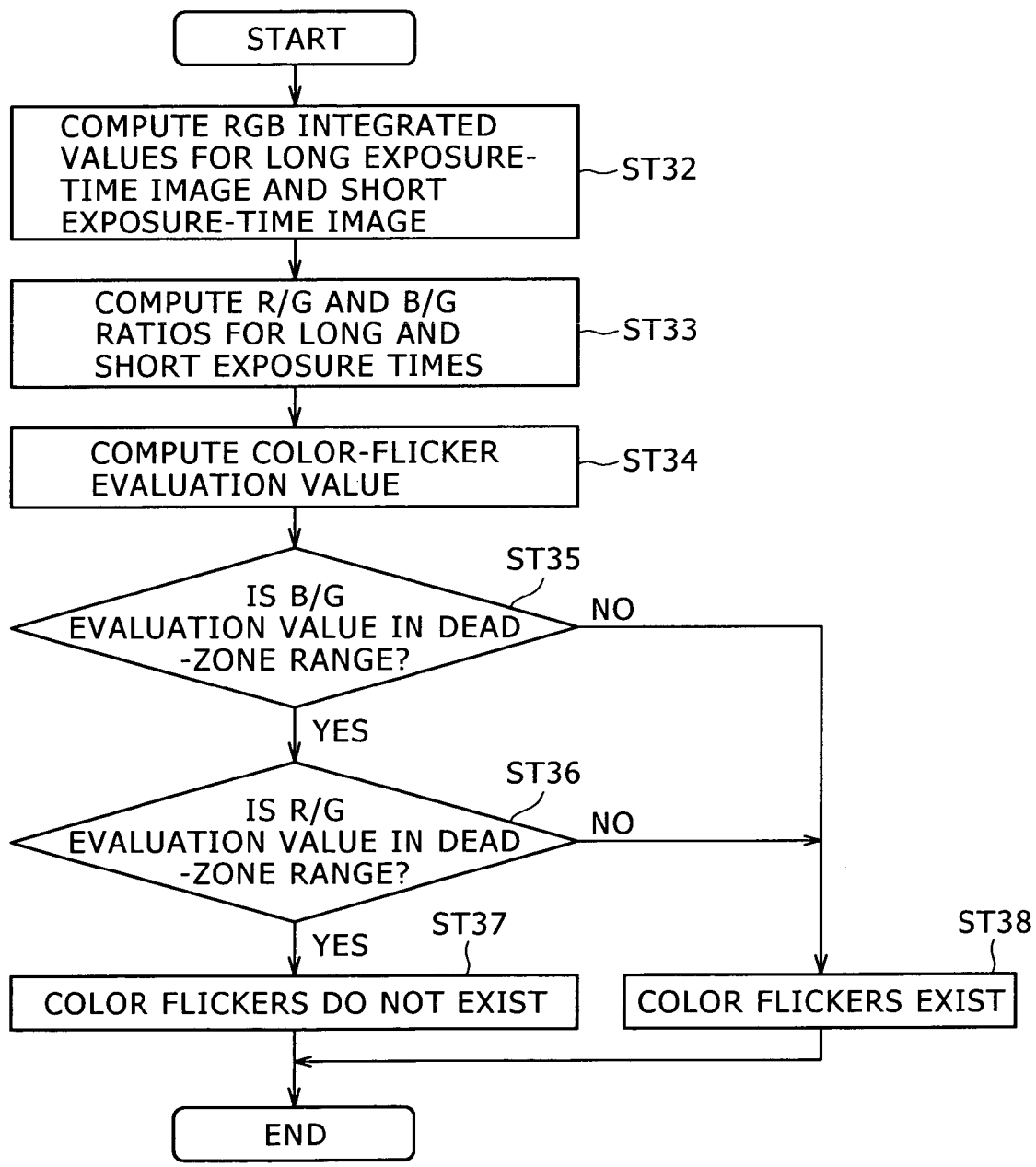
FIG. 43 shows a flowchart representing processing to detect color flickers in accordance with the eighth embodiment.

FIG. 43 shows a flowchart representing processing to detect color flickers in accordance with the eighth embodiment.

Figure 44:
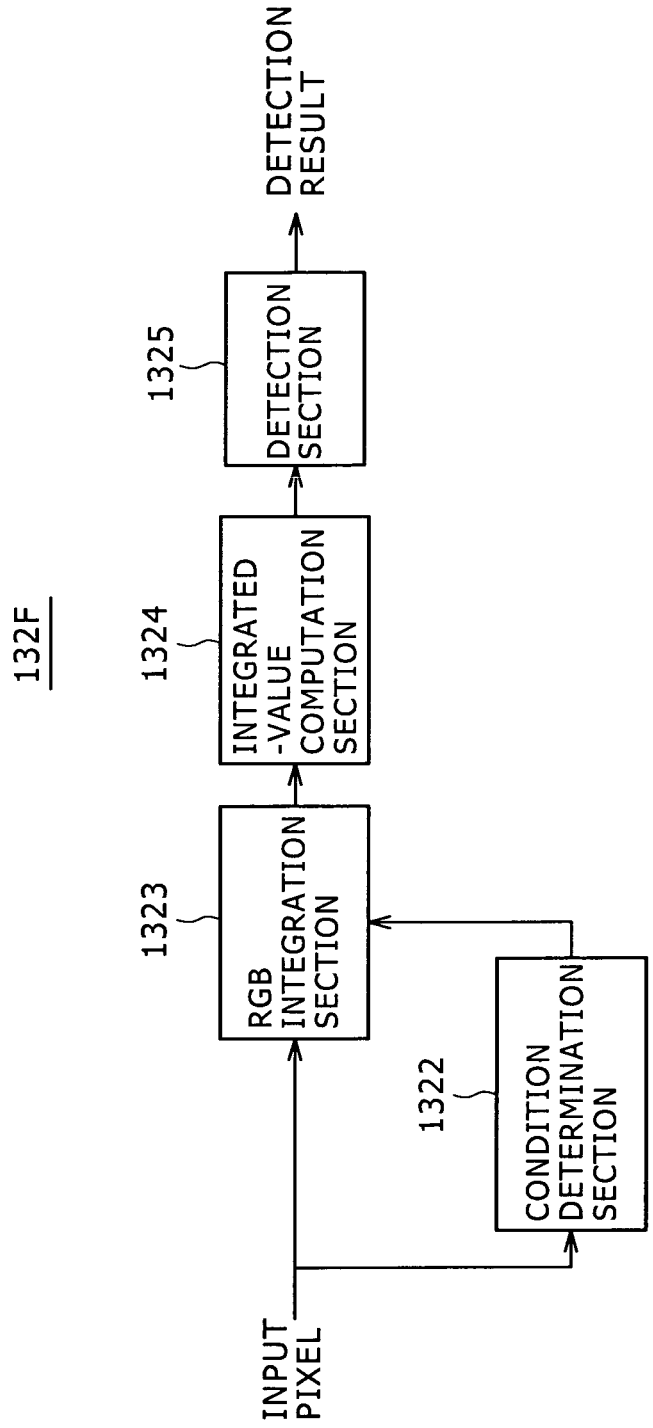
FIG. 44 is a block diagram showing a typical configuration of a color-flicker detection processing section according to the eighth embodiment.

FIG. 44 is a block diagram showing a typical configuration of a color-flicker detection processing section 132F according to the eighth embodiment.

Figure 3:
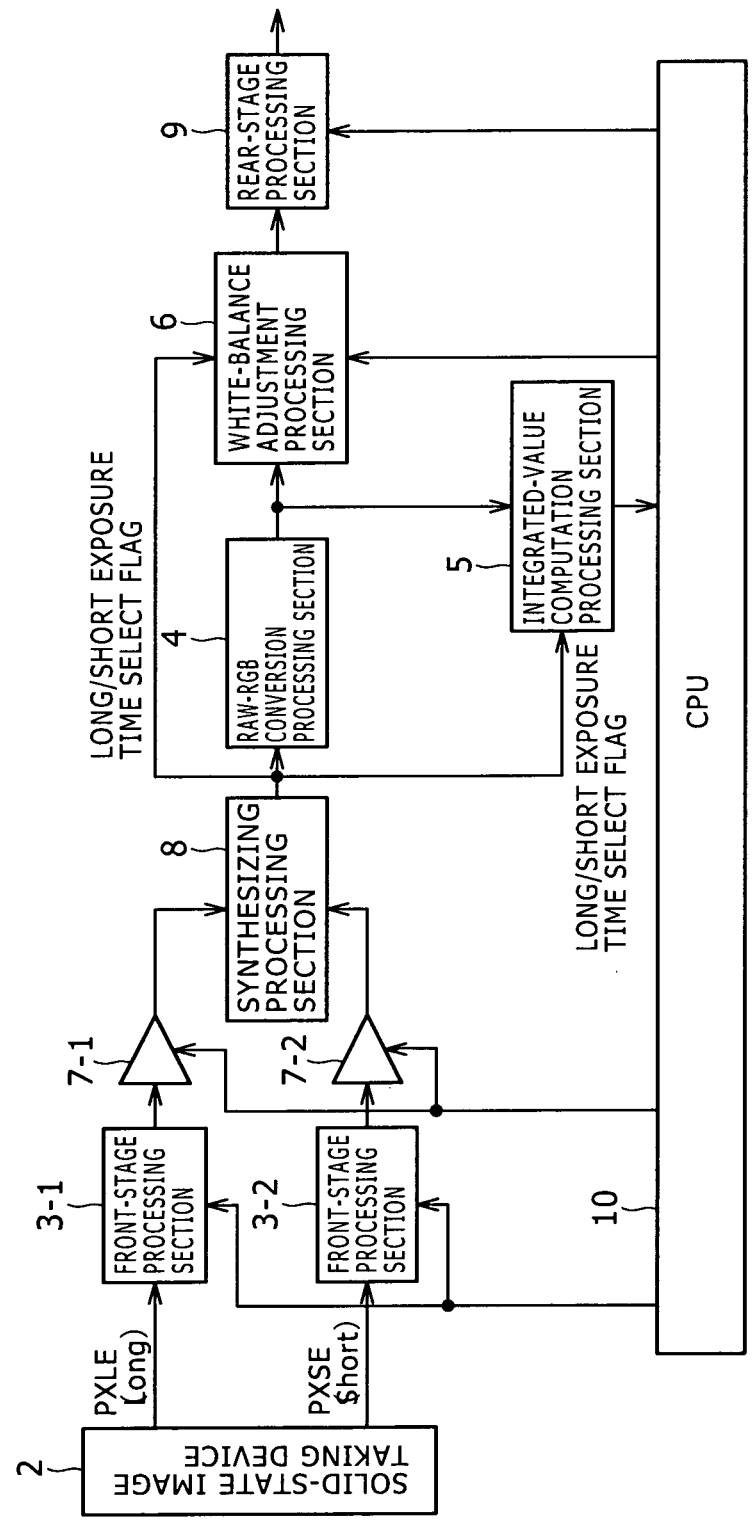
FIG. 3 is a block diagram showing a second typical image taking apparatus for carrying out white-balance adjustment processing for an image taken by making use of short exposure time light and white-balance adjustment processing for an image taken by making use of long exposure time light separately from each other.

A difference between the image taking apparatus 100F according to the eighth embodiment and the image taking apparatus 100E according to the seventh embodiment is described as follows:

The seventh embodiment is an embodiment in which the white-balance adjustment processing is carried out at the rear stage in the same way as the configuration shown in FIG. 3.

Figure 1:
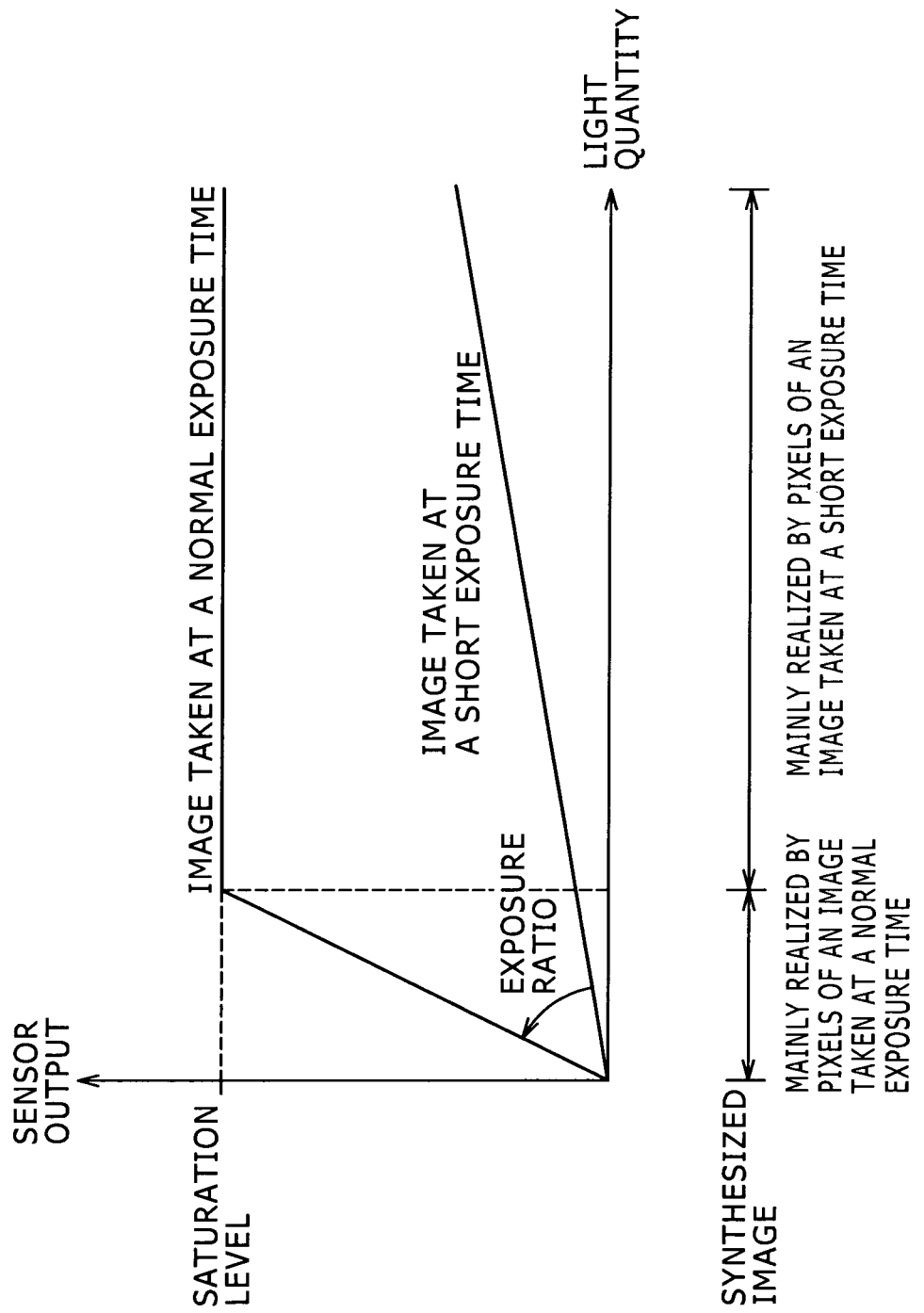
FIG. 1 is a conceptual diagram showing relations between the sensor output and the light quantity for images required for generating an image having a wide dynamic range.
Figure 2:
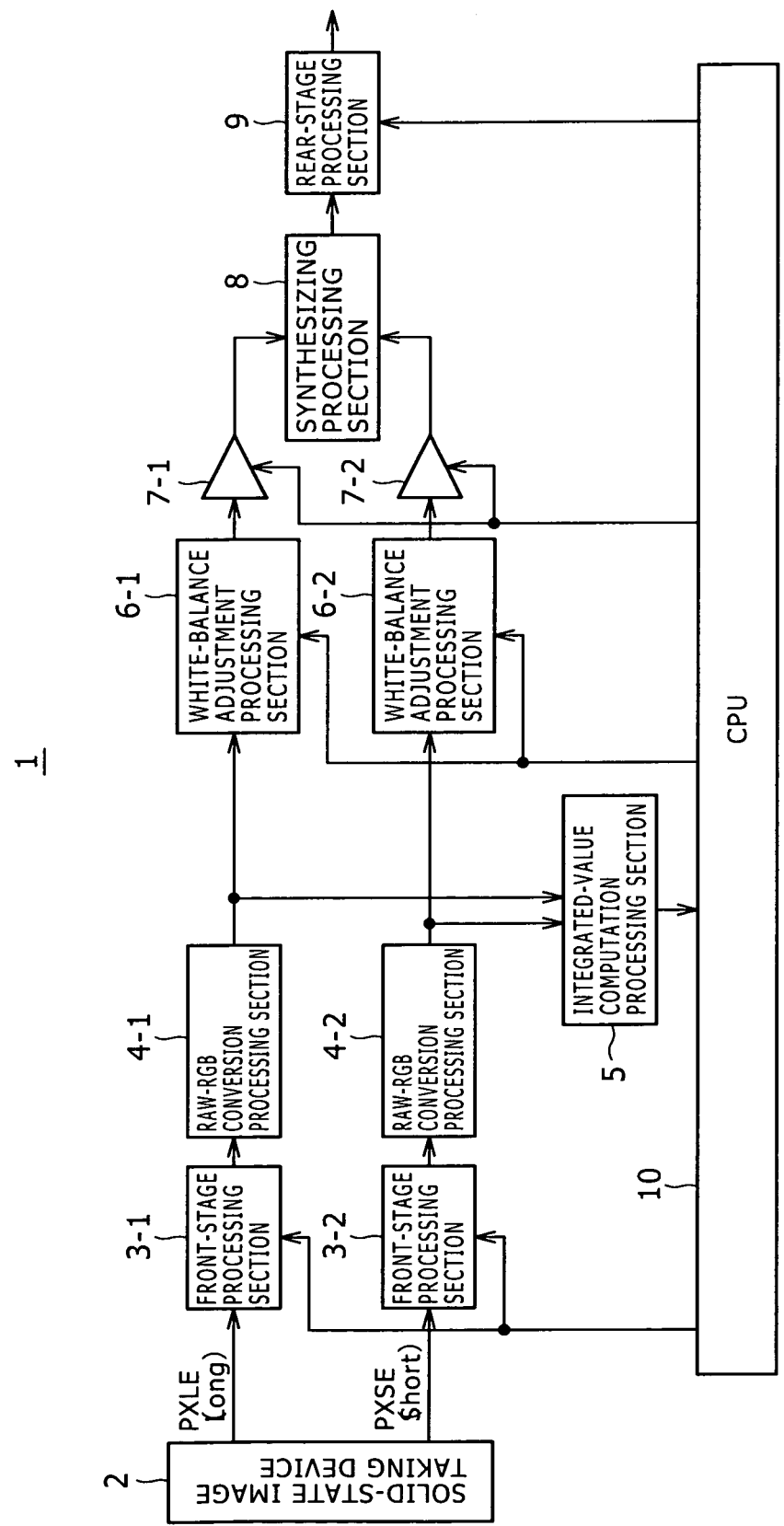
FIG. 2 is a block diagram showing a first typical image taking apparatus for carrying out white-balance adjustment processing for an image taken by making use of short exposure time light and white-balance adjustment processing for an image taken by making use of long exposure time light separately from each other.

On the other hand, the eighth embodiment is an embodiment in which the white-balance adjustment processing is carried out at the front stage in the same way as the configuration shown in FIG. 2.

Thus, in the case of the eighth embodiment, the RAW-RGB conversion is not required in the processing to detect color flickers as shown in FIGS. 43 and 44.

9: Ninth Embodiment

The ninth embodiment of the present disclosure is explained below to serve as an embodiment in which static/dynamic-state determination is added to the conditions applied to the R, G and B integrated values.

Figure 45:
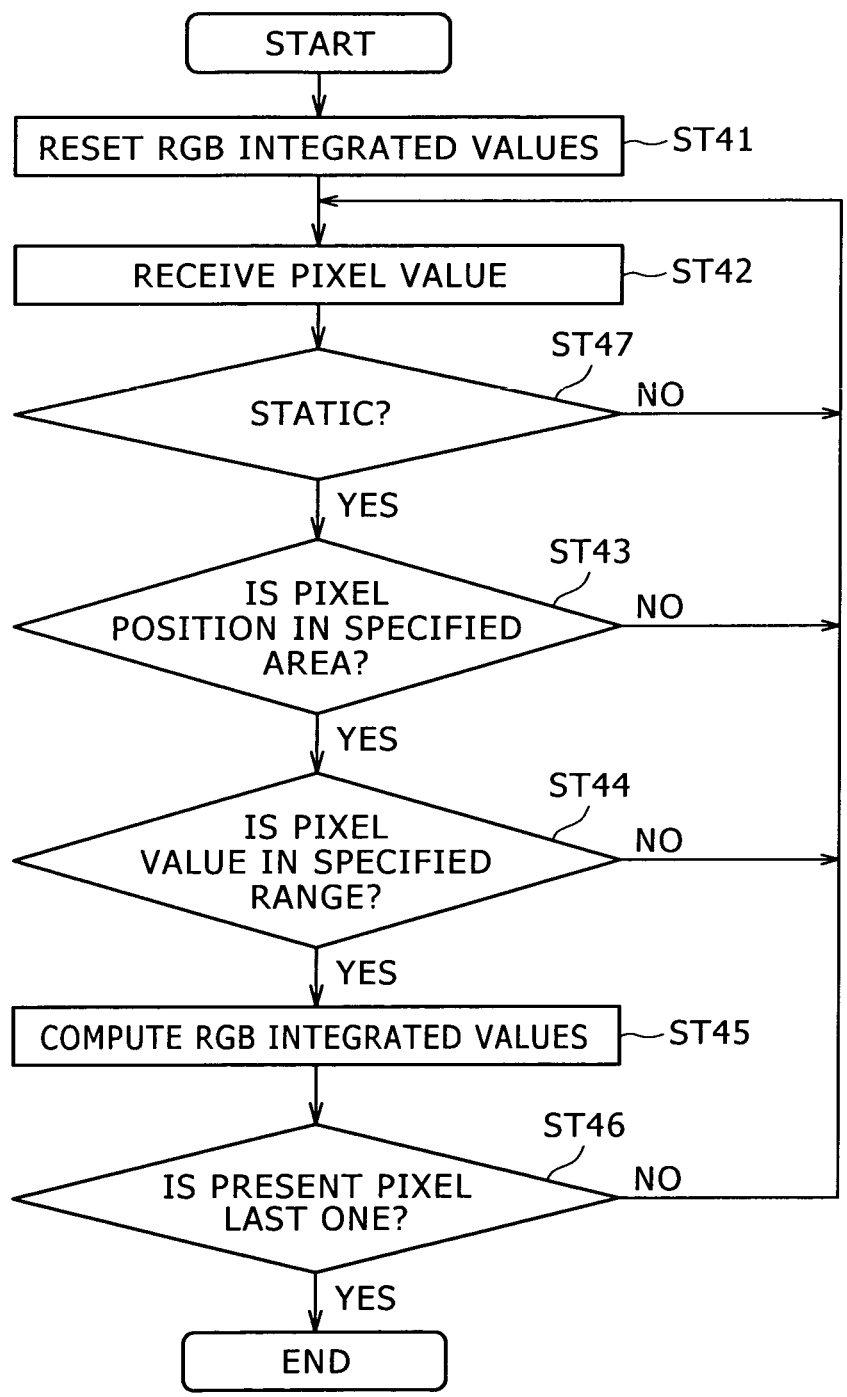
FIG. 45 shows a flowchart representing processing for a case in which static/dynamic-state determination for R, G and B integrated values is included as an additional condition in accordance with a ninth embodiment of the present disclosure.

FIG. 45 shows a flowchart representing processing for a case in which static/dynamic-state determination for R, G and B integrated values is included as an additional condition in accordance with the ninth embodiment of the present disclosure.

Typical Configuration for Adding Static/Dynamic-State Determination to Conditions for RGB Integrated Values In the case of the eighth embodiment, values of pixels having information meaningful for both the long time exposure image and the short time exposure image are integrated. For the same pixel, except for color flickers, it is assumed that the ratio for the long time exposure image is different from the ratio for the short time exposure image. Ideally, the evaluation value is 1.0.

Since there is a small difference in image taking time between the long exposure-time image and the short exposure-time image, however, a moving object may pass through during this short time difference. If a moving object passes through during this short time difference, the presumption of the same image taking object is undesirably no longer valid so that the result of color-flicker detection is affected.

In order to solve the problem described above, in the ninth embodiment, static/dynamic-state determination is carried out for every pixel or every block of pixels as a newly added condition referred to as a static-state condition. In this way, color flickers can be detected with a high degree of precision (refer to a flowchart shown in FIG. 45).

In the ninth embodiment, as is the case with the existing technology, a mechanism for obtaining a motion vector or information in the course of the process of obtaining the motion vector may be used in order to determine a static or dynamic state on the basis of data such as differences between preceding and succeeding frames along the time axis.

Figure 46:
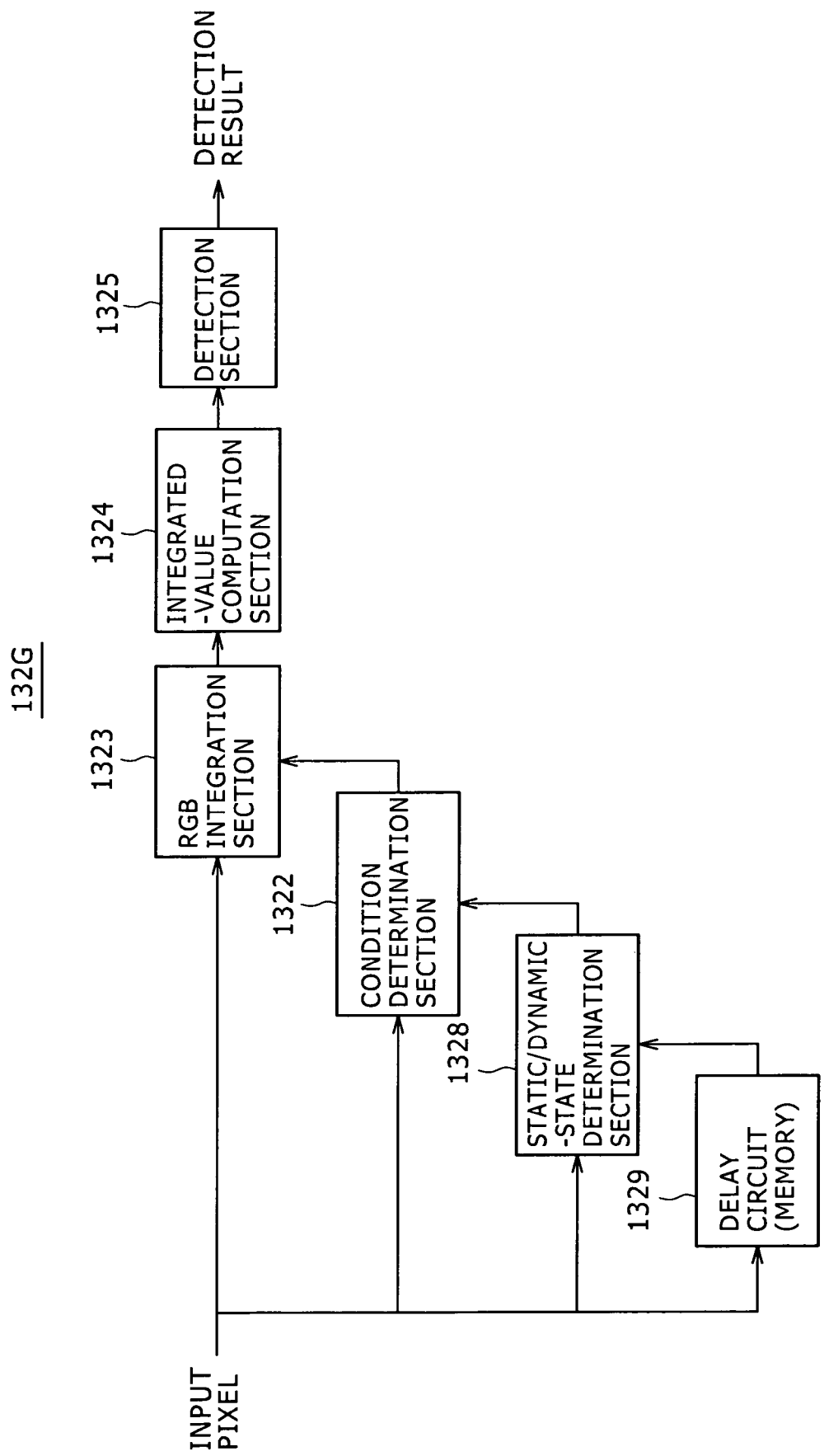
FIG. 46 is a block diagram showing a typical configuration of a color-flicker detection processing section provided with a static/dynamic-state determination function in accordance with the ninth embodiment.

FIG. 46 is a block diagram showing a typical configuration of the color-flicker detection processing section 132G provided with a static/dynamic-state determination function in accordance with the ninth embodiment.

As shown in the figure, the color-flicker detection processing section 132G employs a condition determination section 1322, an RGB integration section 1323, an evaluation-value computation section 1324, a detection section 1325, a static/dynamic-state determination section 1328 and a memory used as a delay circuit 1329.

These sections carry out their respective pieces of processing in order to accomplish the processing to detect color flickers.

10: Tenth Embodiment

A typical embodiment described below as the tenth embodiment of the present disclosure integrates evaluation values instead of integrating R, G and B integrated values.

Figure 47:
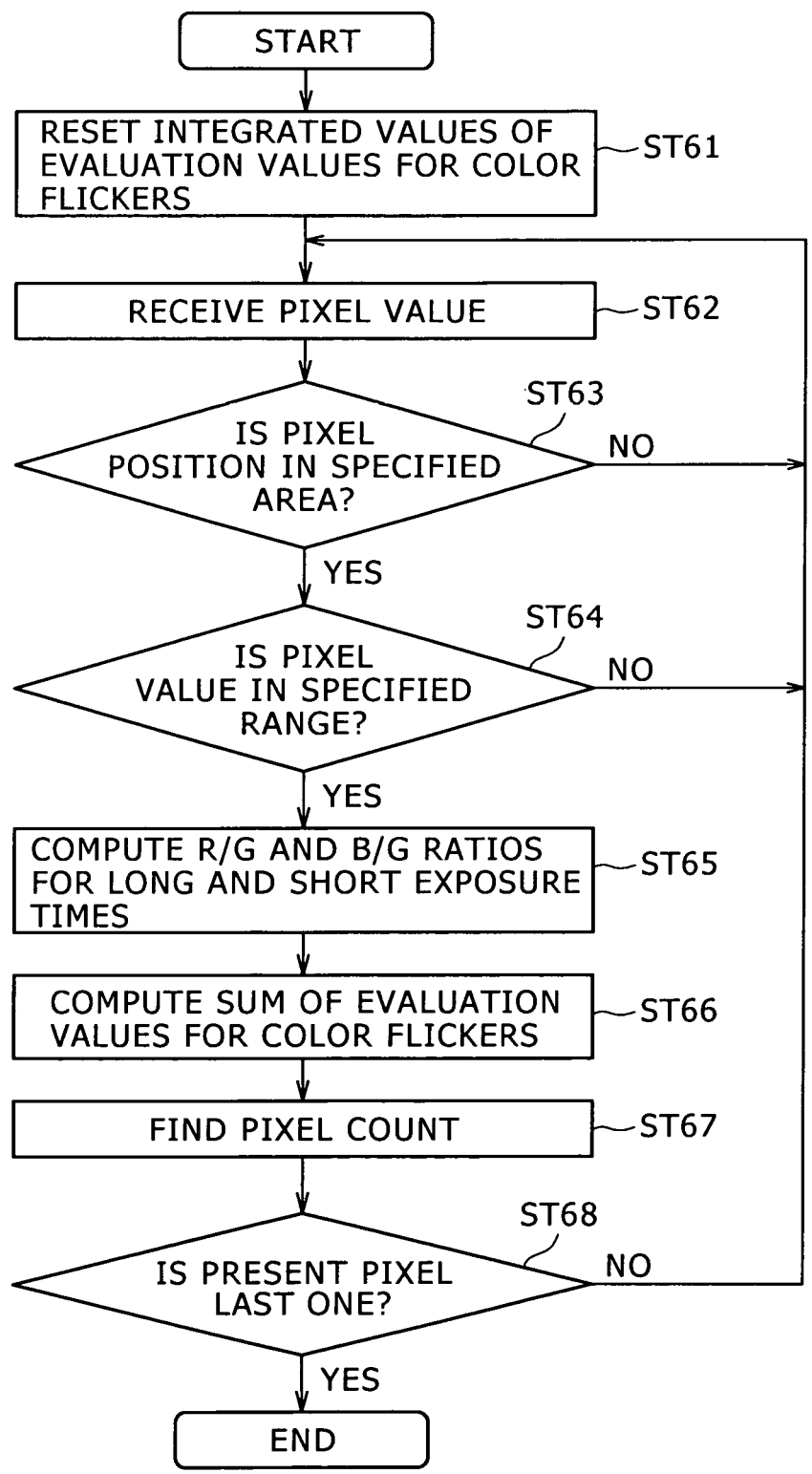
FIG. 47 shows a flowchart representing processing to integrate evaluation values in accordance with a tenth embodiment of the present disclosure instead of integrating R, G and B integrated values.

FIG. 47 shows a flowchart representing processing to integrate evaluation values in accordance with the tenth embodiment of the present disclosure instead of integrating R, G and B integrated values.

Figure 48:
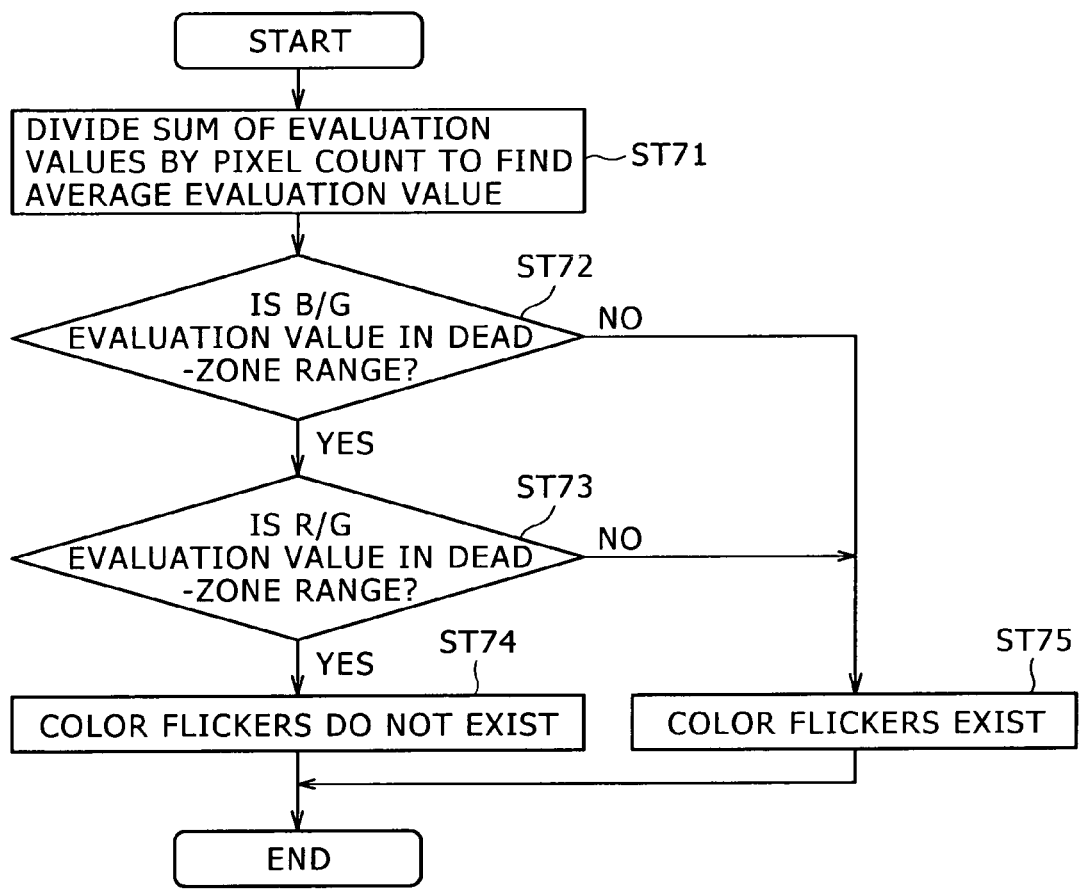
FIG. 48 shows a flowchart representing color-flicker determination processing for a case in which the processing to integrate evaluation values has been carried out.

FIG. 48 shows a flowchart representing color-flicker determination processing for a case in which the processing to integrate evaluation values has been carried out.

Typical Configuration for Integrating Evaluation Values in Place of R, G and B Integrated Values In the case of the embodiments described before, R, G and B integrated values are computed and a color-flicker evaluation value is obtained from the integrated values.

As explained earlier, however, there is a difference between a configuration in which an evaluation value is obtained from R, G and B integrated values and a configuration in which an evaluation value is obtained for every pixel and, then, an integrated value is obtained as the average of the evaluation values.

For the latter case, FIG. 47 is given as a figure showing a flowchart representing processing to integrate evaluation values at a step ST66 in accordance with the tenth embodiment whereas FIG. 48 is given as a figure showing a flowchart representing color-flicker determination processing for a case in which the processing to integrate evaluation values has been carried out as shown in the flowchart of FIG. 47.

That is to say, a process carried out to compute the average of evaluation values at a step ST71 of the flowchart shown in FIG. 48 is described in detail in the flowchart shown in FIG. 47.

The flowchart shown in FIG. 47 begins with a step ST61 at which the integrated values of the evaluation values for the color flickers are reset. Then, at the next step ST62, a pixel value is received.

Subsequently, at the next step ST63, the pixel is examined in order to determine whether or not the pixel is located at a position in a specified area. If the pixel is located at a position in the specified area, at a step ST64, the pixel value is examined in order to determine whether or not the pixel value is within a specified range. If the pixel value is within the specified range, at a step ST65, R/G and B/G ratios are computed for each of the long time exposure image and the short time exposure image whereas evaluation values for color flickers are obtained from the R/G and B/G ratios. Then, at the next step ST66, an evaluation-value sum representing a sum of evaluation values for color flickers is computed.

Subsequently, at the next step ST67, a pixel count representing the number of pixels processed so far is updated. Then, at the next step ST68, the present pixel is examined in order to determine whether or not the present pixel is the last processed pixel. If the present pixel is not the last processed pixel, the processing to integrate evaluation values is repeated. As a matter of fact, the processing to integrate evaluation values is carried out repeatedly till the last pixel is processed.

The flowchart shown in FIG. 48 begins with a step ST71 at which the evaluation-value sums obtained at the step ST66 of the flowchart shown FIG. 47 are divided by the pixel count obtained at the step ST67 of the flowchart shown FIG. 47 in order to find B/G and R/G average evaluation values.

Then, at the next step ST72, the B/G average evaluation value is examined in order to determine whether or not the B/G average evaluation value is in the range of a dead zone. If the B/G average evaluation value is in the range of the dead zone, the R/G average evaluation value is examined at a step ST73 in order to determine whether or not the R/G average evaluation value is in the range of the dead zone. If the R/G average evaluation value is in the range of the dead zone, nonexistence of color flickers is confirmed at a step ST74.

If the B/G average evaluation value is obtained at the step ST72 to be not in the range of the dead zone and/or if the R/G average evaluation value is obtained at the step ST73 to be not in the range of the dead zone, existence of color flickers is confirmed at a step ST75.

11: Eleventh Embodiment

In a typical embodiment explained below as the eleventh embodiment of the present disclosure, processing to divide a color-flicker detection area is carried out.

Figure 49:
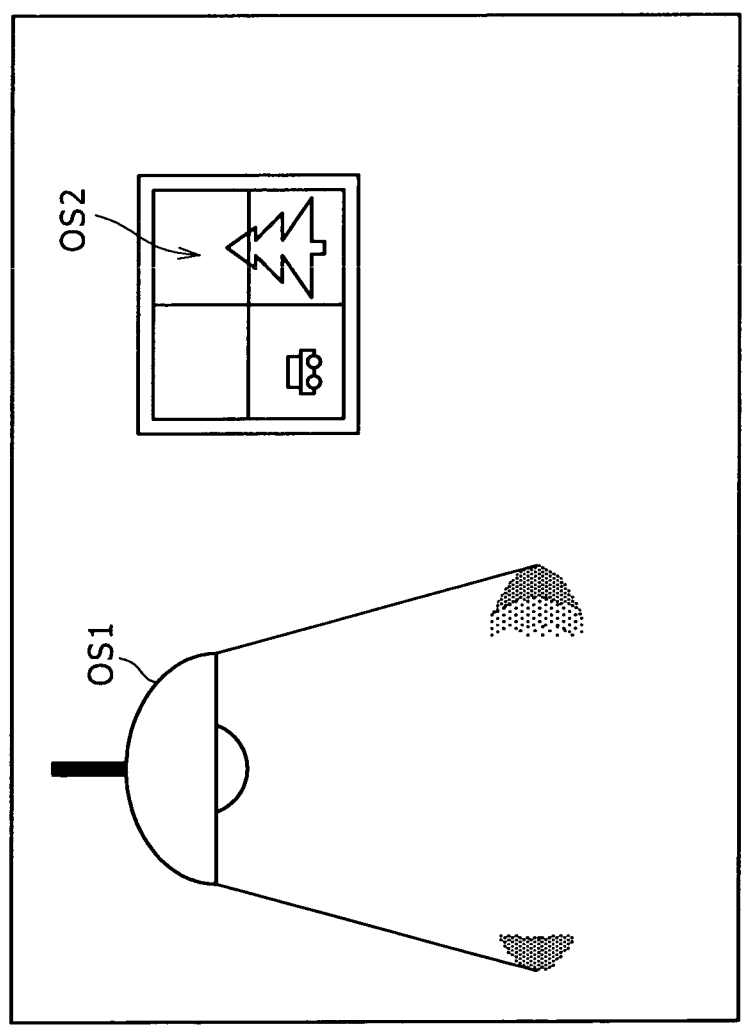
FIG. 49 serves as an explanatory diagram to be referred to in description of a case in which processing to divide a color-flicker detection area is carried out in accordance with an eleventh embodiment of the present disclosure as well as a diagram showing a typical situation in which a plurality of optical sources exist.

FIG. 49 serves as an explanatory diagram referred to a case in which processing to divide a color-flicker detection area is carried out in accordance with the eleventh embodiment as well as a diagram showing a typical situation in which a plurality of optical sources exist.

Figure 50:
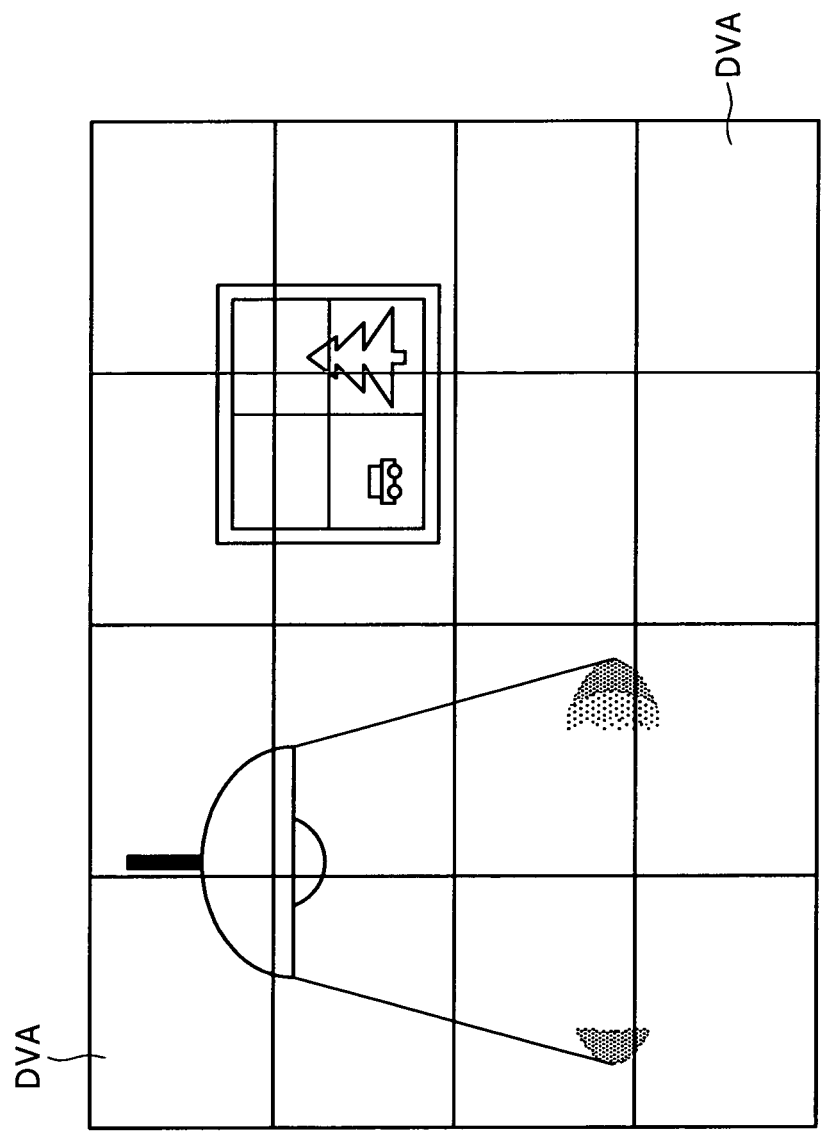
FIG. 50 is an explanatory diagram to be referred to in description of a case in which processing to divide a color-flicker detection area is carried out in accordance with the eleventh embodiment.

FIG. 50 is an explanatory diagram referred to a case in which processing to divide a color-flicker detection area is carried out in accordance with the eleventh embodiment.

Processing to Divide a Color-Flicker Detection Area

In accordance with the embodiments described earlier, more robust color-flicker detection is possible so that generated color flickers can be suppressed effectively.

In the case of the embodiments described earlier, however, each of the long time exposure image and the short time exposure image can be multiplied only by a set of white-balance gains, i.e., the R, G and B gains.

In consequence, if a plurality of optical sources with characteristics different from each other exist in the short time exposure image, only color flickers caused by any one of the optical sources can be dealt with.

In the case of a situation like the one shown in FIG. 49 for example, optical sources providing information meaningful for the short time exposure image are an indoor lamp serving as an optical source OS1 and a sunlight source serving as an optical source OS2 which is an external optical source that can be seen through a window. In such a situation, if color flickers caused by the indoor lamp are suppressed, white-balance adjustment can no longer be carried out on the external scene which can be seen through the window.

In order to solve the above problem, as shown in FIG. 50, the screen is divided into several areas DVA for each of which the same processing can be carried out.

If the screen is divided into several areas DVA, however, for an area DVA, the short time exposure image may not exist and the number of pixels may be too small so that correct values may not be integrated. In such a case, if the computed pixel count is too small, control is executed to cancel the suppression of color flickers.

12: Twelfth Embodiment

Figure 51:
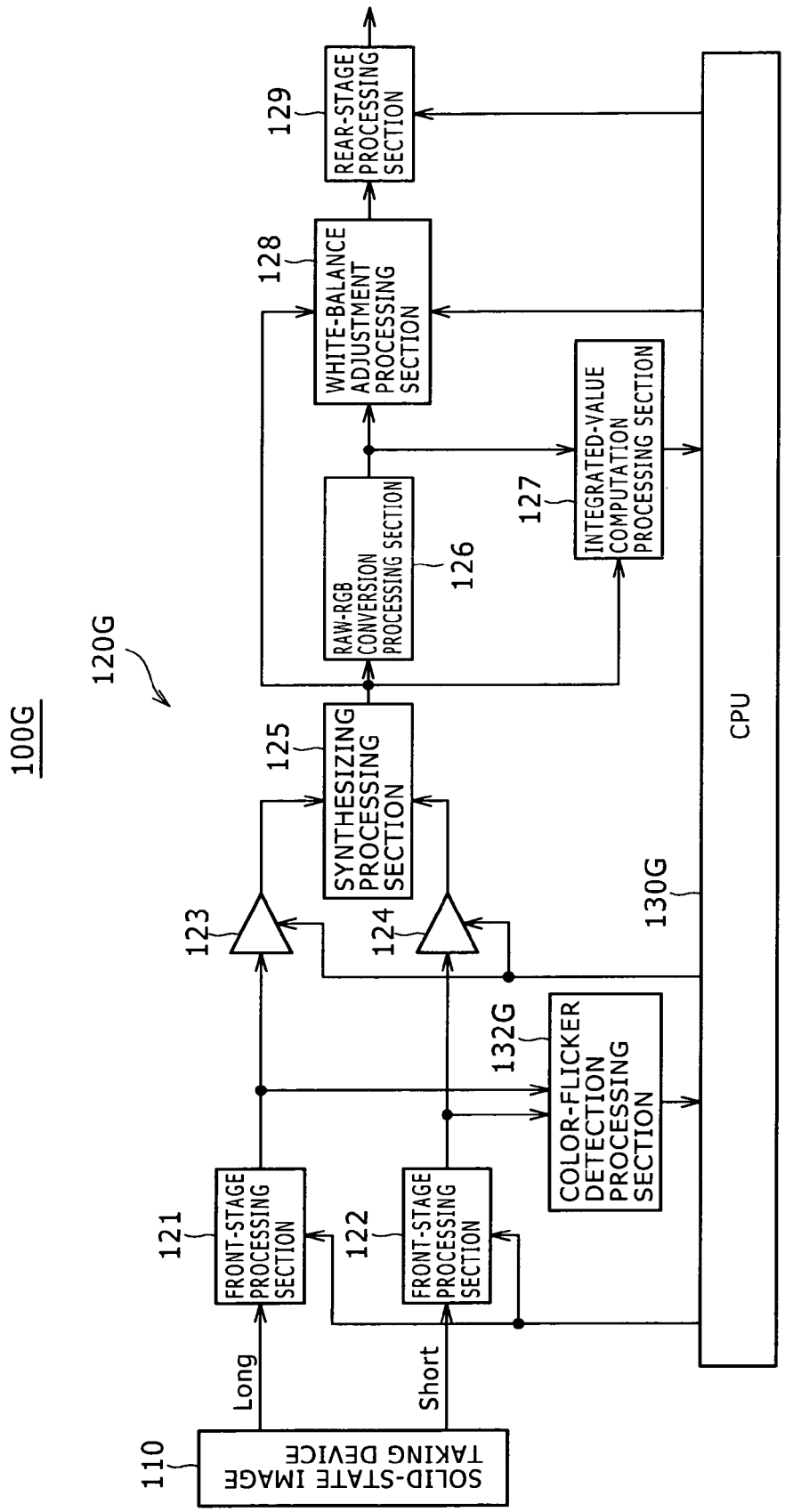
FIG. 51 is a block diagram showing a typical configuration of an image taking apparatus employing an image processing apparatus according to a twelfth embodiment of the present disclosure.

FIG. 51 is a block diagram showing a typical configuration of an image taking apparatus 100G employing an image processing apparatus 120G according to the twelfth embodiment of the present disclosure.

The image taking apparatus 100G according to the twelfth embodiment is different from the image taking apparatus 100E according to the seventh embodiment in that, in the case of the image taking apparatus 100E, the typical processing of the seventh embodiment is carried out by hardware. The typical processing includes the processing to compute an evaluation value.

In order to find a ratio in the processing to compute an evaluation value, however, a divider is required so that it is quite within the bounds of possibility that the size of the hardware circuit of the image taking apparatus 100E increases.

In order to solve the above problem, the twelfth embodiment adopts a method to make use of the CPU 130G to carry out some of the processing. To put it concretely, in the case of the twelfth embodiment, the color-flicker detection processing section 132G carries out processing up to the integration process by making use of hardware whereas the CPU 130G carries out the computation of an evaluation value and the determination as to whether or not color flickers exist.

13: Thirteenth Embodiment

Figure 52:
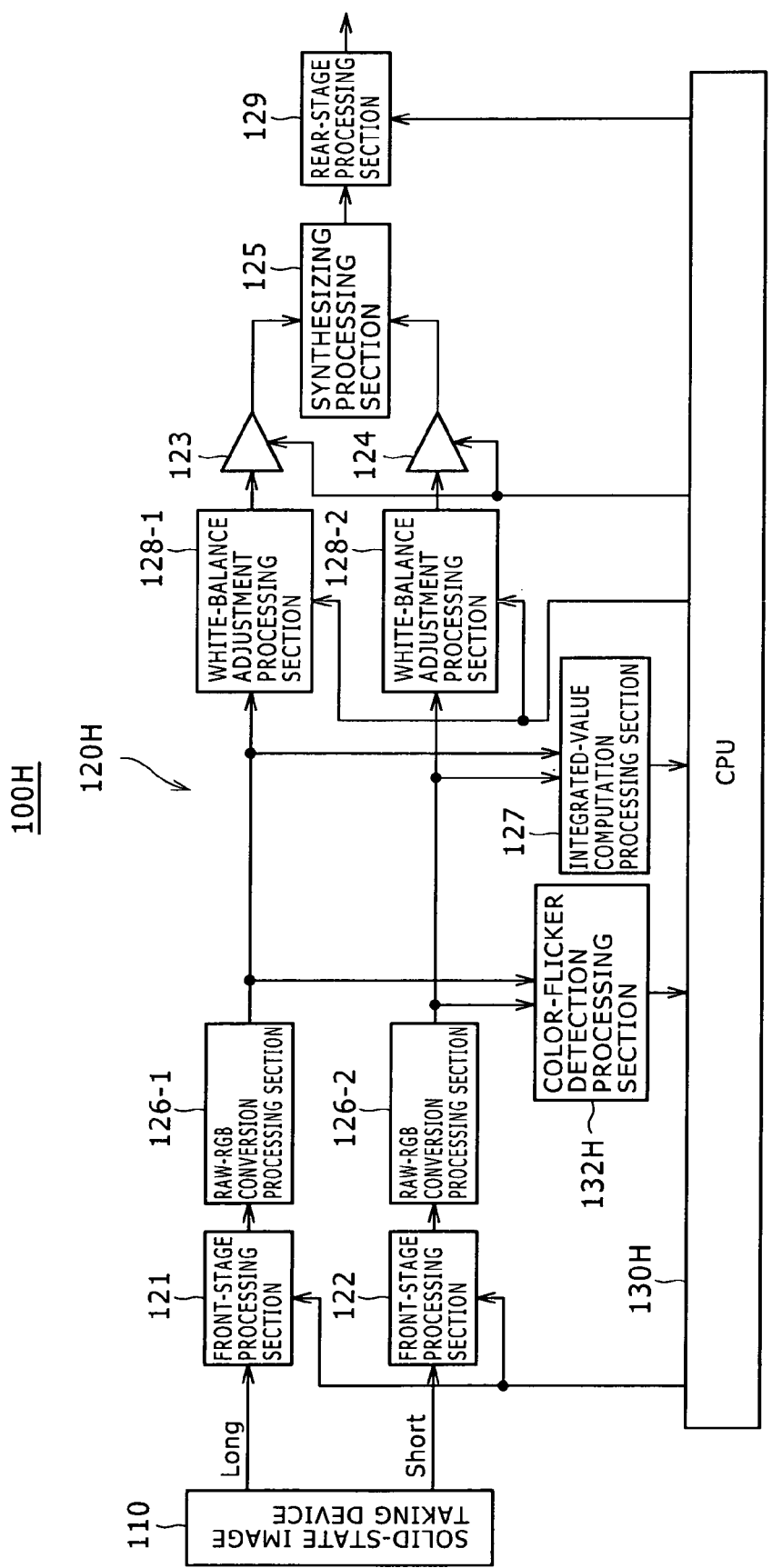
FIG. 52 is a block diagram showing a typical configuration of an image taking apparatus employing an image processing apparatus according to a thirteenth embodiment of the present disclosure.

FIG. 52 is a block diagram showing a typical configuration of an image taking apparatus 100H employing an image processing apparatus 120H according to a thirteenth embodiment of the present disclosure.

The image taking apparatus 100H according to the thirteenth embodiment is different from the image taking apparatus 100F according to the eighth embodiment in that, in the case of the image taking apparatus 100F, the typical processing of the eighth embodiment is carried out by hardware. The typical processing includes the processing to compute an evaluation value.

In order to find a ratio in the processing to compute an evaluation value, however, a divider is required so that it is quite within the bounds of possibility that the size of the hardware circuit of the image taking apparatus 100F increases.

In order to solve the above problem, the thirteenth embodiment adopts a method to make use of the CPU 130H to carry out some of the processing. To put it concretely, in the case of the thirteenth embodiment, the color-flicker detection processing section 132H carries out processing up to the integration process by making use of hardware whereas the CPU 130H carries out the computation of an evaluation value and the determination as to whether or not color flickers exist.

14: Fourteenth Embodiment

Each of fourteenth and fifteenth embodiments of the present disclosure implements a typical configuration in which delay adjustment is carried out in order to cope with delayed white-balance gains used for detecting and suppressing color flickers.

Figure 53:
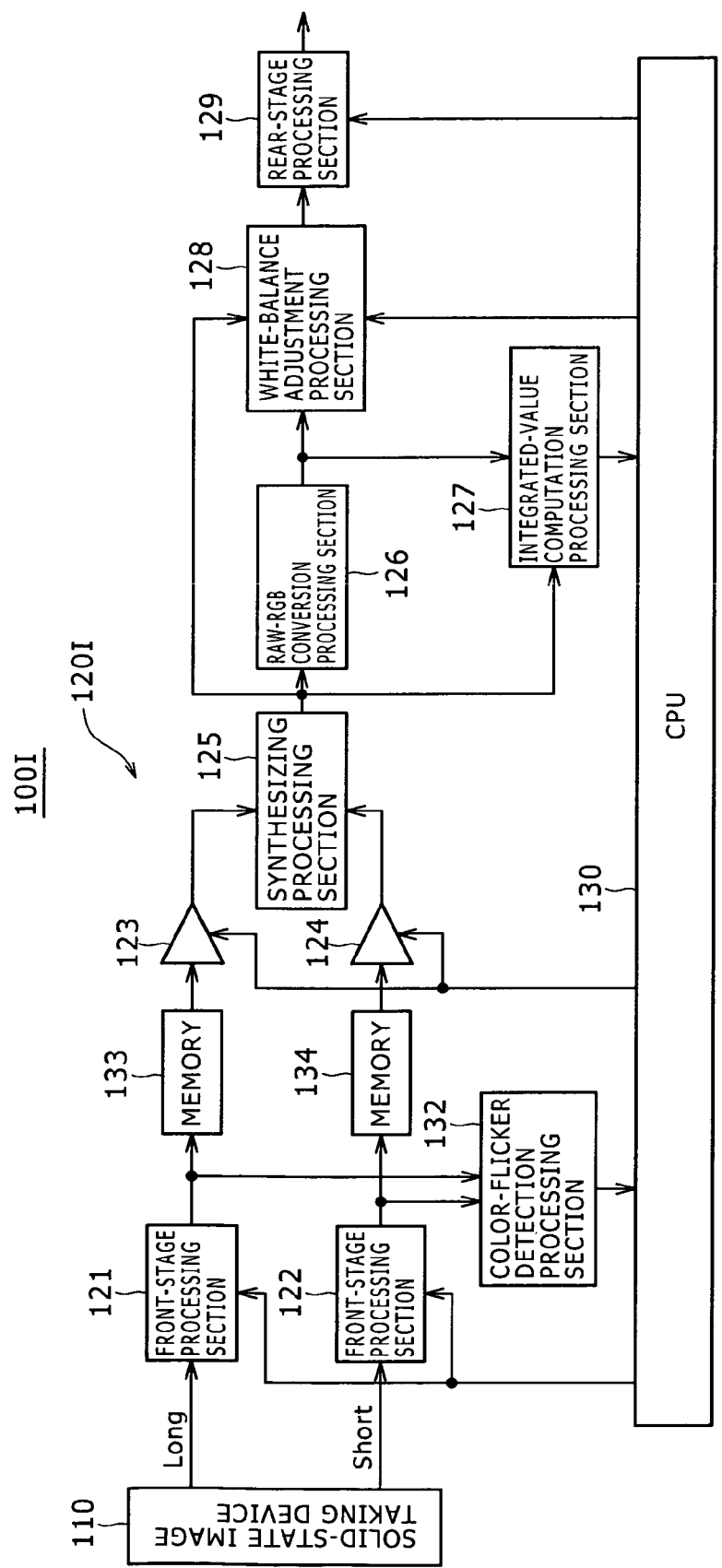
FIG. 53 is a block diagram showing a typical configuration of an image taking apparatus employing an image processing apparatus according to a fourteenth embodiment of the present disclosure.

FIG. 53 is a block diagram showing a typical configuration of an image taking apparatus 100I employing an image processing apparatus 120I according to the fourteenth embodiment of the present disclosure.

The image taking apparatus 100I according to the fourteenth embodiment is different from the image taking apparatus 100E according to the seventh embodiment in that, in the case of the image taking apparatus 100I, delay adjustment is carried out in order to make a frame, from which evaluation values have been computed, the same as a frame for which white-balance gains have been computed for the white-balance adjustment processing. Thus, the image taking apparatus 100I employs additional memories 133 and 134 for the delay adjustment.

15: Fifteenth Embodiment

Figure 54:
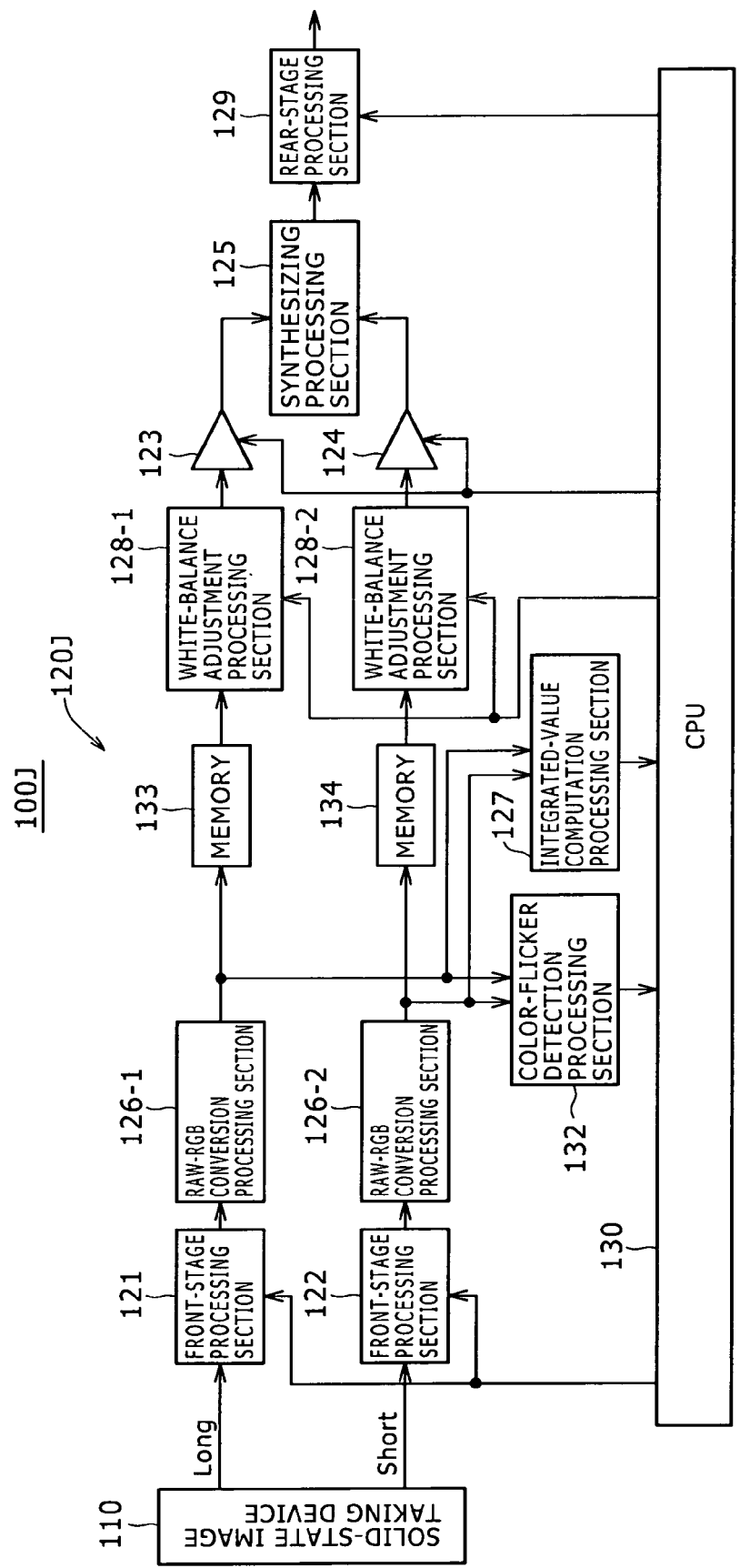
FIG. 54 is a block diagram showing a typical configuration of an image taking apparatus employing an image processing apparatus according to a fifteenth embodiment of the present disclosure.

FIG. 54 is a block diagram showing a typical configuration of an image taking apparatus 100J employing an image processing apparatus 120J according to a fifteenth embodiment of the present disclosure.

The image taking apparatus 100J according to the fifteenth embodiment is different from the image taking apparatus 100F according to the eighth embodiment in that, in the case of the image taking apparatus 100J, delay adjustment is carried out in order to make a frame, from which evaluation values have been computed, the same as a frame for which white-balance gains have been computed for the white-balance adjustment processing. Thus, the image taking apparatus 100J employs additional memories 133 and 134 for the delay adjustment.

Delay Adjustment for Delayed White-Balance Gains Used for Detecting and Suppressing Color Flickers In the typical processing carried out by the embodiments described earlier, white-balance gains for each of the long exposure-time image and the short exposure-time image are computed from integration results obtained from the integration processing carried out on all pixels of an entire frame. Thus, in order to complete the integration processing, it takes time corresponding to one frame so that the white-balance gains are delayed accordingly. In addition, the CPU 130 also carries out processing to compute evaluation values from the integration results so that it also takes time as well to compute the evaluation values.

Thus, in the typical processing carried out by the embodiments described earlier, a frame from which evaluation values have been computed by carrying out integration processing is different from a frame for which the white-balance adjustment is to be executed by making use of the white-balance gains in actuality.

In the case of the fourteenth and fifteenth embodiments, on the other hand, a frame from which evaluation values have been computed is made the same as a frame for which the white-balance adjustment is to be executed by making use of the white-balance gains. By adding the memories 133 and 134 to the configuration shown in FIG. 42, delay adjustment can be carried out so as to make a frame, from which evaluation values have been computed, the same as a frame for which the white-balance adjustment is to be executed.

It is to be noted that characteristics peculiar to the embodiments described so far can be properly combined with each other.

In accordance with the seventh to fifteenth embodiments, the following effects can be obtained.

In comparison with the existing white-balance adjustment processing, more diversified white-balance adjustment processing can be carried out. That is to say, white-balance adjustment processing proper for an application can be carried out.

In addition, more robust color flicker detection is possible.

White-balance adjustment processing proper for the degree of certainty at which color flickers are detected can be carried out so that the color flickers can be suppressed effectively.

Even for an image with a wide dynamic range, proper white-balance adjustment processing can be carried out so that the color flickers can be suppressed effectively.

Since determination of the existence of color flickers is carried out for each frame without taking the time-axis direction periodicity into consideration, the white-balance adjustment processing can be carried out on color flickers other than periodical color flickers. Thus, proper suppression of color flickers is possible.

The image taking apparatus according to the embodiments described above can each be used as an apparatus having a variety of image taking functions. Typical examples of the apparatus having a variety of image taking functions are a portable phone, a video camera and a digital still camera.

It is to be noted that the method explained above in detail can be configured by implementing the method as a program which is to be executed by a computer such as a CPU to serve as a program according to the procedure of the method.

In addition, the program can be configured as a program stored in advance on a recording medium to be accessed by the computer in order to have the program executed by the computer on which the recording medium is mounted. Typical examples of the recording medium are a semiconductor memory, a magnetic disk, an optical disk and a floppy (a registered trademark) disk.

The present disclosure contains subject matter related to that disclosed in Japanese Priority Patent Application JP 2010-144205 filed in the Japan Patent Office on Jun. 24, 2010, the entire content of which is hereby incorporated by reference.

It should be understood by those skilled in the art that various modifications, combinations, sub-combinations and alternations may occur depending on design requirements and other factors insofar as they are within the scope of the appended claims or the equivalent thereof.

What is claimed is:

1. An image processing apparatus comprising
a synthesizing processing section configured to synthesize a plurality of images taken with different exposure durations, said synthesizing processing section including a movement determination section configured to carry out a movement determination and configured to correct said blending ratio by making use of a result of said movement determination,
wherein, in processing to synthesize said taken images, said synthesizing processing section is configured to acquire a taken-image blending ratio which varies in accordance with components selected from said taken images and to carry out movement determination; and
wherein said synthesizing processing section computes said blending ratio if said result of said movement determination indicates a static state and outputs one of said taken images without carrying out said blending process if said result of said movement determination indicates a dynamic state.

2. The image processing apparatus according to claim 1 wherein said synthesizing processing section is further configured to:
acquire said blending ratio computed on the basis of luminance components of said taken images;
make use of said blending ratio in said blending process carried out on said blend area;
select any image from said taken images; and
apply a color component of said selected image to said blend area.

3. The image processing apparatus according to claim 2 wherein
said different exposure durations include a first exposure duration and a second exposure duration, wherein said first exposure duration is longer than said second exposure duration, and
said synthesizing processing section is further configured to:
select an image taken at said first exposure duration from said taken images; and
apply a color component of said selected image taken at said first exposure duration to said blend area.

4. The image processing apparatus according to claim 2, said image processing apparatus further comprising
a white-balance adjustment processing section configured to carry out white-balance adjustment processing of multiplying a synthesized image synthesized in said synthesizing processing section by gains,
wherein said white-balance adjustment processing section multiplies color components of said synthesized image by said gains computed for said color components respectively in said white-balance adjustment processing.

5. The image processing apparatus according to claim 1, said image processing apparatus further comprising
a white-balance adjustment processing section configured to carry out white-balance adjustment processing of multiplying a synthesized image synthesized in said synthesizing processing section by gains, wherein:
said synthesizing processing section acquires said blending ratio from raw data of said taken images at a synthesizing time and supplies said synthesizing-time blending ratio to said white-balance adjustment processing section;
said white-balance adjustment processing section computes said gains on the basis of said synthesizing-time blending ratio; and
said white-balance adjustment processing section multiplies said synthesized image by said computed gains in said white-balance adjustment processing.

6. The image processing apparatus according to claim 1, said image processing apparatus further comprising:
a white-balance adjustment processing section configured to carry out white-balance adjustment processing of multiplying a synthesized image synthesized in said synthesizing processing section by white-balance gains; and
a section configured to carry out delay adjustment on said acquired blending ratio and the image of a frame for which said white-balance gains of said frame image have been computed.

7. The image processing apparatus according to claim 1 wherein said synthesizing processing section carries out a blending process on a blend area in which pixels of said taken images are to be blended by applying said blending ratio to said blend area.

8. An image taking apparatus comprising:
an image taking device configured to take a plurality of images with different exposure durations; and
a synthesizing processing section configured to synthesize said images taken by said image taking device, said synthesizing processing section including a movement determination section configured to carry out a movement determination and configured to correct said blending ratio by making use of a result of said movement determination,
wherein, in processing to synthesize said taken images, said synthesizing processing section is configured to acquire a taken-image blending ratio which varies in accordance with components selected from said taken images and to carry out movement determination; and
wherein said synthesizing processing section computes said blending ratio if said result of said movement determination indicates a static state and outputs one of said taken images without carrying out said blending process if said result of said movement determination indicates a dynamic state.

9. The image taking apparatus according to claim 8 wherein said synthesizing processing section is further configured to:
acquire said blending ratio computed on the basis of luminance components of said taken images;
make use of said blending ratio in said blending process carried out on said blend area;
select any image from said taken images; and
apply a color component of said selected image to said blend area.

10. The image taking apparatus according to claim 9 wherein said different exposure durations include a first exposure duration and a second exposure duration, wherein said first exposure duration is longer than said second exposure duration, and said synthesizing processing section is further configured to:

select an image taken at a said first exposure duration from said taken images; and apply a color component of said selected image taken at said first exposure duration to said blend area.

11. The image taking apparatus according to claim 9, said image taking apparatus further comprising a white-balance adjustment processing section configured to carry out white-balance adjustment processing of multiplying a synthesized image synthesized in said synthesizing processing section by gains, wherein said white-balance adjustment processing section multiplies color components of said synthesized image by said gains computed for said color components respectively in said white-balance adjustment processing.

12. The image taking apparatus according to claim 8, said image taking apparatus further comprising a white-balance adjustment processing section configured to carry out white-balance adjustment processing of multiplying a synthesized image synthesized in said synthesizing processing section by gains, wherein:

said synthesizing processing section acquires said blending ratio from raw data of said taken images at a synthesizing time and supplies said synthesizing-time blending ratio to said white-balance adjustment processing section;

said white-balance adjustment processing section computes said gains on the basis of said synthesizing-time blending ratio; and said white-balance adjustment processing section multiplies said synthesized image by said computed gains in said white-balance adjustment processing.

13. The image taking apparatus according to claim 8, said image taking apparatus further comprising:

a white-balance adjustment processing section configured to carry out white-balance adjustment processing of multiplying a synthesized image synthesized in said synthesizing processing section by white-balance gains; and a section configured to carry out delay adjustment on said acquired blending ratio and the image of a frame for which said white-balance gains of said frame image have been computed.

14. The image taking apparatus according to claim 8 wherein said synthesizing processing section carries out a blending process on a blend area in which pixels of said taken images are to be blended by applying said blending ratio to said blend area.

15. An image processing method comprising synthesizing, by a processing unit, a plurality of images taken with different exposure durations, wherein said synthesizing includes an operation to acquire a taken-image blending ratio varying in accordance with components selected from said taken images and a movement determination, and an operation to carry out said movement determination and configured to correct said blending ratio by making use of a result of said movement determination, wherein said synthesizing includes computing said blending ratio if said result of said movement determination indicates a static state and outputting one of said taken images without carrying out said blending operation if said result of said movement determination indicates a dynamic state.

16. The image processing method according to claim 15 wherein said synthesizing includes carrying out a blending process on a blend area in which pixels of said taken images are to be blended by applying said blending ratio to said blend area.

17. A non-transitory computer readable medium storing instructions for causing a processor to complete a process of synthesizing a plurality of images taken with different exposure durations in order to carry out an operation to acquire a taken-image blending ratio varying in accordance with components selected from said taken images and to carry out movement determination, and an operation to carry out said movement determination and configured to correct said blending ratio by making use of a result of said movement determination, wherein said synthesizing includes computing said blending ratio if said result of said movement determination indicates a static state and outputs one of said taken images without carrying out said blending process if said result of said movement determination indicates a dynamic state.

18. The non-transitory computer readable medium according to claim 17 wherein said synthesizing includes carrying out a blending process on a blend area in which pixels of said taken images are to be blended by applying said blending ratio to said blend area.

* * * * *